US010204096B2

(12) United States Patent
Chaudhri et al.

(10) Patent No.: US 10,204,096 B2
(45) Date of Patent: Feb. 12, 2019

(54) DEVICE, METHOD, AND GRAPHICAL USER INTERFACE FOR A PREDICTIVE KEYBOARD

(71) Applicant: Apple Inc., Cupertino, CA (US)

(72) Inventors: Imran A. Chaudhri, San Francisco, CA (US); Chanaka G. Karunamuni, San Jose, CA (US); Tiffany S. Jon, San Jose, CA (US); Jason C. Beaver, San Jose, CA (US); Joshua H. Shaffer, Woodside, CA (US); Christopher P. Willmore, Santa Clara, CA (US); Nicholas K. Jong, Campbell, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 14/502,711

(22) Filed: Sep. 30, 2014

(65) Prior Publication Data

US 2015/0347007 A1   Dec. 3, 2015

Related U.S. Application Data

(60) Provisional application No. 62/005,837, filed on May 30, 2014, provisional application No. 62/046,876, filed on Sep. 5, 2014.

(51) Int. Cl.
*G06F 17/27* (2006.01)
*G06F 3/0484* (2013.01)
*G06F 3/0488* (2013.01)

(52) U.S. Cl.
CPC .......... *G06F 17/276* (2013.01); *G06F 3/0484* (2013.01); *G06F 3/04842* (2013.01); *G06F 3/04883* (2013.01); *G06F 3/04886* (2013.01)

(58) Field of Classification Search
CPC ........................ G06F 1/1673; G06F 1/04886
(Continued)

(56) References Cited

U.S. PATENT DOCUMENTS 5,581,484 A   12/1996 Prince
5,805,165 A   9/1998 Thorne, III et al.
(Continued)

FOREIGN PATENT DOCUMENTS

CN   101198925 A   6/2008
JP   2000-155638 A   6/2000
(Continued)

OTHER PUBLICATIONS

Chevalier, F., et al., "Using Text Animated Transitions to Support Navigation in Document Histories," CHI, Apr. 2010, 10 Pages.
(Continued)

*Primary Examiner* — Andrew R Dyer
(74) *Attorney, Agent, or Firm* — Dentons US LLP

(57) ABSTRACT

A method includes displaying a suggestion region above an on-screen keyboard. The suggestion region includes multiple suggested character strings. The method further includes: detecting a gesture that begins within a predefined key of the on-screen keyboard; and responsive to detecting the gesture: in accordance with a determination that the gesture ends within the predefined key, inserting a first character string into a text field; and in accordance with a determination that the gesture ends outside of the predefined key, inserting a second character string into the text field, wherein the second character string is different from the first character string.

57 Claims, 54 Drawing Sheets

(58) Field of Classification Search
USPC .................................. 715/210, 764, 771, 773
See application file for complete search history.

(56) References Cited

U.S. PATENT DOCUMENTS

| | | | |
|---|---|---|---|
| 5,818,437 A | 10/1998 | Grover et al. | |
| 5,896,321 A | 4/1999 | Miller et al. | |
| 6,073,036 A * | 6/2000 | Heikkinen | G06F 3/04842 |
| | | | 379/354 |
| 6,094,197 A * | 7/2000 | Buxton | G06F 3/0482 |
| | | | 341/22 |
| 6,259,436 B1 | 7/2001 | Moon et al. | |
| 6,307,548 B1 | 10/2001 | Flinchem et al. | |
| 6,377,965 B1 | 4/2002 | Hachamovitch et al. | |
| 6,426,761 B1 * | 7/2002 | Kanevsky | G06F 3/0481 |
| | | | 715/764 |
| 6,801,659 B1 | 10/2004 | O'Dell | |
| 7,319,957 B2 | 1/2008 | Robinson et al. | |
| 7,443,316 B2 | 10/2008 | Lim | |
| 7,458,014 B1 | 11/2008 | Rubin et al. | |
| 7,487,147 B2 | 2/2009 | Bates et al. | |
| 7,502,017 B1 * | 3/2009 | Ratzlaff | G06F 3/04883 |
| | | | 345/173 |
| 7,508,324 B2 | 3/2009 | Suraqui | |
| 7,584,093 B2 | 9/2009 | Potter et al. | |
| 7,676,763 B2 * | 3/2010 | Rummel | G06F 3/0482 |
| | | | 715/810 |
| 7,679,534 B2 | 3/2010 | Kay et al. | |
| 7,683,886 B2 | 3/2010 | Willey | |
| 7,712,053 B2 | 5/2010 | Bradford et al. | |
| 7,725,838 B2 | 5/2010 | Williams | |
| 7,793,228 B2 | 9/2010 | Mansfield et al. | |
| 7,797,269 B2 | 9/2010 | Rieman et al. | |
| 7,957,955 B2 | 6/2011 | Christie et al. | |
| 8,136,052 B2 * | 3/2012 | Shin | G06F 3/04883 |
| | | | 715/835 |
| 8,232,973 B2 * | 7/2012 | Kocienda | G06F 3/0237 |
| | | | 345/168 |
| 8,245,156 B2 * | 8/2012 | Mouilleseaux | G06F 3/04883 |
| | | | 715/834 |
| 8,299,943 B2 | 10/2012 | Longe | |
| 8,423,916 B2 * | 4/2013 | Chihara | G06F 3/04883 |
| | | | 345/156 |
| 8,601,389 B2 * | 12/2013 | Schulz | G06F 3/0482 |
| | | | 345/156 |
| 8,671,343 B2 * | 3/2014 | Oberstein | G06F 3/0482 |
| | | | 345/111 |
| 8,843,845 B2 * | 9/2014 | Ouyang | G06F 3/04883 |
| | | | 715/773 |
| 8,896,556 B2 * | 11/2014 | Frazier | G06F 3/0482 |
| | | | 345/173 |
| 8,972,903 B2 | 3/2015 | James et al. | |
| 9,007,311 B2 * | 4/2015 | Kwak | G06F 3/0488 |
| | | | 345/173 |
| 9,021,380 B2 * | 4/2015 | Zhai | G06F 3/0237 |
| | | | 715/773 |
| 9,046,928 B2 * | 6/2015 | Kumhyr | G06F 3/017 |
| 9,058,092 B2 * | 6/2015 | Rogers | G06F 3/04817 |
| 9,086,802 B2 | 7/2015 | Kocienda et al. | |
| 9,250,797 B2 * | 2/2016 | Roberts | G06F 3/04883 |
| 9,436,380 B2 * | 9/2016 | Chmielewski | G06F 3/0482 |
| 9,535,597 B2 * | 1/2017 | Wong | G06F 3/0488 |
| 9,557,916 B2 | 1/2017 | Robinson et al. | |
| 2001/0015718 A1 * | 8/2001 | Hinckley | A63F 13/06 |
| | | | 345/156 |
| 2002/0010726 A1 | 1/2002 | Rogson | |
| 2002/0126097 A1 | 9/2002 | Savolainen | |
| 2002/0126148 A1 | 9/2002 | Rosenkranz et al. | |
| 2004/0055446 A1 | 3/2004 | Robbin et al. | |
| 2004/0095395 A1 * | 5/2004 | Kurtenbach | G06F 3/0482 |
| | | | 715/810 |
| 2004/0140956 A1 * | 7/2004 | Kushler | G06F 3/04883 |
| | | | 345/168 |
| 2004/0160419 A1 * | 8/2004 | Padgitt | G06F 3/04886 |
| | | | 345/173 |
| 2004/0183833 A1 | 9/2004 | Chua | |
| 2005/0099398 A1 | 5/2005 | Garside et al. | |
| 2005/0131687 A1 | 6/2005 | Sorrentino | |
| 2005/0162395 A1 | 7/2005 | Unruh | |
| 2005/0169527 A1 * | 8/2005 | Longe | G06F 3/0237 |
| | | | 382/177 |
| 2005/0190970 A1 | 9/2005 | Griffin | |
| 2005/0246365 A1 | 11/2005 | Lowles et al. | |
| 2005/0283726 A1 | 12/2005 | Lunati | |
| 2006/0044278 A1 | 3/2006 | Fux et al. | |
| 2006/0190256 A1 | 8/2006 | Stephanick et al. | |
| 2006/0206454 A1 | 9/2006 | Forstall et al. | |
| 2006/0241944 A1 * | 10/2006 | Potter | G06F 17/2795 |
| | | | 704/254 |
| 2006/0265208 A1 | 11/2006 | Assadollahi | |
| 2006/0265648 A1 | 11/2006 | Rainisto et al. | |
| 2006/0274051 A1 * | 12/2006 | Longe | G06F 3/0237 |
| | | | 345/173 |
| 2007/0046641 A1 * | 3/2007 | Lim | G06F 3/04886 |
| | | | 345/173 |
| 2007/0061753 A1 * | 3/2007 | Ng | G06F 3/0237 |
| | | | 715/816 |
| 2007/0130128 A1 | 6/2007 | Garg et al. | |
| 2007/0156747 A1 | 7/2007 | Samuelson et al. | |
| 2007/0180392 A1 * | 8/2007 | Russo | G06F 3/0482 |
| | | | 715/765 |
| 2007/0229476 A1 | 10/2007 | Huh | |
| 2008/0036743 A1 * | 2/2008 | Westerman | G06F 3/038 |
| | | | 345/173 |
| 2008/0059876 A1 | 3/2008 | Hantler et al. | |
| 2008/0168349 A1 | 7/2008 | Lanniraux et al. | |
| 2008/0266261 A1 * | 10/2008 | Idzik | G06F 17/273 |
| | | | 345/168 |
| 2008/0310723 A1 | 12/2008 | Manu et al. | |
| 2008/0316183 A1 * | 12/2008 | Westerman | G06F 3/0416 |
| | | | 345/173 |
| 2009/0007017 A1 | 1/2009 | Anzures et al. | |
| 2009/0058823 A1 * | 3/2009 | Kocienda | G06F 3/0236 |
| | | | 345/173 |
| 2009/0064055 A1 | 3/2009 | Chaudhri et al. | |
| 2009/0172532 A1 | 7/2009 | Chaudhri | |
| 2009/0199130 A1 | 8/2009 | Tsern et al. | |
| 2009/0278806 A1 | 11/2009 | Duarte et al. | |
| 2010/0287486 A1 * | 11/2010 | Coddington | G06F 3/0236 |
| | | | 715/769 |
| 2010/0333030 A1 * | 12/2010 | Johns | G06F 3/04815 |
| | | | 715/834 |
| 2011/0183720 A1 | 7/2011 | Dinn | |
| 2011/0209098 A1 * | 8/2011 | Hinckley | G06F 3/0483 |
| | | | 715/863 |
| 2012/0036469 A1 * | 2/2012 | Suraqui | G06F 3/04883 |
| | | | 715/773 |
| 2012/0119997 A1 | 5/2012 | Gutowitz | |
| 2012/0239395 A1 * | 9/2012 | Foo | G06F 3/0237 |
| | | | 704/235 |
| 2013/0002553 A1 * | 1/2013 | Colley | G06F 3/0236 |
| | | | 345/161 |
| 2013/0125037 A1 * | 5/2013 | Pasquero | G06F 17/273 |
| | | | 715/773 |
| 2013/0187858 A1 * | 7/2013 | Griffin | G06F 3/04886 |
| | | | 345/168 |
| 2013/0285927 A1 * | 10/2013 | Pasquero | G06F 3/0237 |
| | | | 345/173 |
| 2013/0339283 A1 | 12/2013 | Grieves et al. | |
| 2014/0002363 A1 | 1/2014 | Griffin et al. | |
| 2014/0028571 A1 | 1/2014 | St. Clair | |
| 2014/0063067 A1 | 3/2014 | Compton et al. | |
| 2014/0195979 A1 * | 7/2014 | Branton | G06F 3/0482 |
| | | | 715/834 |
| 2014/0317547 A1 * | 10/2014 | Bi | G06F 3/0482 |
| | | | 715/773 |
| 2015/0317078 A1 | 11/2015 | Kocienda et al. | |

(56) References Cited

U.S. PATENT DOCUMENTS

| | | | |
|---|---|---|---|
| 2015/0347379 A1 | 12/2015 | Chaudhri et al. | |
| 2015/0378982 A1* | 12/2015 | McKenzie | G06F 3/0482 715/261 |

FOREIGN PATENT DOCUMENTS

| | | | |
|---|---|---|---|
| JP | 2007-172767 A | 7/2007 | |
| JP | 2007-187708 A | 7/2007 | |
| WO | 2000/38041 A1 | 6/2000 | |
| WO | 2006/020305 A2 | 2/2006 | |

OTHER PUBLICATIONS

PCT Invitation to Pay Additional Fees and, Where Applicable, Protest Fee for PCT/US2015/023946, dated Jul. 3, 2015, 7 Pages.
Anonymous: "Swipe to Ed it Using BetterTouchTool," Mac Automation Tips, Mar. 11, 2011, 1 page, [online] [retrieved on Oct. 2, 2015] Retrieved from the internet <URL:https://macautomationtips.wordpress.com/2011/03/11/swipe-to-edit-using-bettertouchtool/>.
Chavda, P., "Swipe to Edit (animation)," Dribbble, Nov. 21, 2013, 7 pages, [online] [Retrieved on Oct. 2, 2015] Retrieved from the internet <URL:https://dribbble.com/shots/1320750-Swipe-to-Edit-animation>.
PCT International Search Report and Written Opinion for PCT/US2015/023946, dated Oct. 12, 2015, 23 Pages.
International Preliminary Report on Patentability received for PCT Patent Application No. PCT/US2015/023946, dated Dec. 15, 2016, 17 pages.
Non Final Office Action received for U.S. Appl No. 14/503,147, dated Nov. 2, 2016, 21 pages.
MAC Automation Tips, "Swipe to Edit Using BetterTouchTool", Available online at <https://macautomationtips.wordpress.com/category/bettertouchtool/>, Mar. 11, 2011, 1 page.
Office Action received for European Patent Application No. 15716372.6, dated Nov. 15, 2017, 8 pages.
Decision to Refuse received for European Patent Application No. 11733962.2, dated Sep. 30, 2016, 20 pages.
Final Office Action received for U.S. Appl No. 11/549,624, dated Apr. 10, 2009, 9 pages.
Final Office Action received for U.S. Appl No. 11/549,624, dated Feb. 1, 2010, 9 pages.
Final Office Action received for U.S. Appl No. 11/620,641, dated Jun. 25, 2010, 31 pages.
Final Office Action received for U.S. Appl No. 12/832,900, dated Nov. 9, 2012, 13 pages.
Final Office Action received for U.S. Appl No. 13/559,495, dated Sep. 8, 2014, 7 pages.
Final Office Action received for U.S. Appl No. 14/503,147, dated Jun. 15, 2017, 18 pages.
International Preliminary Report on Patentability received for PCT Patent Application No. PCT/US2007/088872, dated Jul. 7, 2009, 7 pages.
International Preliminary Report on Patentability received for PCT Patent Application No. PCT/US2011/043302, dated Jan. 17, 2013, 8 pages.
International Search Report and Written Opinion received for PCT Patent Application No. PCT/US2007/088872, dated May 8, 2008, 8 pages.
International Search Report and Written Opinion received for PCT Patent Application No. PCT/US2011/043302, dated Dec. 15, 2011, 10 pages.
Non-Final Office Action received for U.S. Appl No. 11/620,641, dated Nov. 20, 2009, 20 pages.
Non-Final Office Action received for U.S. Appl No. 11/549,624, dated Jul. 22, 2009, 9 pages.
Non-Final Office Action received for U.S. Appl No. 11/549,624, dated Sep. 30, 2008, 8 pages.
Non-Final Office Action received for U.S. Appl No. 12/165,554, dated Nov. 21, 2011, 12 pages.
Non-Final Office Action received for U.S. Appl No. 12/832,900, dated Aug. 29, 2013, 11 pages.
Non-Final Office Action received for U.S. Appl No. 12/832,900, dated Jul. 20, 2012, 16 pages.
Non-Final Office Action received for U.S. Appl No. 12/832,900, dated Mar. 17, 2014, 12 pages.
Non-Final Office Action received for U.S. Appl No. 13/559,495, dated Dec. 16, 2013, 6 pages.
Non-Final Office Action received for U.S. Appl No. 13/559,495, dated Dec. 7, 2012, 10 pages.
Non-Final Office Action received for U.S. Appl No. 14/800,378, dated Feb. 23, 2018, 10 pages.
Notice of Acceptance received for Australian Patent Application No. 2011274519, dated Jul. 8, 2015, 2 pages.
Notice of Allowance received for Korean Patent Application No. 10-2013-7003037, dated Jul. 14, 2015, 3 pages (1 page of English Translation and 2 pages of Official copy).
Notice of Allowance received for U.S. Appl No. 11/549,624, dated Jun. 3, 2010, 6 pages.
Notice of Allowance received for U.S. Appl No. 11/620,641, dated Apr. 13, 2011, 6 pages.
Notice of Allowance received for U.S. Appl No. 11/620,641, dated Mar. 18, 2011, 12 pages.
Notice of Allowance received for U.S. Appl No. 12/165,554, dated Apr. 2, 2012, 9 pages.
Notice of Allowance received for U.S. Appl No. 12/832,900, dated Dec. 4, 2014, 2 pages.
Notice of Allowance received for U.S. Appl No. 12/832,900, dated Jan. 17, 2014, 7 pages.
Notice of Allowance received for U.S. Appl No. 12/832,900, dated Oct. 24, 2014, 10 pages.
Notice of Allowance received for U.S. Appl No. 13/559,495, dated Aug. 15, 2013, 6 pages.
Notice of Allowance received for U.S. Appl No. 13/559,495, dated Dec. 12, 2014, 5 pages.
Notice of Allowance received for U.S. Appl No. 13/559,495, dated Jun. 25, 2013, 6 pages.
Notice of Allowance received for U.S. Appl No. 13/559,495, dated Mar. 13, 2015, 5 pages.
Notice to Grant received for Chinese Patent Application No. 201180039041.6, dated Dec. 27, 2016, 4 pages (2 pages of English Translation and 2 pages Official copy).
Office Action received for Australian Patent Application No. 2011274519, dated Jan. 13, 2015, 3 pages.
Office Action received for Australian Patent Application No. 2011274519, dated May 12, 2015, 3 pages.
Office Action received for Australian Patent Application No. 2011274519, dated Oct. 17, 2013, 3 pages.
Office Action received for Chinese Patent Application No. 201180039041.6, dated Jan. 18, 2016, 20 pages (10 pages of English Translation and 10 pages Of Official copy).
Office Action received for Chinese Patent Application No. 201180039041.6, dated Mar. 2, 2015, 18 pages (10 pages of English Translation and 8 pages of Official copy).
Office Action received for European Patent Application No. 07869922.0, dated Dec. 7, 2010, 5 pages.
Office Action received for European Patent Application No. 07869922.0, dated May 26, 2010, 5 pages.
Office Action received for European Patent Application No. 11733962.2 dated Dec. 9, 2015, 7 pages.
Office Action received for European Patent Application No. 11733962.2, dated Jan. 22, 2014, 4 pages.
Office Action received for Korean Patent Application No. 10-2013-7003037, dated Oct. 23, 2014, 7 pages (3 pages of English Translation and 4 pages of Official copy).
Summons to Attend Oral Proceeding received for European Patent Application No. 11733962.2, mailed on Apr. 13, 2016, 8 pages.
Summons to Attend Oral Proceedings received for European Patent Application No. 15716372.6, mailed on Jul. 13, 2018, 9 pages.

* cited by examiner

Productiv

Productiv

Productiv

Productiv

Figure 9G

Producti

Producti

Producti

Productiv

Figure 9H

Production

Productio

Producti

Figure 9I

Productio

Productio

Producti$_o$

Producti$_o$

Figure 9J

Productiv

Producti<sub>v</sub>

Producti<sub>v</sub>

Producti<sub>v</sub>

Figure 9K

Production

Productio$_n$

Productio

Producti$_o$

Producti

Producti$_v$

Productiv

Productiv$_e$

Productive

Figure 9L bookseller bookseller/k bookkeller bookkeller/d bookkeeler bookkeeler/p bookkeeper

Figure 9M disgusted disiusted disinsted disin_tsted disintsted disint_ested disintested disinte_rsted disintersted disinter_ested disinterested

Figure 9N disinterested disinter₇ested disintersted disinte₇rsted disintested disint₇ested disintsted disin₇tsted disinsted disiusted disgusted

Figure 9O

DEVICE, METHOD, AND GRAPHICAL USER INTERFACE FOR A PREDICTIVE KEYBOARD

CROSS-REFERENCE TO RELATED APPLICATIONS

This application claims the benefit of U.S. Provisional Application No. 62/005,837, filed May 30, 2014, which is incorporated by reference herein in its entirety. This application claims the benefit of U.S. Provisional Application No. 62/046,876, filed Sep. 5, 2014, which is incorporated by reference herein in its entirety. This application relates to the following provisional applications: U.S. patent application Ser. No. 62/006,010, "Predictive Text Input," filed May 30, 2014; U.S. patent application Ser. No. 62/005,825, "Entropy-Guided Text Prediction Using Combined Word and Character N-gram Language Models," filed May 30, 2014; U.S. patent application Ser. No. 62/005,942, "Text Prediction Using Combined Word N-gram and Unigram Language Models," filed May 30, 2014; and U.S. patent application Ser. No. 62/005,958, "Canned Answers in Messages," filed May 30, 2014; which are hereby incorporated by reference in their entirety.

TECHNICAL FIELD

This relates generally to electronic devices with touch-sensitive surfaces, including but not limited to electronic devices with touch-sensitive surfaces that detect inputs for using a predictive keyboard.

BACKGROUND

An on-screen keyboard enables a user to type characters into a text field using a touch-sensitive surface as an input device for a computer or other electronic computing device. Exemplary touch-sensitive surfaces include touch pads and touch screen displays. Sometimes, an on-screen keyboard is used in conjunction with a predictive text system, which predicts character strings that the user might want to type.

SUMMARY

A combination of an on-screen keyboard and a predictive text system (a "predictive keyboard") displays one or more predicted character strings. If the user taps a predicted character string, then that character string is inserted into the text field. This functionality enables the user to avoid typing the entire character string.

Some methods for using a predictive keyboard are inefficient. For example, requiring the user to move the contact point away from the on-screen keyboard region in order to tap the desired predicted character string region is inconvenient for the user, wastes the user's time, and wastes the device's energy (which is particularly important in battery-operated devices). Also, as a user types, the displayed predicted character strings can change, distracting the user and increasing the user's cognitive burden. This reduces the user's efficiency when using the device. As a result, the user requires more time to perform a task, which wastes the user's time and wastes the device's energy.

Accordingly, there is a need for electronic devices with faster, more efficient methods and user interfaces for using a predictive keyboard. Such methods and interfaces optionally complement or replace conventional methods for using a predictive keyboard. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In accordance with some embodiments, a method is performed at an electronic device with a display and a touch-sensitive surface. The method includes displaying a suggestion region above an on-screen keyboard, the suggestion region including multiple suggested character strings. The method also includes detecting a gesture that begins within a predefined key of the on-screen keyboard. The method also includes responsive to detecting the gesture: in accordance with a determination that the gesture ends within the predefined key, inserting a first character string into a text field; and in accordance with a determination that the gesture ends outside of the predefined key, inserting a second character string into the text field, wherein the second character string is different from the first character string.

In accordance with some embodiments, an electronic device includes a display unit configured to display a user interface with a suggestion region above an on-screen keyboard, the suggestion region including multiple suggested character strings, a touch-sensitive surface unit configured to receive user contacts, and a processing unit coupled to the display unit and the touch-sensitive unit. The processing unit is configured to detect a gesture that begins within a predefined key of the on-screen keyboard. The processing unit is further configured to, responsive to detecting the gesture: in accordance with a determination that the gesture ends within the predefined key, insert a first character string into a text field; and in accordance with a determination that the gesture ends outside of the predefined key, insert a second character string into the text field, wherein the second character string is different from the first character string.

In accordance with some embodiments, a method is performed at an electronic device with a display and a touch-sensitive surface. The method includes receiving one or more entered characters. The method further includes, after receiving the one or more entered characters, displaying a suggestion region that includes a set of one or more suggestions including one or more character strings that start with the one or more entered characters. The method further includes, while displaying the set of one or more suggestions, receiving one or more additional entered characters. The method further includes, responsive to receiving the one or more additional entered characters, updating the set of suggestions, wherein the updating comprises: changing a first suggestion in the set of one or more suggestions from a first character string to a second character string, comprising, while maintaining display of a first portion of the first character string: ceasing to display a second portion of the first character string that is incompatible with the one or more additional entered characters; adding the one or more additional entered characters to the first portion of the first character string; and adding a first set of one or more predicted characters to the first portion of the first character string to display the second character string.

In accordance with some embodiments, an electronic device includes a display unit configured to display a user interface with a suggestion region that includes a set of one or more suggestions including one or more character strings that start with one or more entered characters, a touch-sensitive surface unit configured to receive user contacts, and a processing unit coupled to the display unit and the touch-sensitive unit. The processing unit is configured to, while displaying the set of one or more suggestions, receive one or more additional entered characters. The processing unit is further configured to, responsive to receiving the one or more additional entered characters, update the set of suggestions, wherein the updating comprises: changing a first suggestion in the set of one or more suggestions from a first character string to a second character string, comprising, while maintaining display of a first portion of the first character string: ceasing to display a second portion of the first character string that is incompatible with the one or more additional entered characters; adding the one or more additional entered characters to the first portion of the first character string; and adding a first set of one or more predicted characters to the first portion of the first character string to display the second character string.

In accordance with some embodiments, a method is performed at an electronic device with a display and a touch-sensitive surface. The method includes displaying a set of one or more suggestions including one or more character strings that are suggested replacements for a first set of one or more entered characters. The method further includes while displaying the set of suggestions, receiving one or more additional entered characters. The method further includes after receiving the additional entered characters, updating the set of suggestions based on an updated set of entered characters that includes the first set of entered characters and the additional entered characters. The updating comprises changing a first suggestion in the set of suggestions from a first character string that is a suggested replacement for the first set of entered characters to a second character string that is a suggested replacement for the updated set of entered characters. The changing comprises determining a maintained portion of the first character string that is identical to a corresponding portion of the second character string, determining an inserted portion of the second character string that is inserted relative to the maintained portion of the first character string (the inserted portion having a sequence of characters), and while displaying the maintained portion of the first character string, sequentially displaying the characters of the inserted portion of the second character string after the maintained portion of the first character string.

In accordance with some embodiments, an electronic device includes a display unit configured to display a user interface for displaying a transition from a first character string to a second character string, a touch-sensitive surface unit configured to receive user contacts, and a processing unit coupled to the display unit and the touch-sensitive unit. The processing unit is configured to display a set of one or more suggestions including one or more character strings that are suggested replacements for a first set of one or more entered characters. The processing unit is further configured to, while displaying the set of suggestions, receive one or more additional entered characters. The processing unit is further configured to, after receiving the additional entered characters, update the set of suggestions based on an updated set of entered characters that includes the first set of entered characters and the additional entered characters. The updating comprises changing a first suggestion in the set of suggestions from a first character string that is a suggested replacement for the first set of entered characters to a second character string that is a suggested replacement for the updated set of entered characters. The changing comprises determining a maintained portion of the first character string that is identical to a corresponding portion of the second character string, determining an inserted portion of the second character string that is inserted relative to the maintained portion of the first character string (the inserted portion having a sequence of characters), and while displaying the maintained portion of the first character string, sequentially displaying the characters of the inserted portion of the second character string after the maintained portion of the first character string.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which, when executed by an electronic device with a display and a touch-sensitive surface, cause the device to perform the operations of any of the methods referred described above. In accordance with some embodiments, an electronic device includes: a display, a touch-sensitive surface, and means for performing the operations of any of the methods described above. In accordance with some embodiments, an information processing apparatus, for use in an electronic device with a display and a touch-sensitive surface, includes means for performing the operations of any of the methods described above.

Thus, electronic devices with displays, touch-sensitive surfaces are provided with faster, more efficient methods and interfaces for using a predictive keyboard, thereby increasing the effectiveness, efficiency, and user satisfaction with such devices. Such methods and interfaces may complement or replace conventional methods for using a predictive keyboard.

In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory, and one or more modules, programs, or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

In embodiments described below, improved methods for using a predictive keyboard are achieved by providing user interfaces that allow inserting a character string into a text field. In other embodiments described below, improved methods for using a predictive keyboard are achieved by providing user interfaces that update a set of one or more suggestions in a suggestion region. These methods streamline the process of using a predictive keyboard.

Figure 7:
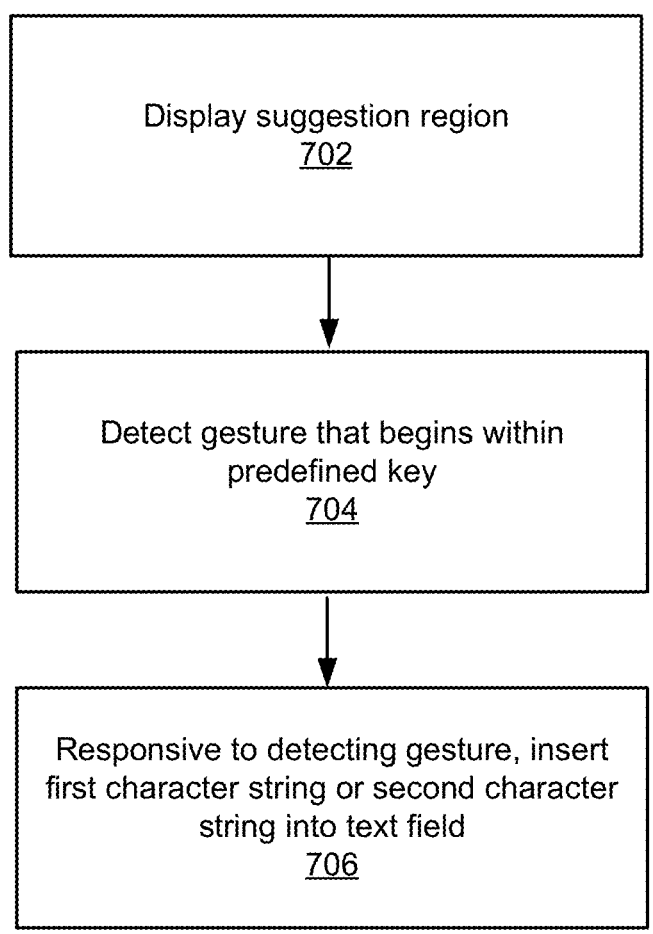
FIG. 7 is a flow diagram illustrating a method of inserting a character string into a text field in accordance with some embodiments.
Figure 8:
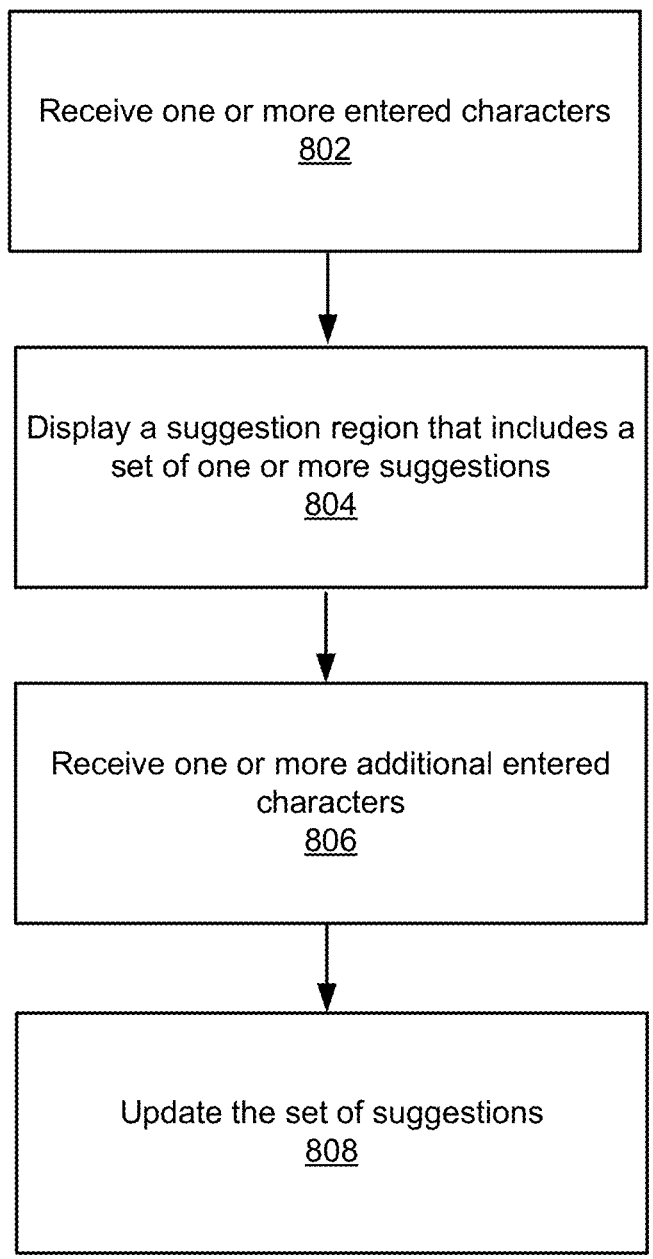
FIG. 8 is a flow diagram illustrating a method of updating a set of one or more suggestions in a suggestion region in accordance with some embodiments.

Below, FIGS. 1A-1B, 2, and 3 provide a description of exemplary devices. FIGS. 4A-4B and 5A-5O illustrate exemplary user interfaces for inserting a character string into a text field. FIGS. 4A-4B and 6A-6L illustrate exemplary user interfaces for updating a set of one or more suggestions in a suggestion region. FIG. 7 is a flow diagram illustrating a method of inserting a character string into a text field. FIG. 8 is a flow diagram illustrating a method of updating a set of one or more suggestions in a suggestion region. The user interfaces in FIGS. 5A-5O are used to illustrate the process in FIG. 7. The user interfaces in FIGS. 6A-6L are used to illustrate the process in FIG. 8.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
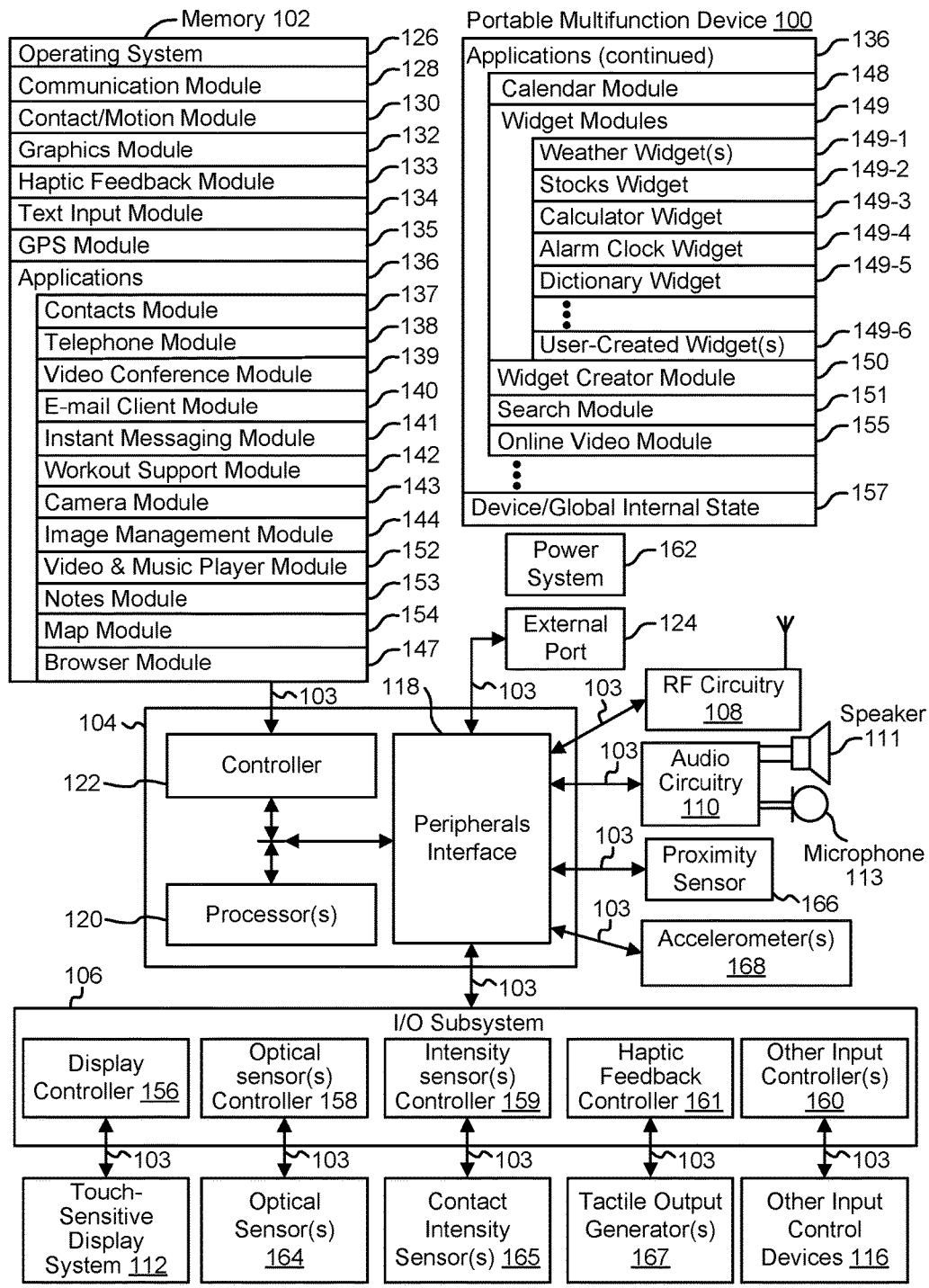
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
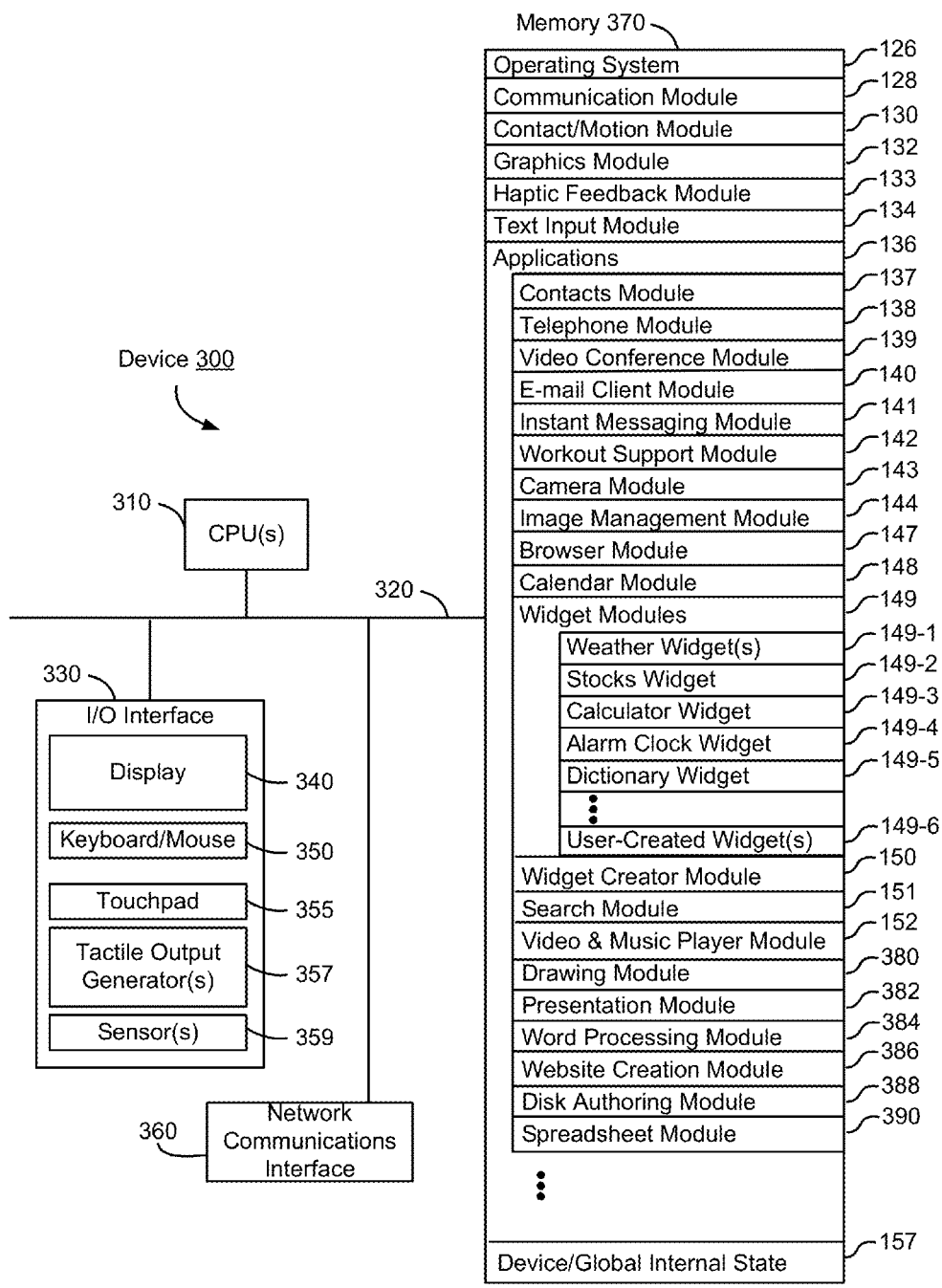
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
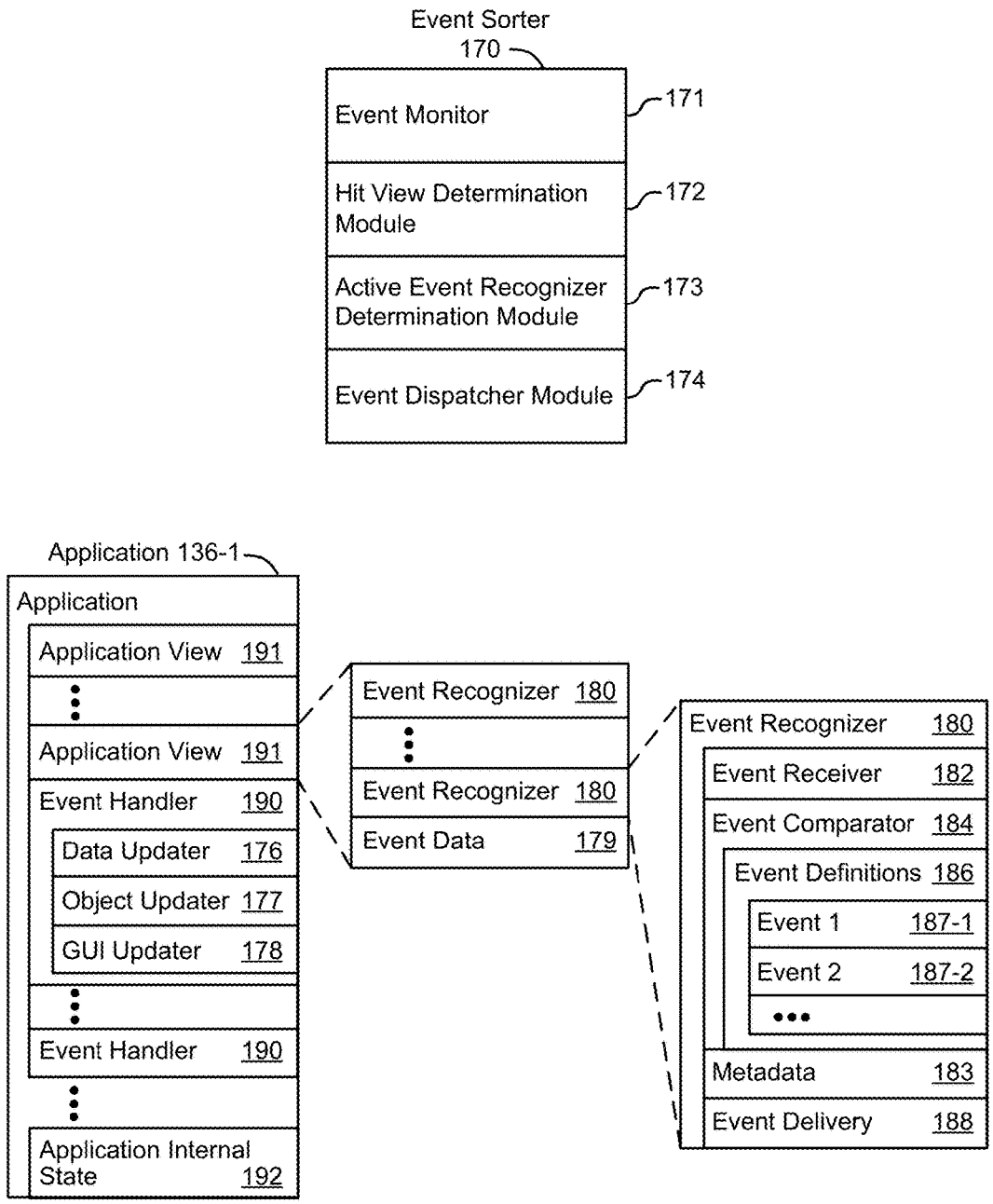
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
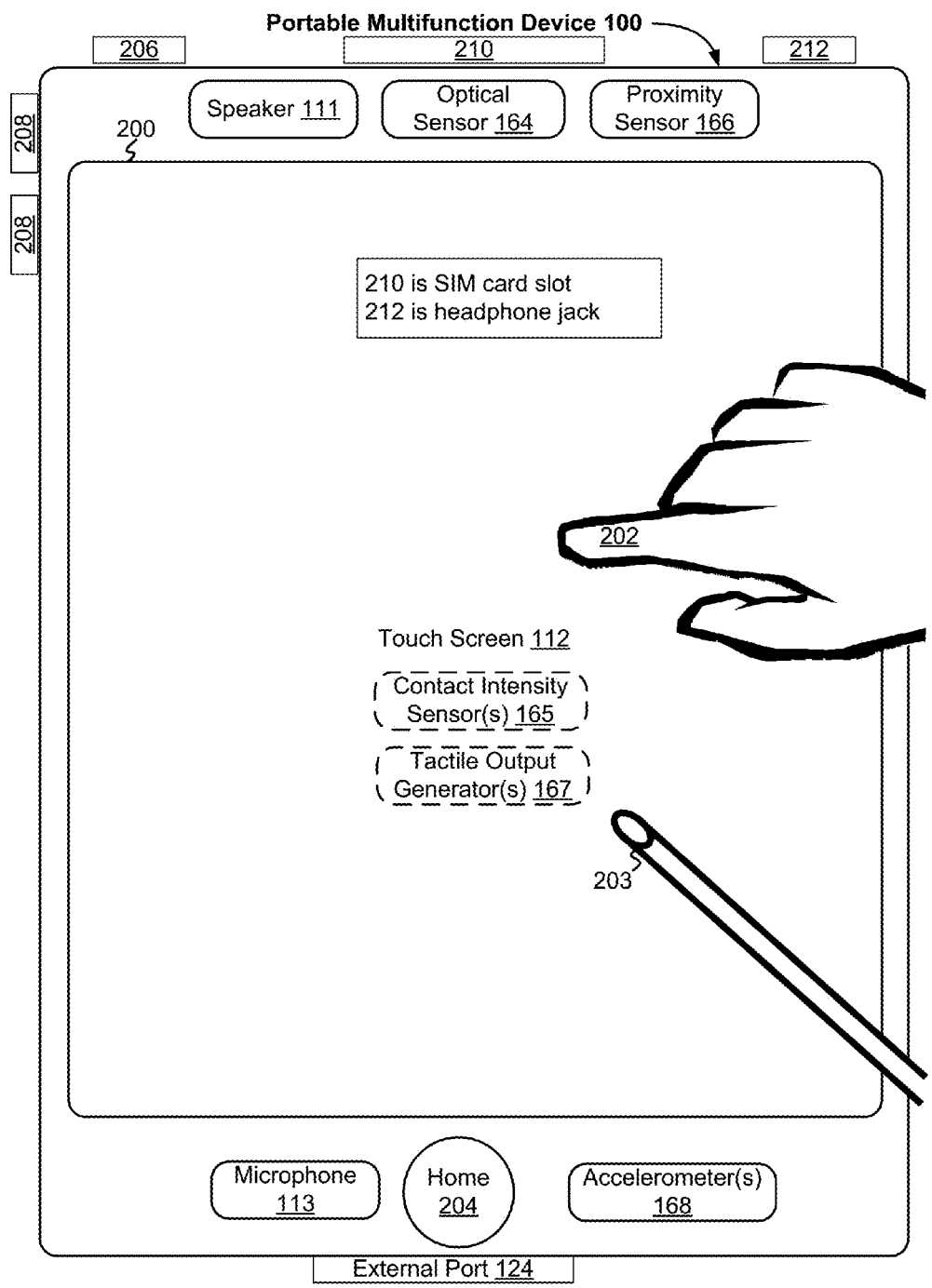
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
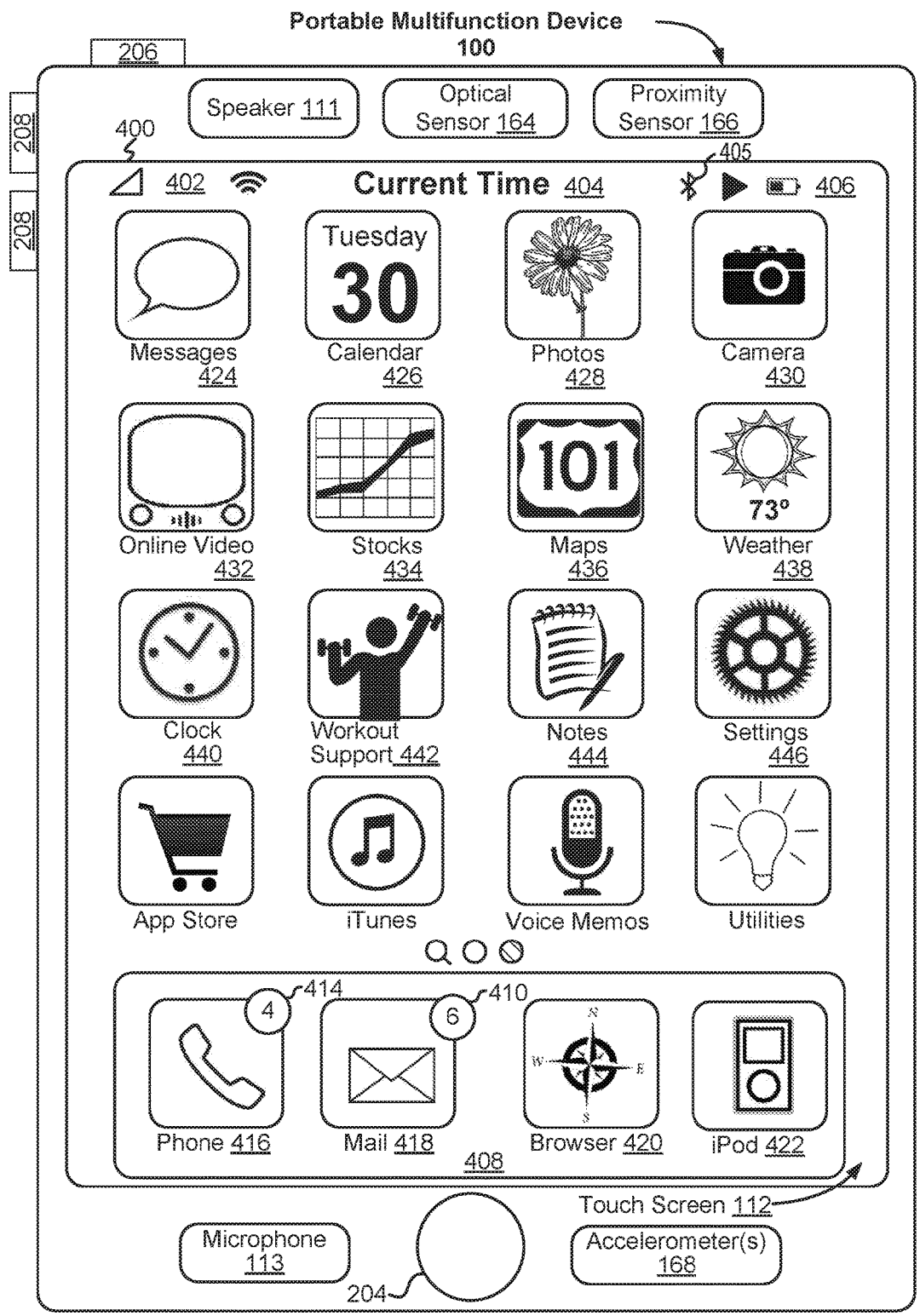
FIG. 4A illustrates an exemplary user interface for a menu of applications on a portable multifunction device in accordance with some embodiments.
Figure 5A:
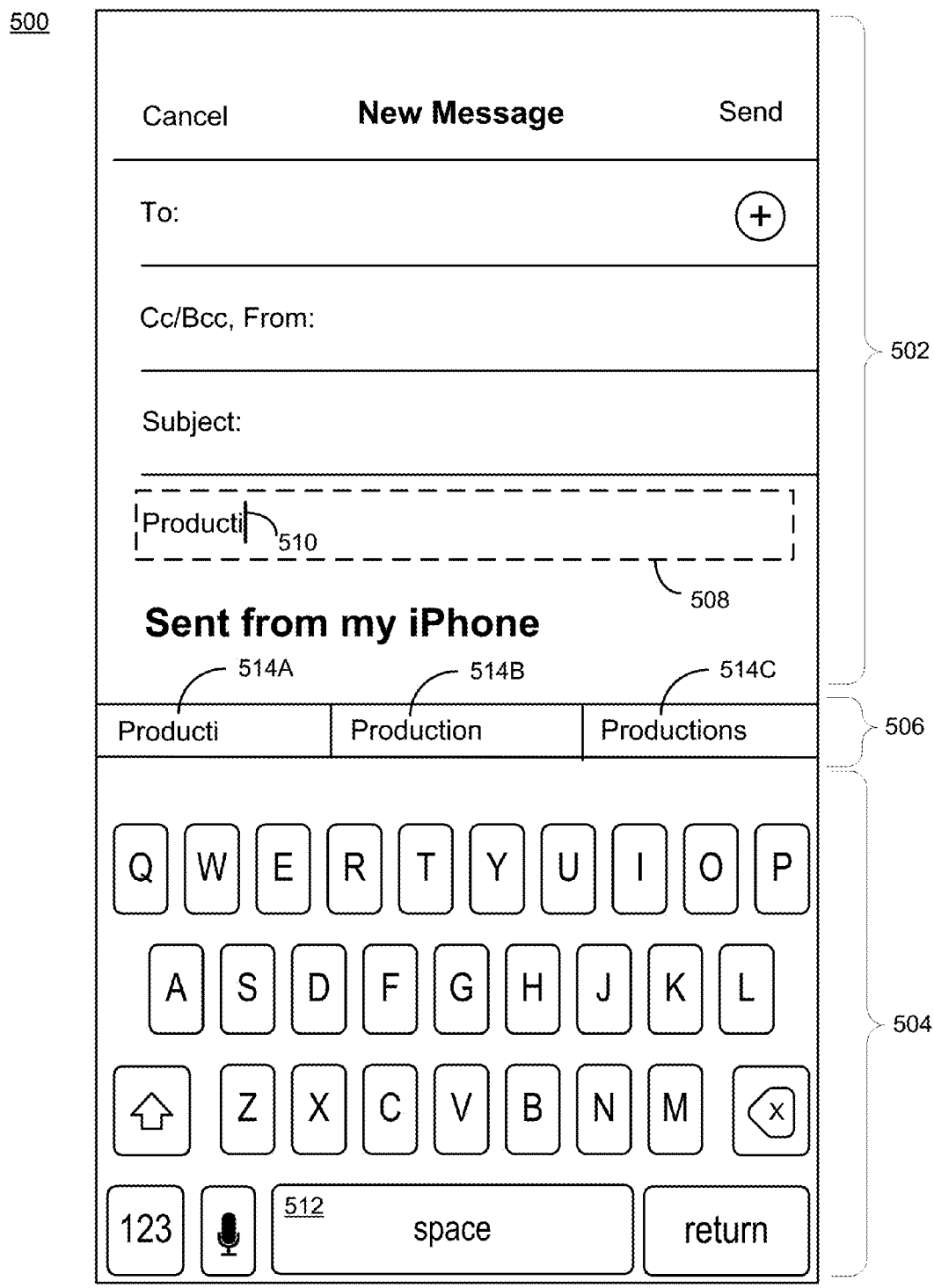
FIGS. 5A-5O illustrate exemplary user interfaces for inserting a character string into a text field in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
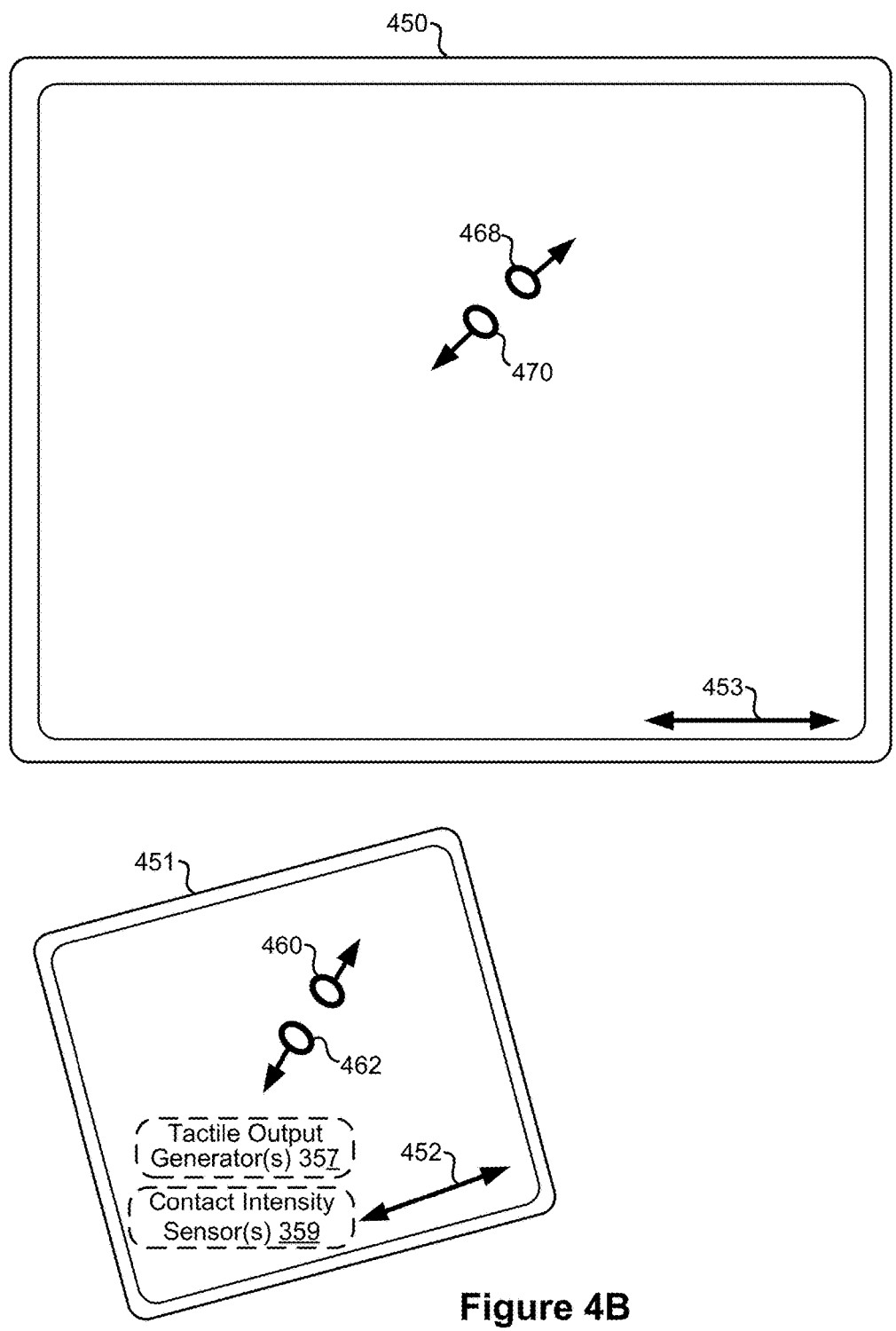
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5O illustrate exemplary user interfaces for inserting a character string into a text field in accordance with some embodiments. The user interfaces in these figures are used to illustrate the processes described below, including the process in FIG. 7.

FIGS. 5A-5O illustrate user interface 500, which can be displayed by, e.g., multifunction device 100. User interface 500 includes message region 502, on-screen keyboard region 504, and suggestion region 506. Message region 502 includes text field 508 and cursor 510. On-screen keyboard region 504 includes space bar 512. Suggestion region 506 includes multiple suggested character strings 514A, 514B, 514C (collectively, "suggested character strings 514"). In some embodiments, one or more of the multiple suggested character strings 514 is a prediction of a character string being entered in text field 508, an automatic correction of a character string being entered in text field 508, an automatic completion of a character string being entered in text field 508, or the character string that was just entered in text field 508. In the illustrated embodiment in FIG. 5A, suggestion region 506 is displayed above on-screen keyboard region 504, and the multiple suggested character strings 514 are arranged horizontally within suggestion region 506.

In FIG. 5A, text field 508 displays "Producti", which is a character string being entered in text field 508. Cursor 510 is located immediately after the "Producti" character string, indicating that this string is still being entered. (If cursor 510 were separated from the string by a delimiter character, such as a space or a period, then this would indicate that the character string is complete.) The suggested character strings ("Producti" 514A, "Production" 514B, and "Productions" 514C) are displayed in a left section, a middle section, and a right section of suggestion region 506, respectively. In the illustrated embodiment in FIG. 5A, suggested character string 514A ("Producti") is the character string that was just entered into text field 508, suggested character string 514B ("Production") is a best prediction of the character string being entered into text field 508, and suggested character string 514C ("Productions") is a second-best prediction of the character string being entered into text field 508.

Figure 5B:
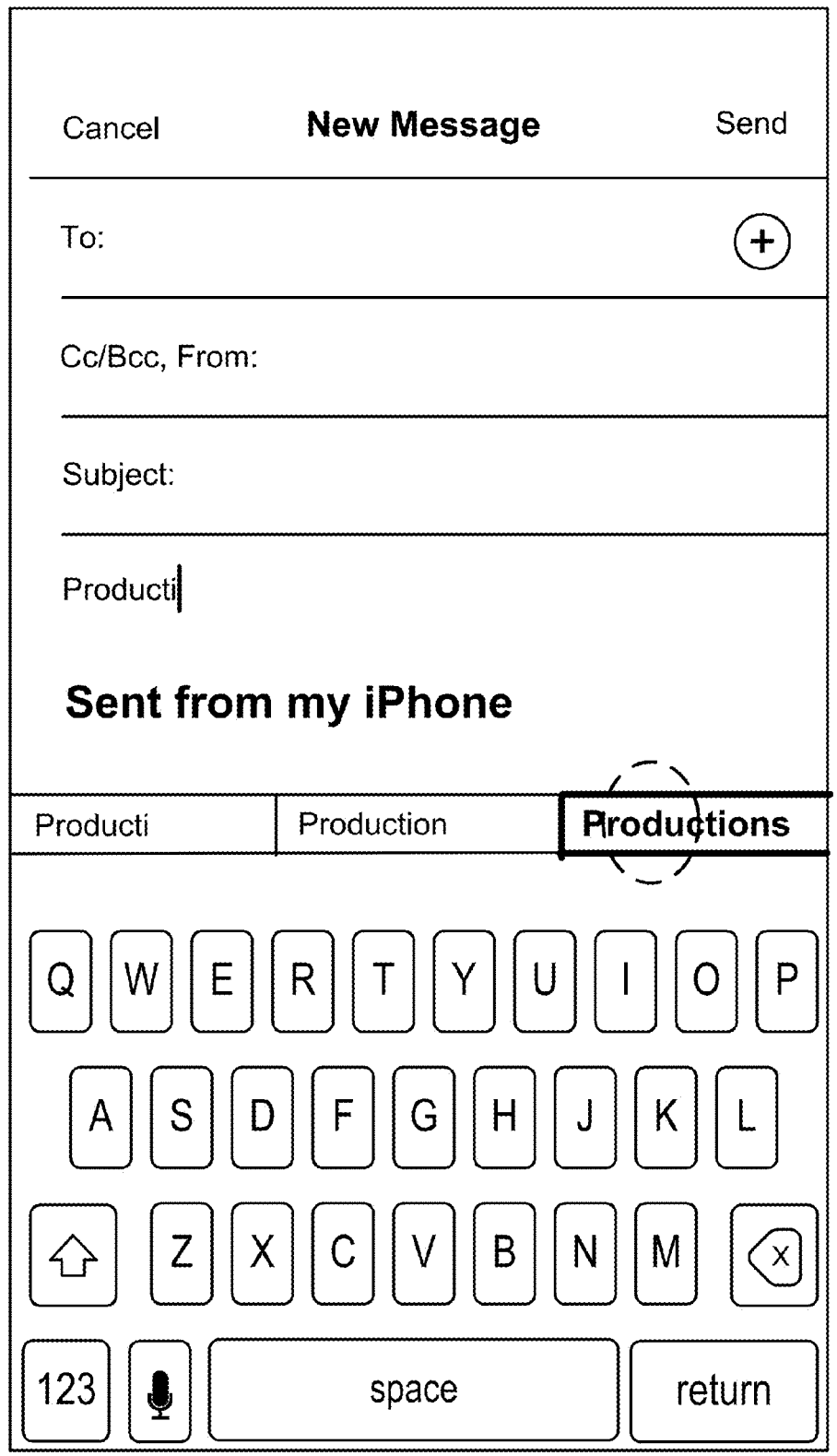

FIG. 5B illustrates an embodiment where the user provides a gesture input including a tap on touch screen 112. The location of the tap corresponds to the location of a suggested character string 514. In the illustrated embodiment in FIG. 5B, the location of the tap corresponds to the location of suggested character string 514C ("Productions"). In response to detecting the tap's finger-down event, multifunction device 100 visually distinguishes the suggested character string 514 at that location from the other suggested character strings. In the illustrated embodiment in FIG. 5B, multifunction device 100 visually distinguishes suggested character string 514C from suggested character strings 514A and 514B by increasing the font size of suggested character string 514C, changing the font style from plain to bold, and thickening the surrounding border. Other techniques for visually distinguishing a suggested character string 514 are possible. For example, multifunction device 100 can visually distinguish a suggested character string 514 by inverting the colors of the suggested character string 514 and its background (e.g., from black text on white background to white text on black background).

Figure 5C:
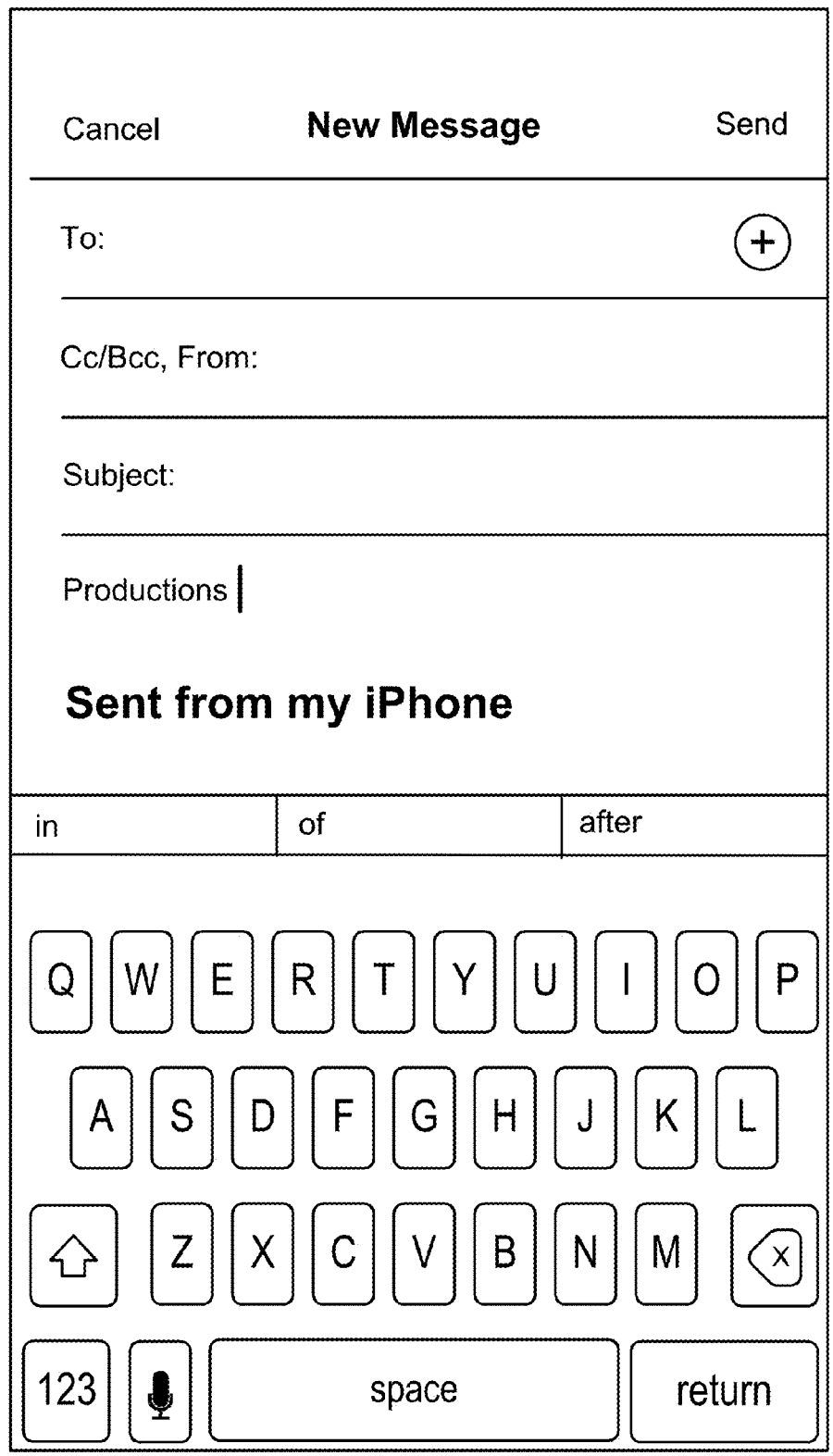

In response to detecting the tap's finger-up event, multifunction device 100 replaces the character string being entered in text field 508 (here, "Producti") with the suggested character string 514 at the tapped location (here, suggested character string 514C "Productions"). In some embodiments, multifunction device 100 also inserts a trailing space character into text field 508 after an inserted character string. This is shown in FIG. 5C. In FIG. 5C, text field 508 displays "Productions", followed by a space character (not visible). Since cursor 510 is separated from "Productions" by a delimiter character (here, a space), this indicates that the character string is complete. Suggestion region 506 includes multiple suggested character strings 514 for insertion into text field 508 (after "Productions" and the delimiter).

Figure 5D:
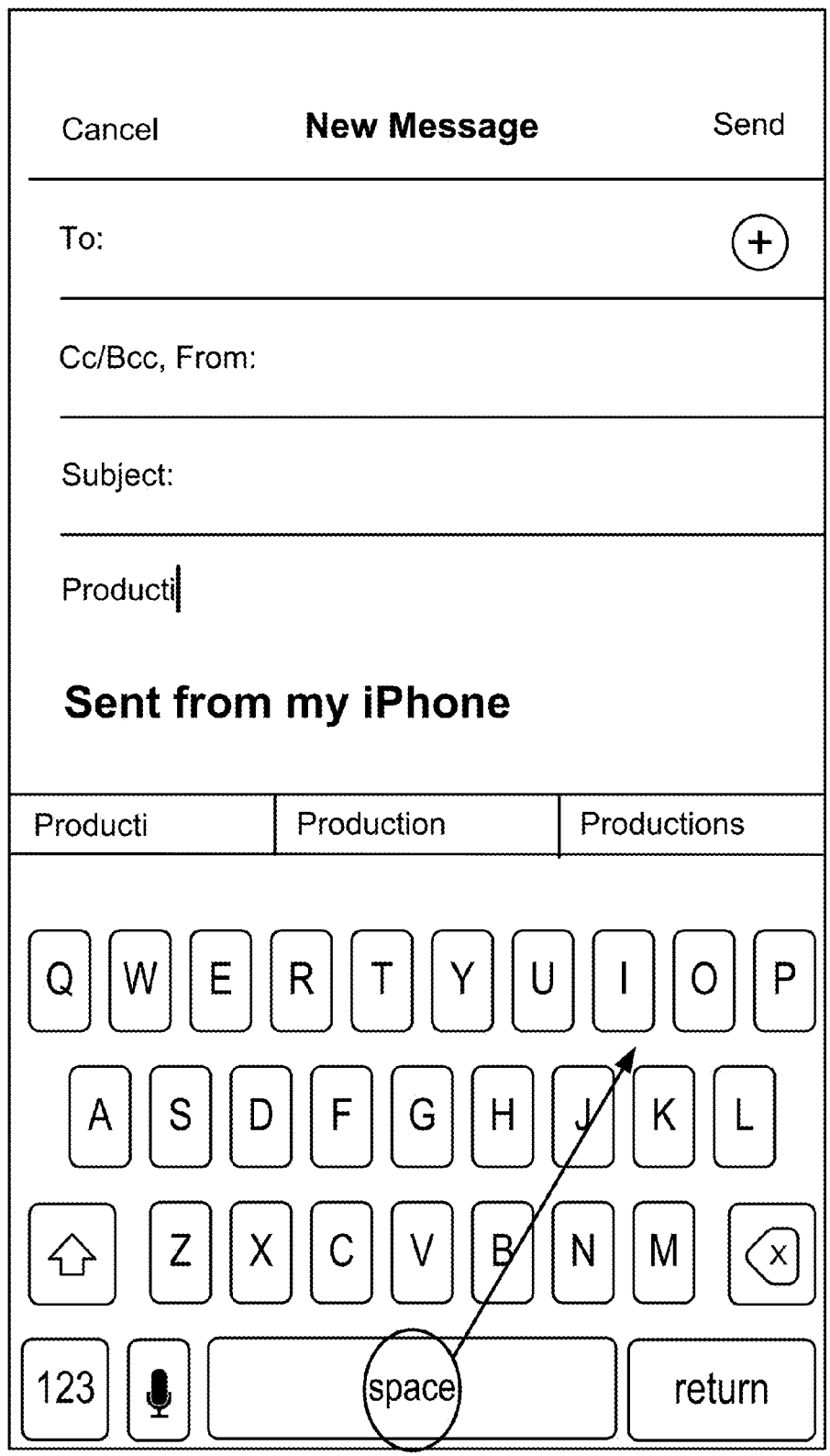

FIG. 5D illustrates an embodiment where the user provides a gesture input on touch screen 112 that begins within a predefined key within the on-screen keyboard region 504. In the illustrated embodiment in FIG. 5D, the predefined key is space bar 512, and multifunction device 100 detects a contact on space bar 512. However, other predefined keys and/or detected contacts are possible. In FIG. 5D, the gesture includes movement of a contact from a first location (within the predefined key) to a second location (outside the predefined key). In other words, the movement extends beyond the predefined key.

Figure 5E:
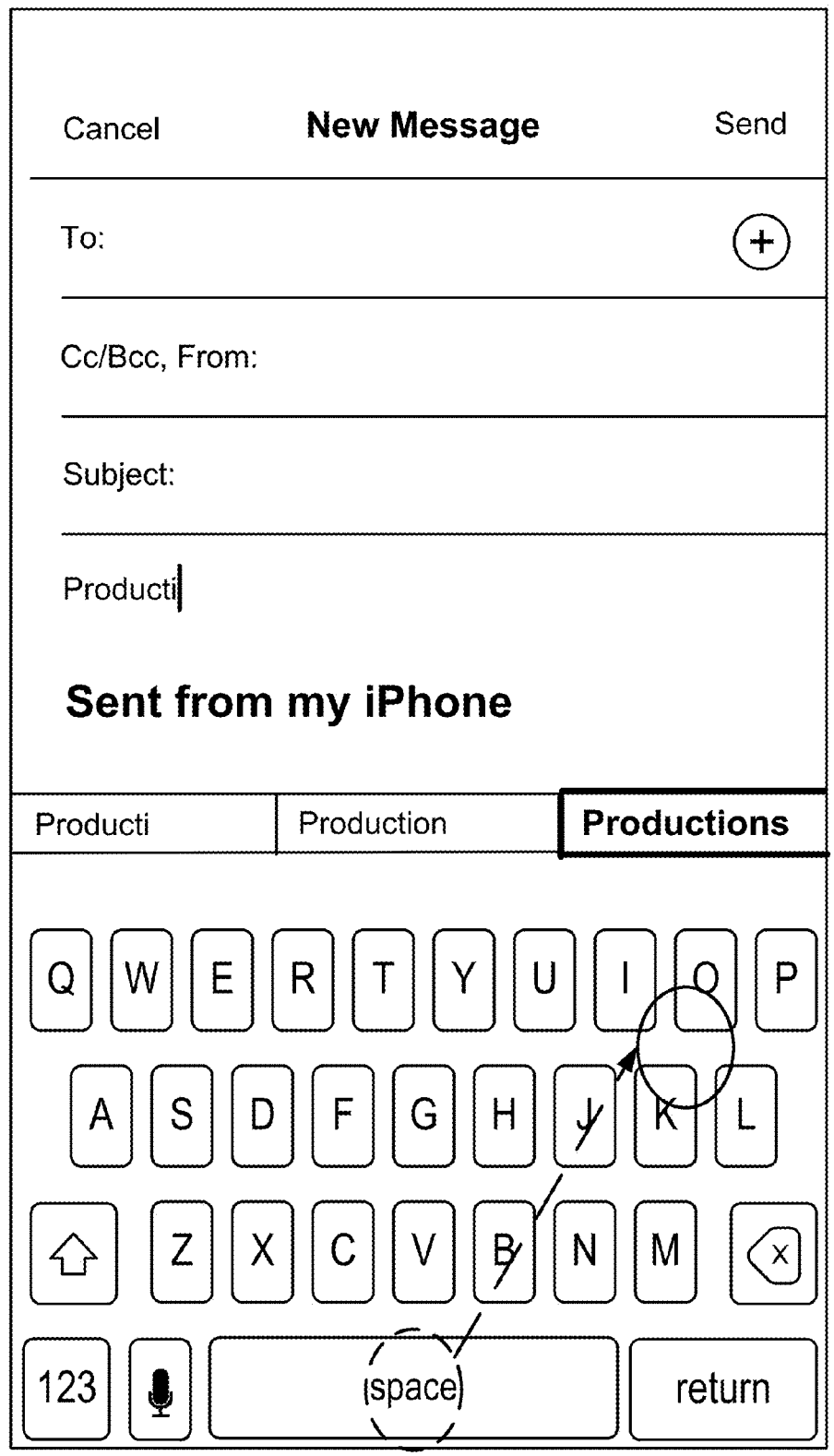

In response to detecting movement of the contact beyond the predefined key, multifunction device 100 visually distinguishes a suggested character string 514 corresponding to the termination point of the movement (the second location of the contact) from the other suggested character strings 514. This is shown in FIG. 5E. A movement's termination point corresponds to a particular section of suggestion region 506 (e.g., the termination point is directly above, below, or within a particular section of suggestion region 506). The suggested character string 514 that is displayed within that particular section corresponds to the termination point. In the illustrated embodiment in FIG. 5E, the termination point of the movement is directly below (and, therefore, corresponds to) the section in which suggested character string 514C ("Productions") is displayed.

The suggested character string 514 that corresponds to the termination point of the movement can be visually distinguished using various techniques, as described above with reference to FIG. 5B. In some embodiments, multifunction device 100 visually distinguishes the suggested character string 514 corresponding to the termination point of the movement by increasing the height of the section of suggestion region 506 that includes this suggested character string. This is shown in FIG. 5M, where the termination point of the movement is directly below (and, therefore, corresponds to) the section in which the "Everybody" suggested character string 514 is displayed. In the illustrated embodiment in FIG. 5M, the "Everybody" suggested character string 514 is visually distinguished by increasing the height of the section of suggestion region 506 that includes this suggested character string.

In some embodiments, visually distinguishing the suggested character string 514 includes changing a color, contrast, brightness, line width, or other visual property of the suggested character string or a section of suggestion region 506 that encompasses the suggested character string. In some embodiments, the amount of visual emphasis of the suggested character string 514 increases as the contact moves farther away from the predefined key. For example, the section of suggestion region 506 that includes the suggested character string 514 gets taller and/or darker as the contact moves away from the predefined key.

After moving the contact to the second location, the user then ends the gesture by providing liftoff of the contact (e.g., a finger-up event). For example, multifunction device 100 detects liftoff of the contact while the contact is outside the predefined key. In response to detecting the liftoff, multifunction device 100 determines that the gesture ended outside of the predefined key. As a result of this determination, multifunction device 100 inserts a character string into text field 508 (e.g., one of the multiple suggested character strings 514). In some embodiments, multifunction device 100 further determines that the gesture corresponds to a particular section of suggestion region 506 (e.g., the gesture's liftoff location is directly above, below, or within a particular section of the suggestion region 506). As a result of this determination, multifunction device 100 inserts into text field 508 the suggested character string 514 displayed within that particular section of suggestion region 506. In some embodiments, the suggested character string 514 displayed within that particular section is inserted regardless of whether that suggested character string is an automatic correction. In some embodiments, inserting the character string replaces the character string that was being entered in text field 508. In the illustrated embodiment, the gesture's liftoff location corresponds to suggested character string 514C, so multifunction device 100 replaces the character string being entered in text field 508 ("Producti") with character string 514C ("Productions"), as described above with reference to FIG. 5C.

Referring again to the examples of FIGS. 5E and 5M and adding on, the user continues the gesture by moving the contact back within the predefined key. In response to detecting movement of the contact into the predefined key, multifunction device 100 ceases to visually distinguish the suggested character string 514 (that corresponded to the termination point of the previous movement) from the other suggested character strings 514. In some embodiments, where the visual emphasis of the suggested character string changes based on the distance between the contact and the predefined key, as the contact moves toward the predefined key, the visual emphasis decreases until the contact enters the predefined key and the visual emphasis is nonexistent.

Figure 5F:
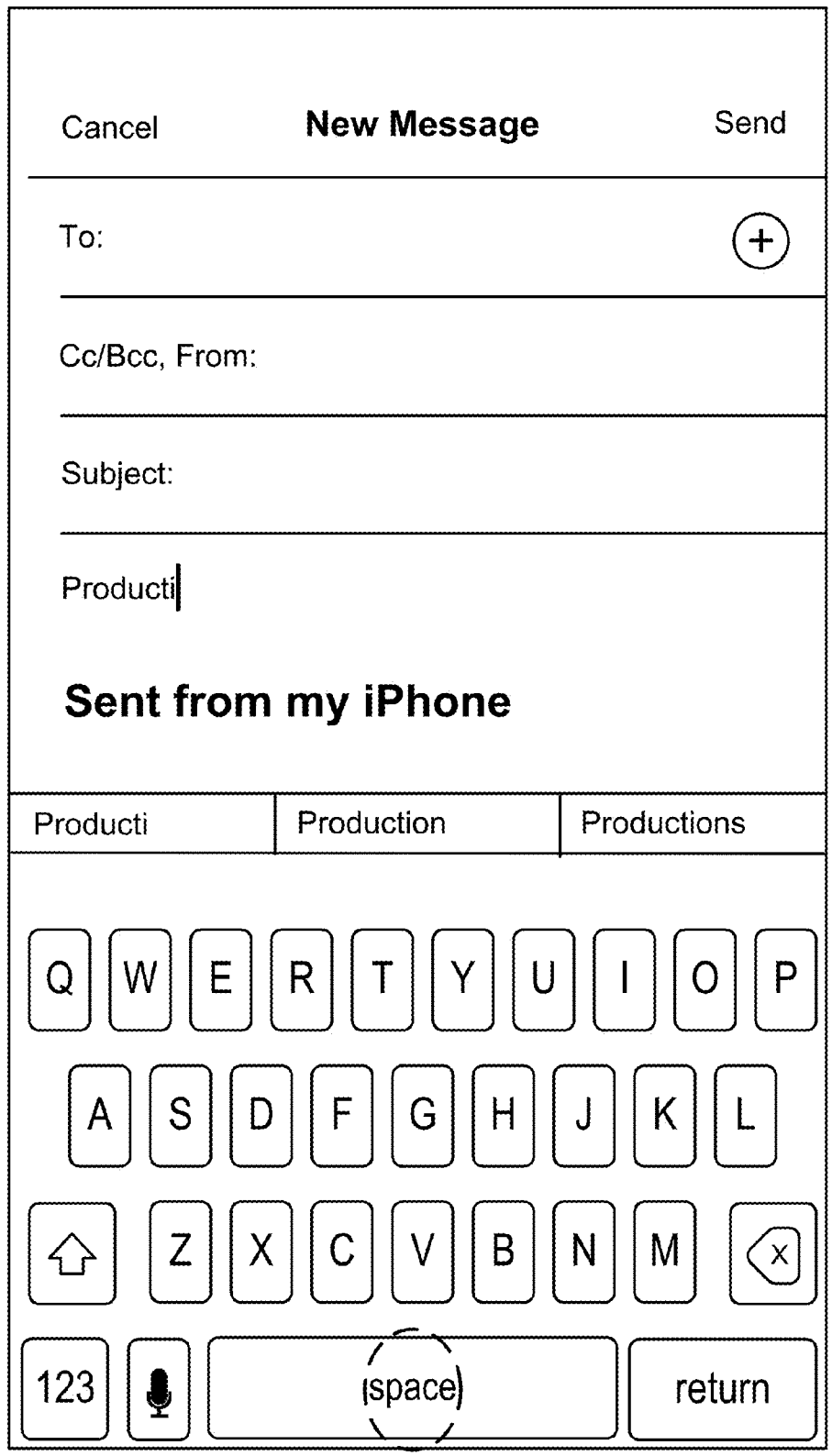

FIG. 5F illustrates an embodiment where the user provides a gesture input on touch screen 112 that begins within a predefined key within the on-screen keyboard region 504. In the illustrated embodiment in FIG. 5F, the predefined key is space bar 512, and multifunction device 100 detects a contact on space bar 512. However, other predefined keys and/or detected contacts are possible. In FIG. 5F, the gesture optionally includes movement of a contact from a first location to a second location, where both locations are within the predefined key. (This is different from FIG. 5D, where the second location was outside the predefined key.) If the gesture includes no movement, then the gesture is essentially a tap on the predefined key.

Figure 5G:
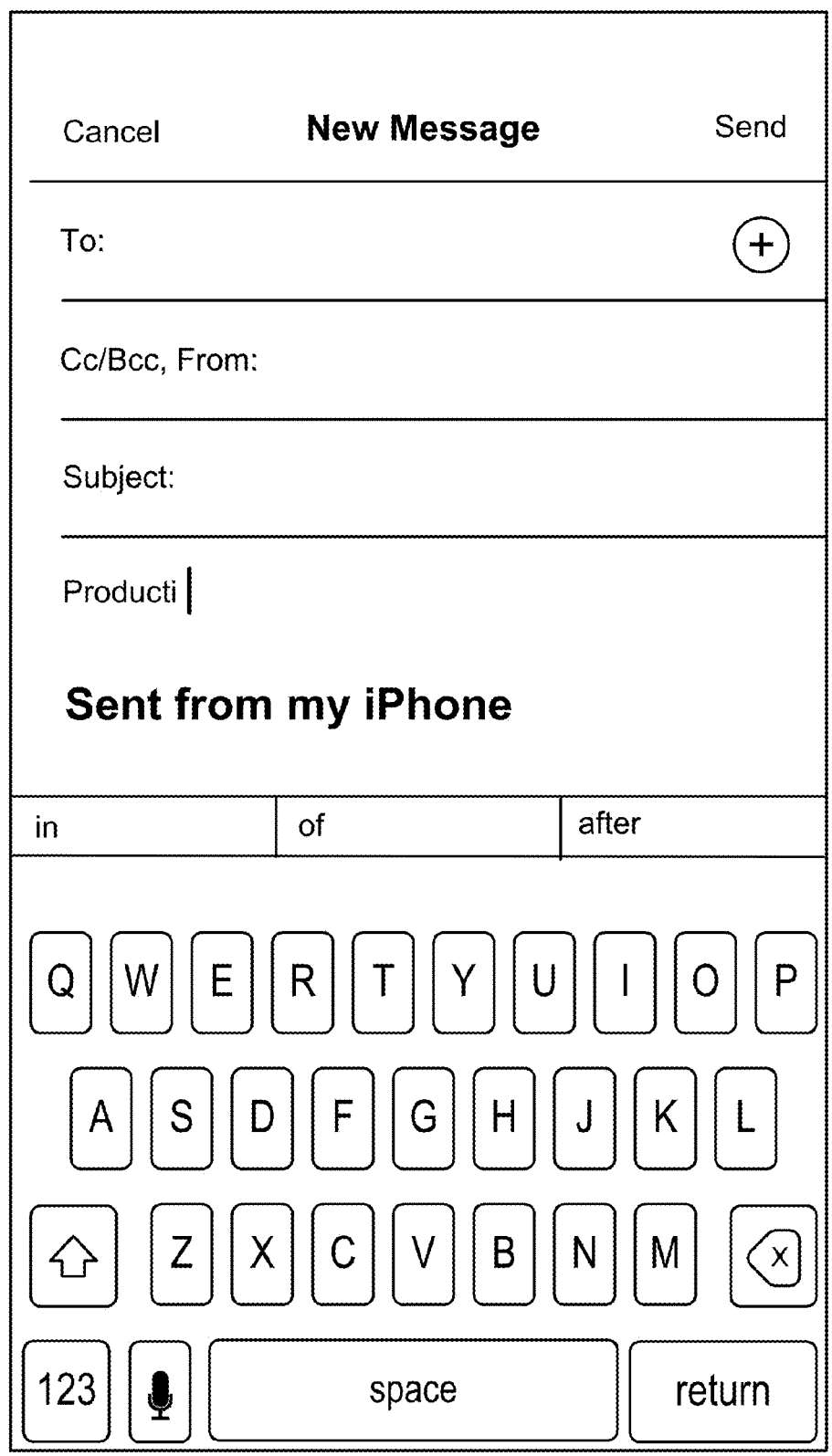

After optionally moving the contact to the second location, the user then ends the gesture by providing liftoff of the contact (e.g., a finger-up event). For example, multifunction device 100 detects liftoff of the contact while the contact is on the predefined key. In the illustrated embodiment in FIG. 5F, the second location is within the predefined key. In response to detecting the liftoff, multifunction device 100 determines that the gesture ended within the predefined key. As a result of this determination, multifunction device 100 inserts a character string into text field 508. This is shown in FIG. 5G. In the illustrated embodiment in FIG. 5G, the inserted character string is a space character. However, other inserted character strings are possible. In FIG. 5G, text field 508 displays "Producti", followed by the inserted space character (not visible). Since cursor 510 is separated from "Producti" by a delimiter character (here, a space), this indicates that the character string is complete. Suggestion region 506 includes multiple suggested character strings 514 for insertion into text field 508 (after "Producti" and the delimiter).

In some embodiments, a character string that is inserted when the gesture ends within the predefined key differs from a character string that is inserted when the gesture ends outside of the predefined key. For example, the character string that is inserted when the gesture ends within the predefined key is a space character, while the character string that is inserted when the gesture ends outside of the predefined key is one of the multiple suggested character strings 514.

Figure 5H:
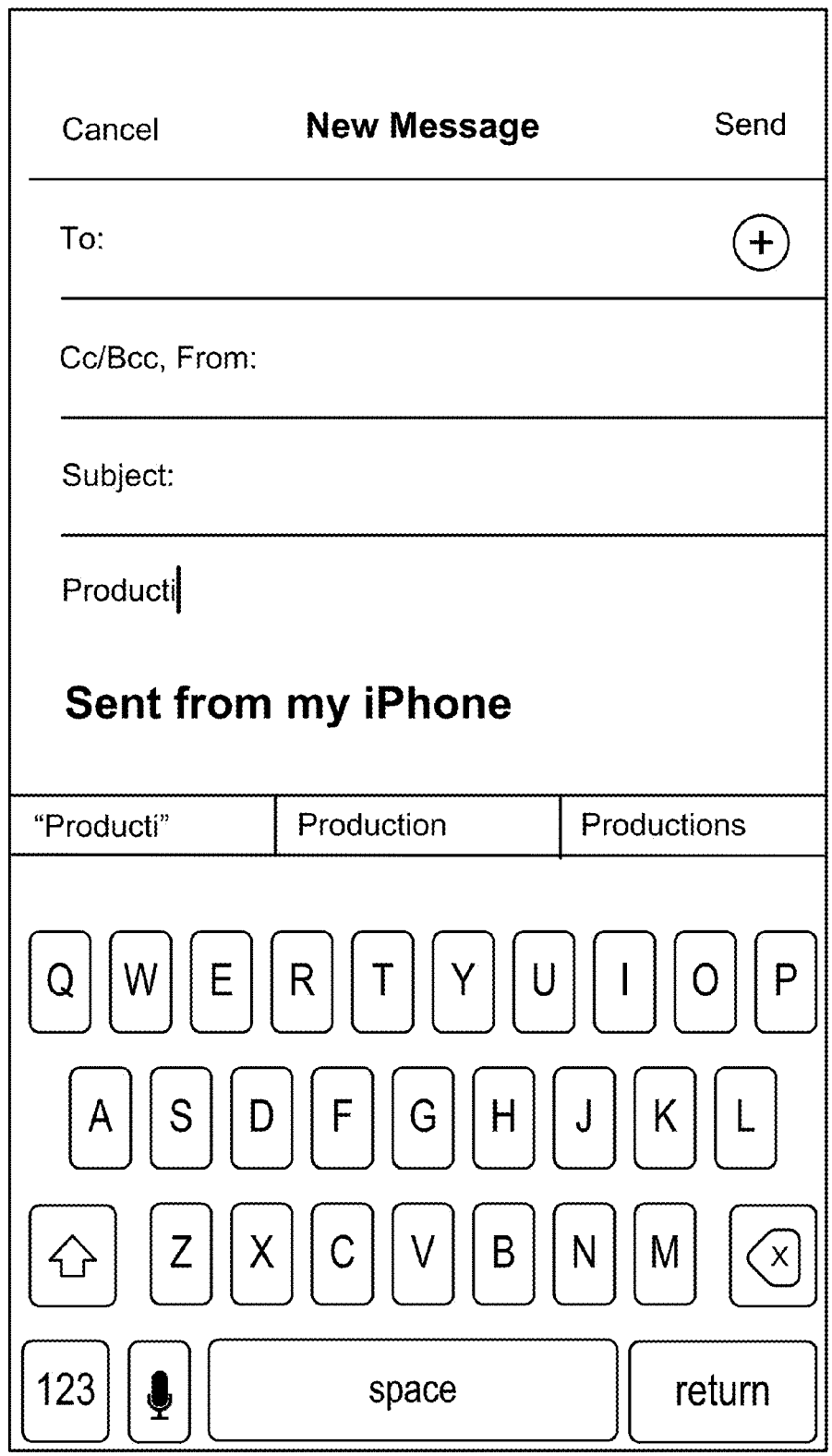
Figure 5I:

Recall that, in some embodiments, one of the multiple suggested character strings 514 is the character string that was just entered in text field 508. In some embodiments, this character string is displayed within quotation marks in suggestion region 506. This is shown in FIG. 5H, where the character string that was just entered in text field 508 is "Producti", and one of the multiple suggested character strings 514 is also "Producti". In FIG. 5H, the Producti character string is displayed within quotation marks in suggestion region 506. The quotation marks notify the user that the enclosed character string is identical to the character string that was just entered in text field 508.

Figure 5J:
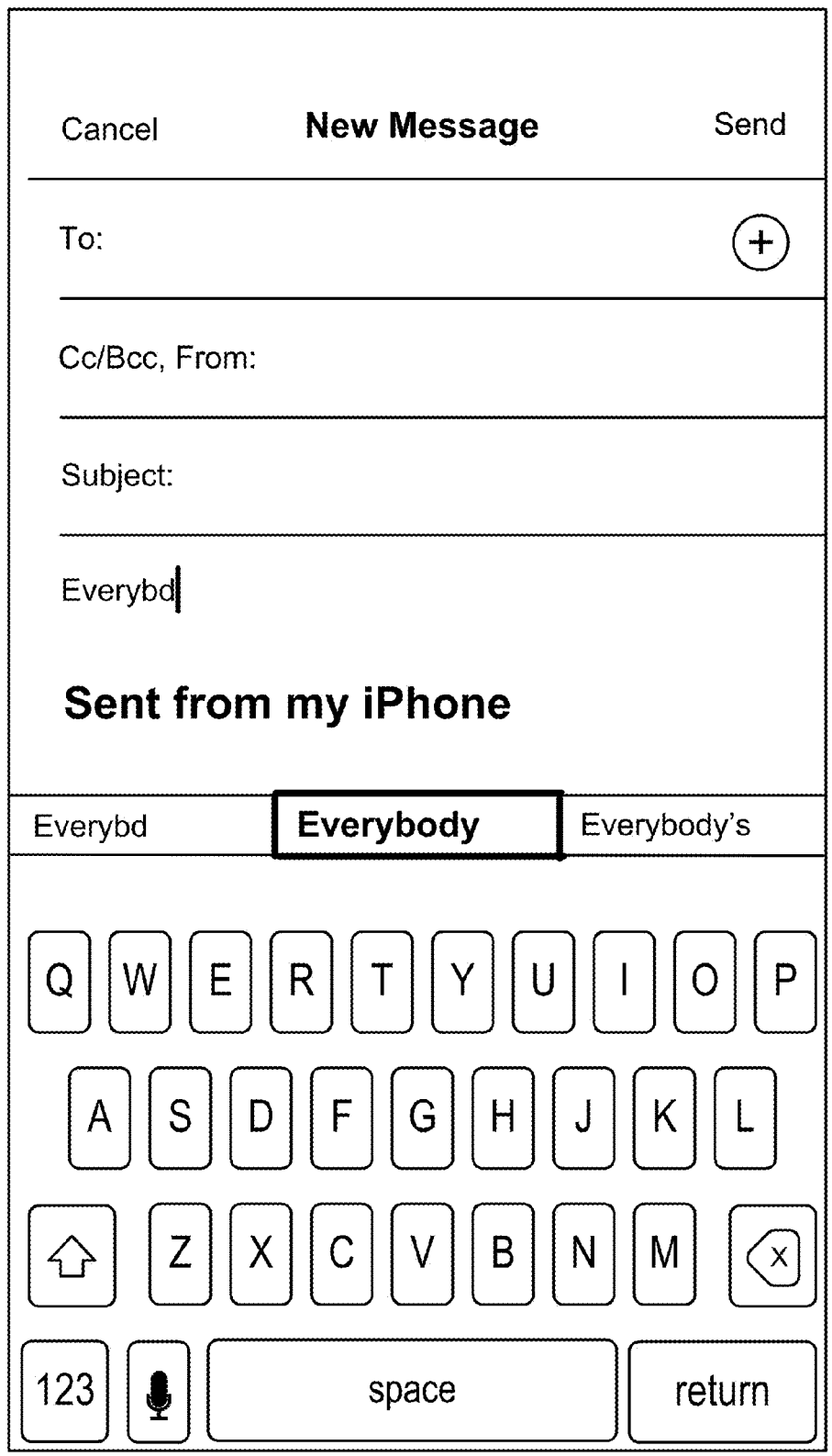

Recall that, in some embodiments, one of the multiple suggested character strings 514 is an automatic correction of a character string being entered in text field 508. In Figure SI, the character string being entered in text field 508 is "Everybd". One of the multiple suggested character strings 514 is "Everybody", which is an automatic correction of "Everybd". In some embodiments, the automatic correction is displayed in the middle of the multiple suggested character strings 514 and/or is visually distinguished from other suggested character strings that are not automatic corrections. This is shown in FIG. 5J, where the "Everybody" suggested character string 514 is located in the middle of the multiple suggested character strings 514 and is visually distinguished from the other suggested character strings ("Everybd" and "Everybody's"). The visual distinction notifies the user that the distinguished character string is an automatic correction of the character string being entered in text field 508. The automatic correction can be visually distinguished using various techniques, as described above with reference to FIG. 5B.

Figure 5K:
Figure 5L:
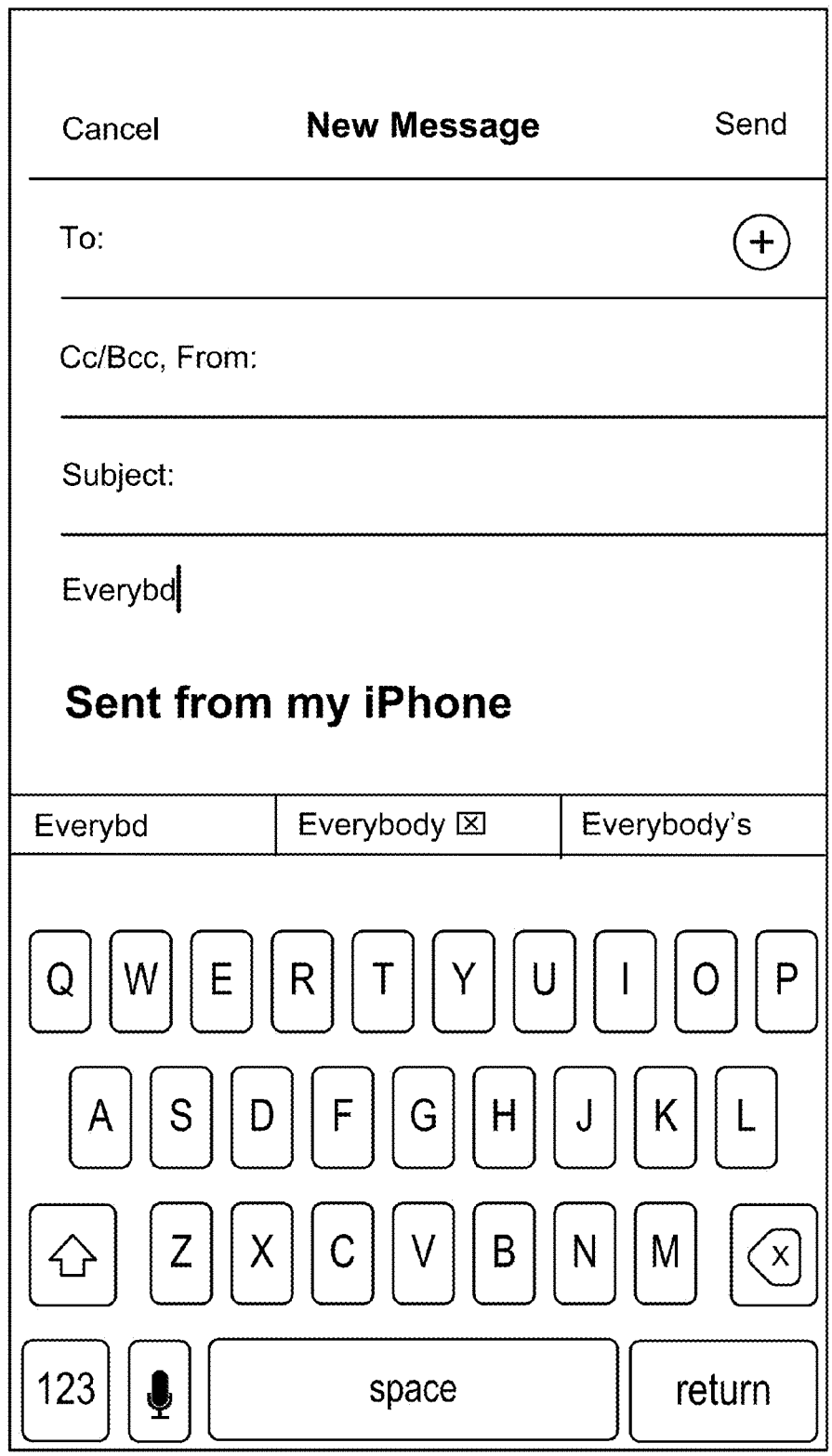
Figure 5M:
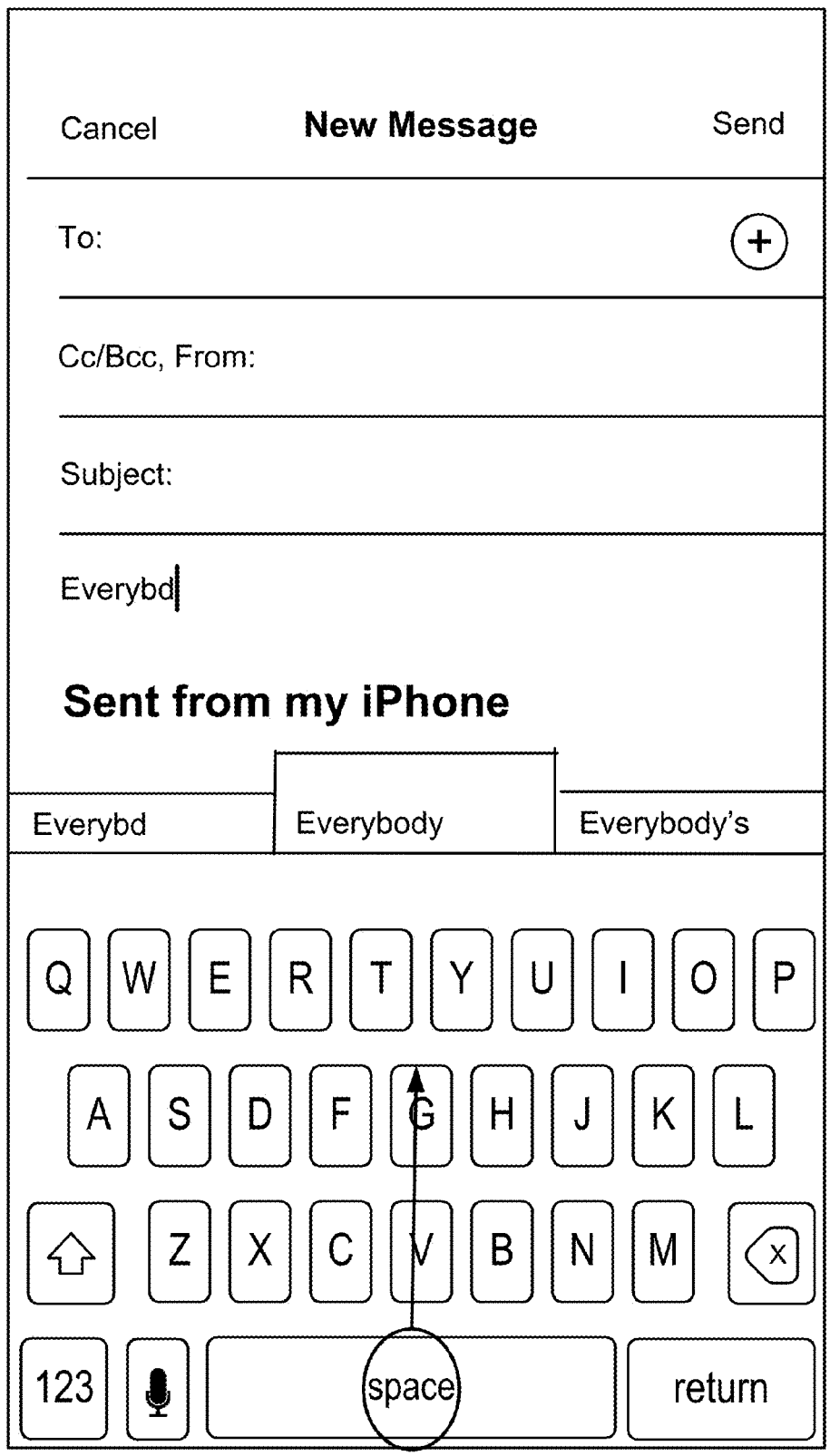

In some embodiments, the automatic correction is displayed within the predefined key (mentioned above) that can be used to insert a character string into text field 508. This is shown in the example illustrated in FIG. 5K, where the predefined key is space bar 512, and the automatic correction is "Everybody". In some embodiments, a graphical user interface (GUI) element is displayed adjacent to the automatic correction. This is shown in FIG. 5L, where the GUI element is an "x" inside a box, and the automatic correction is "Everybody". When the GUI element is activated, the automatic correction is rejected. In some embodiments, when the automatic correction is rejected, the automatic correction is replaced with a different suggested character string from suggestion region 506.

Note that, in some embodiments, no automatic corrections are presented to the user. For example, when the user has not typed any characters or has typed only a few (e.g., one or two) characters in a current character string, then no automatic correction results are suggested. However, automatic completion results could still be suggested in these situations.

Figure 5N:
Figure 5O:

Recall that, in FIG. 5M, the termination point of the movement is directly below (and, therefore, corresponds to) the section in which the "Everybody" suggested character string 514 is displayed. In the illustrated embodiment in FIG. 5M, the "Everybody" suggested character string 514 is visually distinguished by increasing the height of the section of suggestion region 506 that includes this suggested character string. Adding on to this example, the user continues the gesture by moving the contact point toward a first side of suggestion region 506. This is shown in FIG. 5N, where the first side is the right side, and the termination point of the continued movement is directly below (and, therefore, corresponds to) the section on the first side (here, the right side) in which the "Everybody's" suggested character string 514 is displayed. In response to detecting this gesture, the suggested character string 514 in the first side section is visually distinguished. In the illustrated embodiment in FIG. 5N, the "Everybody's" suggested character string 514 is visually distinguished by increasing the height of the section of suggestion region 506 that includes this suggested character string. Together, FIGS. 5M and 5N show an upward swipe that starts within the predefined key and moves outside the predefined, followed by a swipe to a first side (here, the right side, but the left side would yield similar results).

The user then ends the gesture by providing liftoff of the contact (e.g., a finger-up event). For example, multifunction device 100 detects liftoff of the contact while the contact is directly below the section in which the "Everybody's" suggested character string 514 is displayed. In response to detecting the liftoff, multifunction device 100 determines that the gesture ended outside the predefined key and further determines that the gesture corresponds to a particular section of suggestion region 506. As a result of these determinations, multifunction device 100 inserts the "Everybody's" suggested character string 514 into text field 508. This is shown in FIG. 5O. In FIG. 5O, text field 508 displays "Everybody's", followed by a trailing space character (not visible). Suggestion region 506 includes multiple suggested character strings 514 for insertion into text field 508 (after "Everybody's" and the delimiter).

FIGS. 6A-6L illustrate exemplary user interfaces for updating a set of one or more suggestions in a suggestion region in accordance with some embodiments. The user interfaces in these figures are used to illustrate the processes described below, including the process in FIG. 8.

FIGS. 6A-6L illustrate user interface 600, which can be displayed by, e.g., multifunction device 100. User interface 600 includes message region 602, on-screen keyboard region 604, and suggestion region 606. Message region 602 includes text field 608 and cursor 610. On-screen keyboard region 604 includes space bar 612. Suggestion region 606 includes multiple suggested character strings 614A, 614B, 614C (collectively, "suggested character strings 614"). In some embodiments, one or more of the multiple suggested character strings 614 is a prediction of a character string being entered in text field 608, an automatic correction of a character string being entered in text field 608, an automatic completion of a character string being entered in text field 608, or the character string that was just entered in text field 608. In the illustrated embodiment in FIG. 6A, suggestion region 606 is displayed above on-screen keyboard region 604, and the multiple suggested character strings 614 are arranged horizontally within suggestion region 606.

Figure 6A:
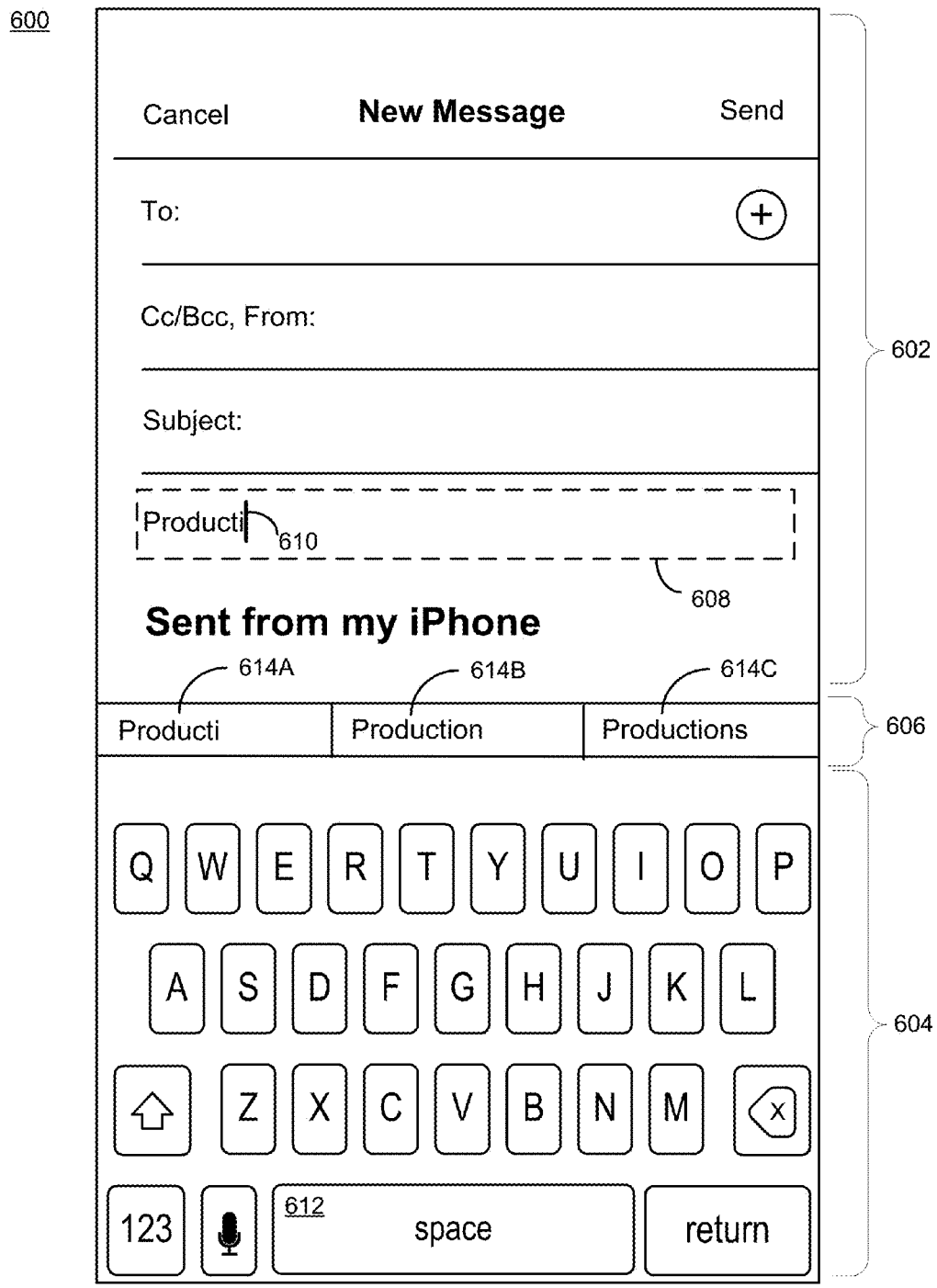
FIGS. 6A-6L illustrate exemplary user interfaces for updating a set of one or more suggestions in a suggestion region in accordance with some embodiments.

In FIG. 6A, text field 608 displays "Producti", which is a character string being entered in text field 608. Cursor 610 is located immediately after the "Producti" character string, indicating that this string is still being entered. (If cursor 610 were separated from the string by a delimiter character, such as a space or a period, then this would indicate that the character string is complete.) The suggested character strings ("Producti" 614A, "Production" 614B, and "Productions" 614C) are displayed in a left section, a middle section, and a right section of suggestion region 606, respectively. In the illustrated embodiment in FIG. 6A, suggested character string 614A ("Producti") is the character string that was just entered into text field 608, suggested character string 614B ("Production") is a best prediction of the character string being entered into text field 608, and suggested character string 614C ("Productions") is a second-best prediction of the character string being entered into text field 608.

Multifunction device 100 receives one or more entered characters. After receiving the one or more entered characters, multifunction device 100 displays suggestion region 606. Suggestion region 606 includes a set of one or more suggestions including one or more character strings. The character strings start with the one or more entered characters. This is shown in FIG. 6A, where the entered characters are "Producti" and the character strings are "Producti" 614A, "Production" 614B, and "Productions" 614C.

While displaying the set of one or more suggestions, multifunction device 100 receives one or more additional entered characters. Responsive to receiving the one or more additional entered characters, multifunction device 100 updates the set of suggestions 614. In some embodiments, multifunction device 100 ceases updating the set of suggestions 614 if the user is typing quickly (e.g., more than 2.2 characters per second). Before the user reaches the threshold speed, the suggestions change every time a character is entered. After the user reaches the threshold speed, there are no updates (e.g., on the theory that the user is not looking at the suggestions if the user is typing that fast). In some embodiments, "no updates" means that the suggestions are frozen, are hidden, or fade out. The automatic suggestion update can require a significant amount of device power. Ceasing to update the set of suggestions 614 if the user is typing quickly (and, presumably, not looking at the suggestions) is an optimization that saves device power.

The updating comprises changing a first suggestion in the set of one or more suggestions from a first character string to a second character string. This changing comprises, while maintaining display of a first portion of the first character string, ceasing to display a second portion of the first character string that is incompatible with the one or more additional entered characters. In some embodiments, the first portion of the first character string is the one or more entered characters.

Figure 6B:

This is shown in FIG. 6B, where the one or more additional entered characters is "v", the first character string is "Production" (suggested character string 614B), the first portion of the first character string is "Producti", and the second portion of the first character string is "on". Originally, in FIG. 6A, the entered characters were "Producti", so the suggested character strings were "Producti" 614A, "Production" 614B, and "Productions" 614C. Then, one additional entered character was received, "v". That changed the text string being entered to "Productiv", which is incompatible with "Production". Responsive to receiving "v", multifunction device 100 maintained display of the first portion ("Producti") of the first character string ("Production") and ceased to display the second portion of the first character string ("on").

In some embodiments, the ceasing to display the second portion of the first character string is performed by instantly removing the second portion from display. In some embodiments, the ceasing to display the second portion is performed by showing an animation that gradually ceases to display the second portion over time. One example of such an animation is a "type-off" animation, where the second portion is removed character-by-character (e.g., starting with the character at the end of the first character string). Another example of such an animation is a fade out animation, where the second portion fades out over time. Yet another example of such an animation is a shrinking animation, where the second portion decreases in size over time. Additional examples of animations for replacing one character string with another character string are described below with reference to FIGS. 9A-9O and 10.

Figure 6C:
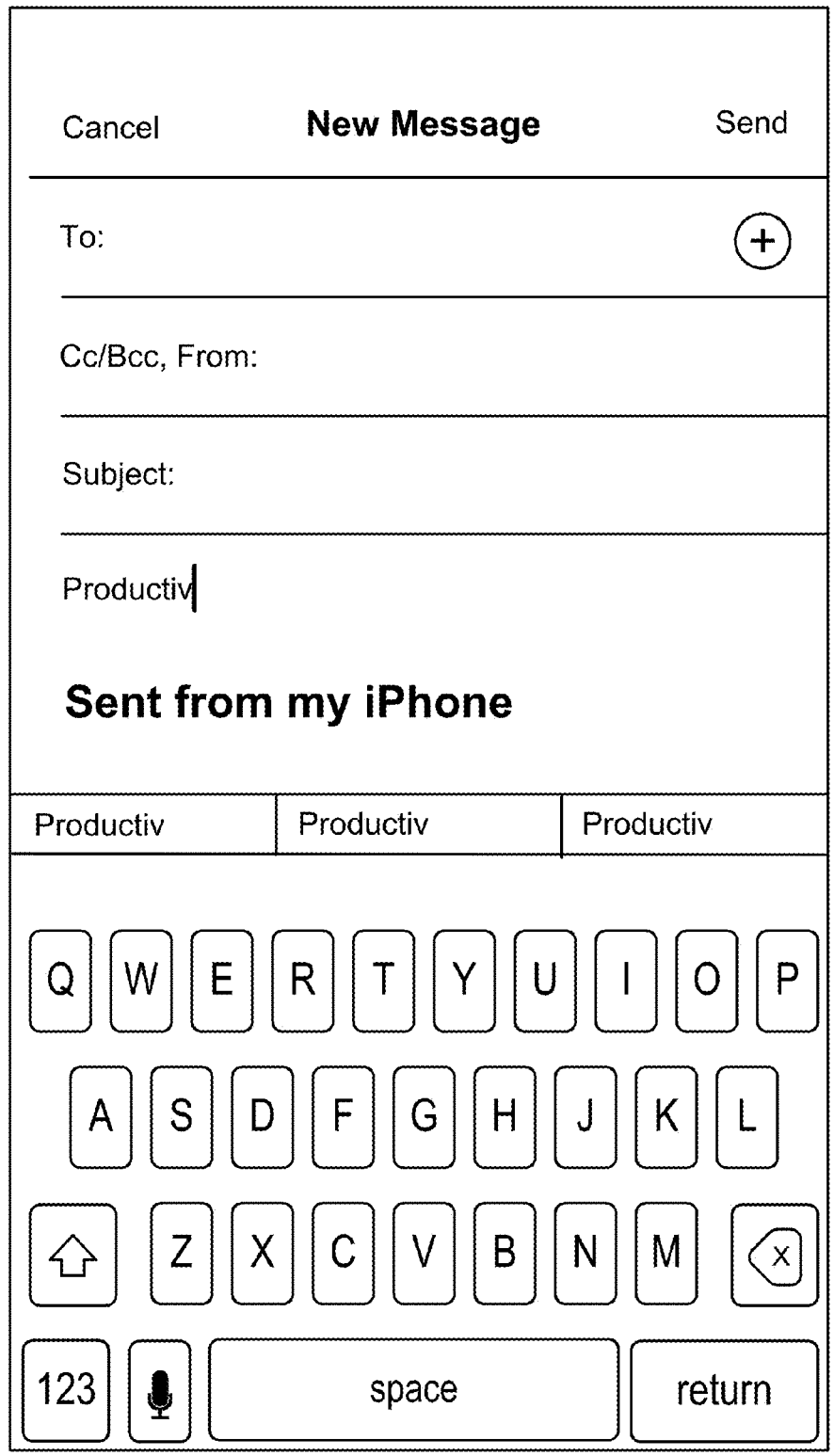

Changing the first suggestion in the set of one or more suggestions from the first character string to the second character string further comprises, while maintaining display of the first portion of the first character string, adding the one or more additional entered characters to the first portion of the first character string. This is shown in FIG. 6C, where the one or more additional entered characters is "v", and the first portion of the first character string is "Producti". The multifunction device 100 adds the additional entered character, "v", to "Producti" to form "Productiv", as shown in FIG. 6C.

In some embodiments, the adding the one or more additional entered characters to the first portion of the first character string is performed by instantly adding the one or more additional entered characters to the display. In some embodiments, the adding the one or more additional entered characters to the first portion is performed by showing an animation that gradually displays the one or more additional entered characters over time.

Figure 6D:
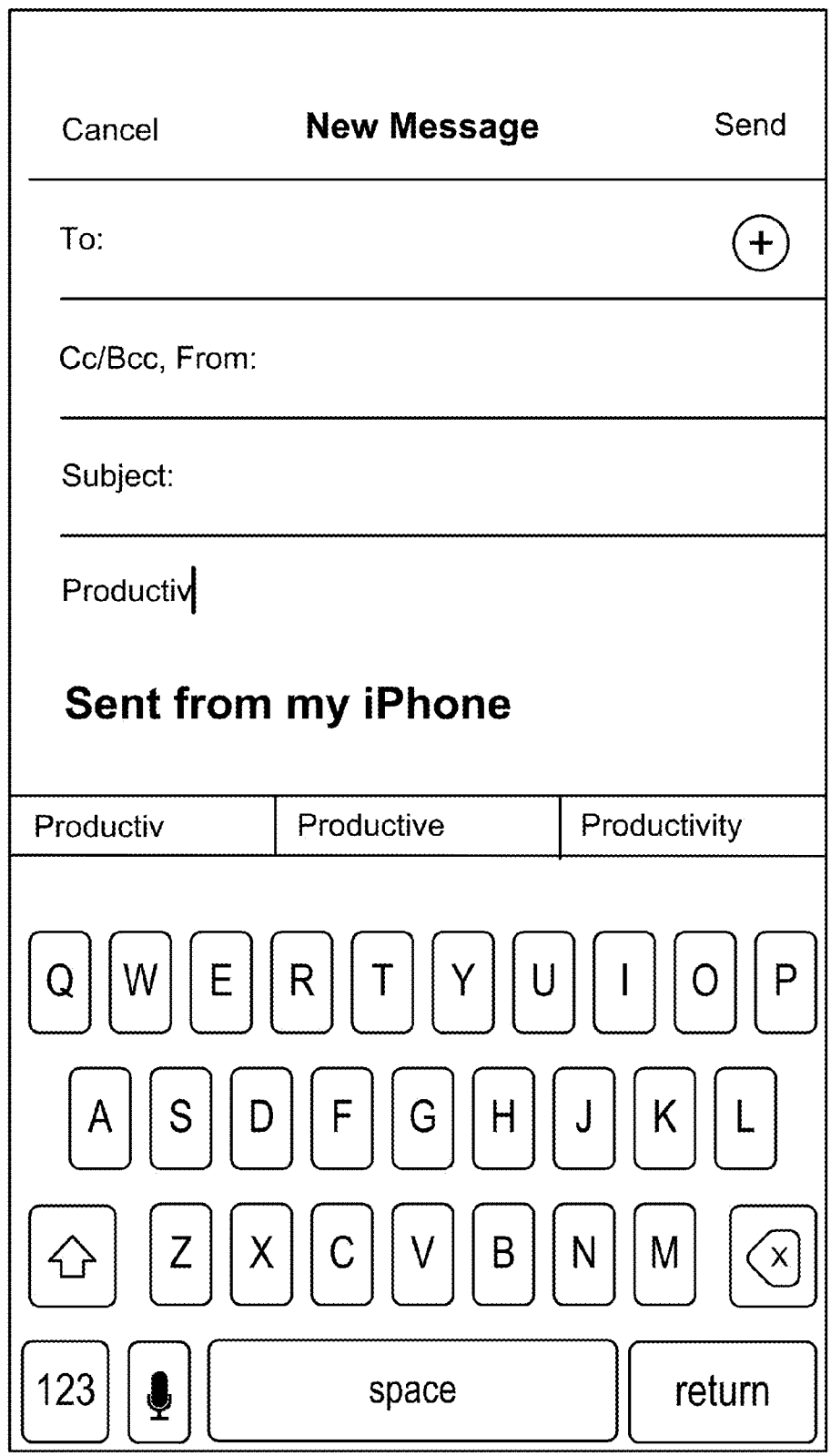

Changing the first suggestion in the set of one or more suggestions from the first character string to the second character string further comprises, while maintaining display of the first portion of the first character string, adding a first set of one or more predicted characters to the first portion of the first character string to display the second character string. This is shown in FIG. 6D, where the first set of one or more predicted characters is "e", the first portion of the first character string is "Productiv", and the second character string is "Productive". The multifunction device 100 adds the predicted character, "e", to "Productiv" to form "Productive", as shown in FIG. 6D.

In some embodiments, the adding the first set of one or more predicted characters to the first portion of the first character string is performed by instantly adding the first set of one or more predicted characters to the display. In some embodiments, the adding the first set of one or more predicted characters to the first portion is performed by showing an animation that gradually displays the first set of one or more predicted characters over time. One example of such an animation is a "type-on" animation, where the first set of one or more predicted characters is displayed character-by-character (e.g., starting with the character after the end of the first portion of the first character string). Another example of such an animation is a fade in animation, where the first set of one or more predicted characters fades in over time. Yet another example of such an animation is an enlarging animation, where the first set of one or more predicted characters increases in size over time. Additional examples of animations for replacing one character string with another character string are described below with reference to FIGS. 9A-9O and 10.

In some embodiments, the animation for adding the additional entered characters to the first suggestion differs from the animation for adding the predicted characters to the first suggestion. For example, the additional entered characters are added to the first portion of the first character string as soon as the second portion of the first character string ceases to be displayed. Then, the one or more predicted characters appear over time.

In some embodiments, multifunction device 100 also changes a second suggestion in the set of one or more suggestions from a third character string to a fourth character string. This changing comprises, while maintaining display of a first portion of the third character string, ceasing to display a second portion of the third character string that is incompatible with the one or more additional entered characters.

This is shown in FIG. 6B, where the one or more additional entered characters is "v", the third character string is "Productions" (suggested character string 614C), the first portion of the third character string is "Producti", and the second portion of the third character string is "ons". Responsive to receiving "v", multifunction device 100 maintained display of the first portion ("Producti") of the third character string ("Productions") and ceased to display the second portion of the third character string ("ons").

Changing the second suggestion in the set of one or more suggestions from the third character string to the fourth character string further comprises, while maintaining display of the first portion of the third character string, adding the one or more additional entered characters to the first portion of the third character string. This is shown in FIG. 6C, where the one or more additional entered characters is "v", and the first portion of the third character string is "Producti". The multifunction device 100 adds the additional entered character, "v", to "Producti" to form "Productiv", as shown in FIG. 6C.

Changing the second suggestion in the set of one or more suggestions from the third character string to the fourth character string further comprises, while maintaining display of the first portion of the third character string, adding a second set of one or more predicted characters to the first portion of the third character string to display the fourth character string. This is shown in FIG. 6D, where the second set of one or more predicted characters is "ity", the first portion of the third character string is "Productiv", and the fourth character string is "Productivity". The multifunction device 100 adds the predicted characters, "ity", to "Productiv" to form "Productivity", as shown in FIG. 6D.

In some embodiments, the first suggestion and the second suggestion are changed substantially simultaneously or concurrently (e.g., as the first suggestion is changing, the second suggestion is changing as well).

Figure 6E:
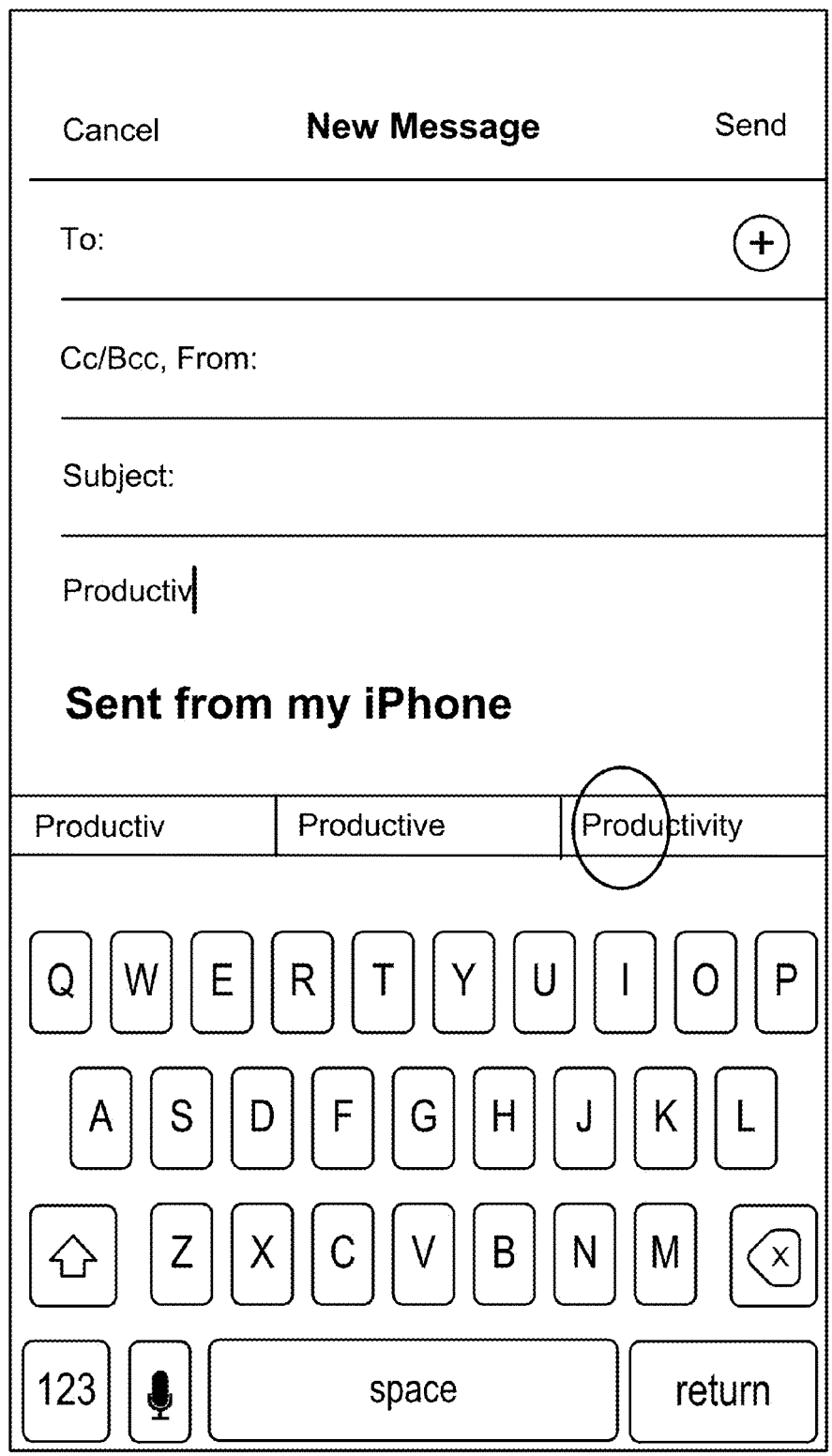

Continuing with the scenario in FIG. 6D, FIG. 6E illustrates an embodiment where the user provides a gesture input including touching and maintaining contact with touch screen 112. The location of the contact corresponds to the location of a suggested character string 614. In the illustrated embodiment in FIG. 6E, the location of the contact corresponds to the location of suggested character string 614C ("Productivity").

Figure 6F:
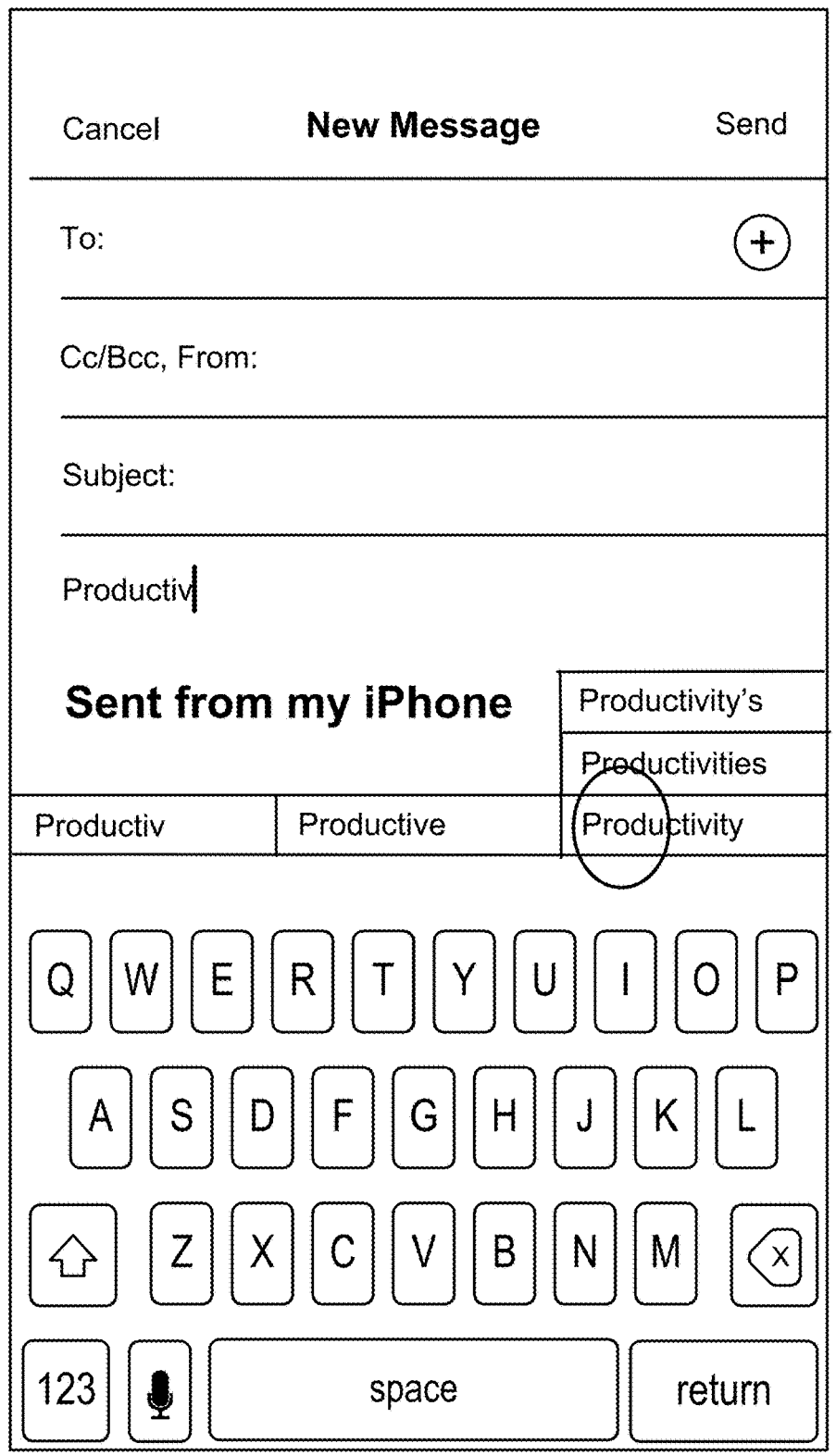

In response to detecting the gesture, multifunction device 100 displays one or more variations of the suggested character string 614. This is shown in FIG. 6F, where the one or more variations are "Productivity's" and "Productivities". In the illustrated embodiment in FIG. 6F, the one or more variations are displayed above the contacted character string 614.

Figure 6G:
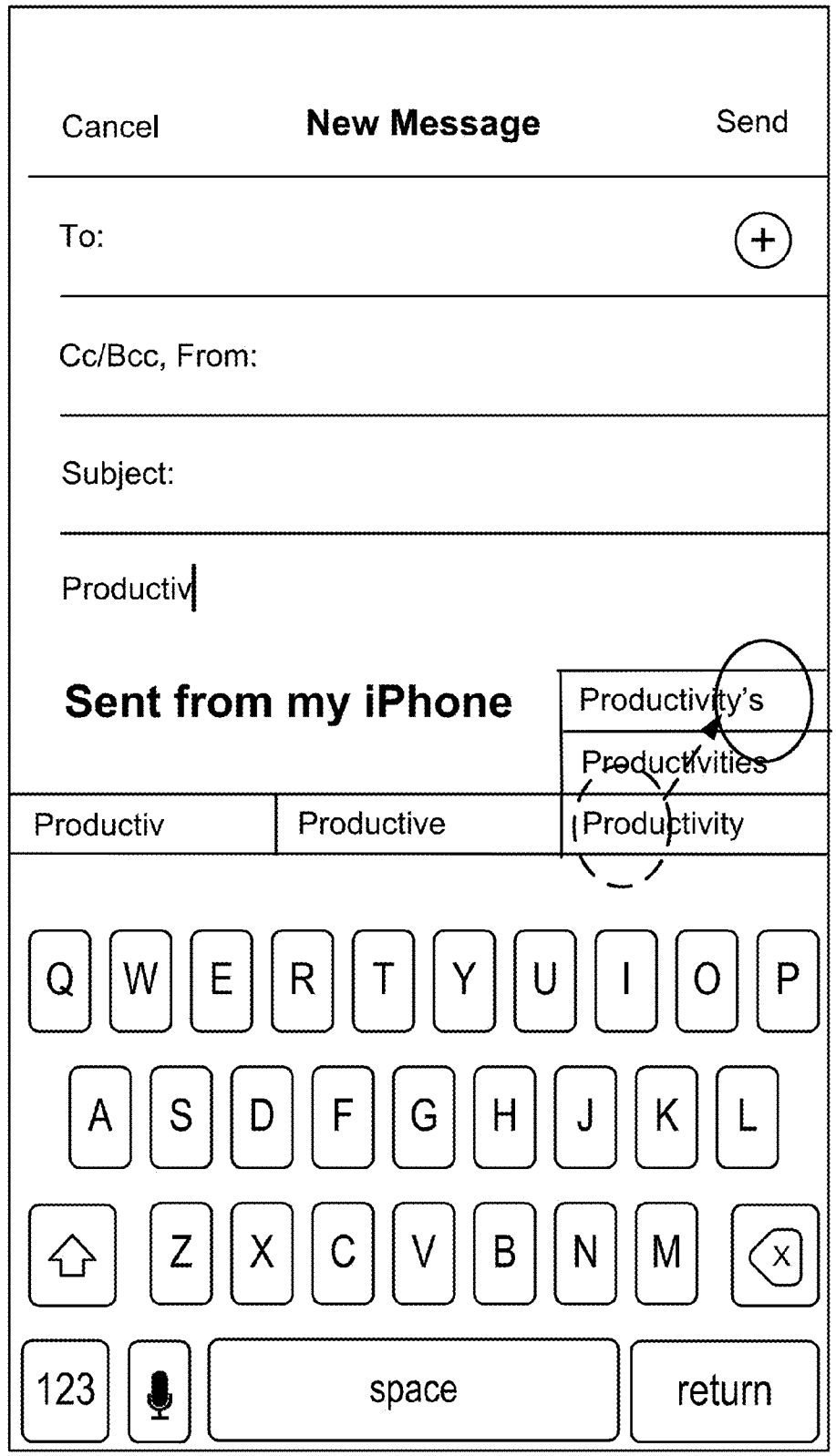
Figure 6H:
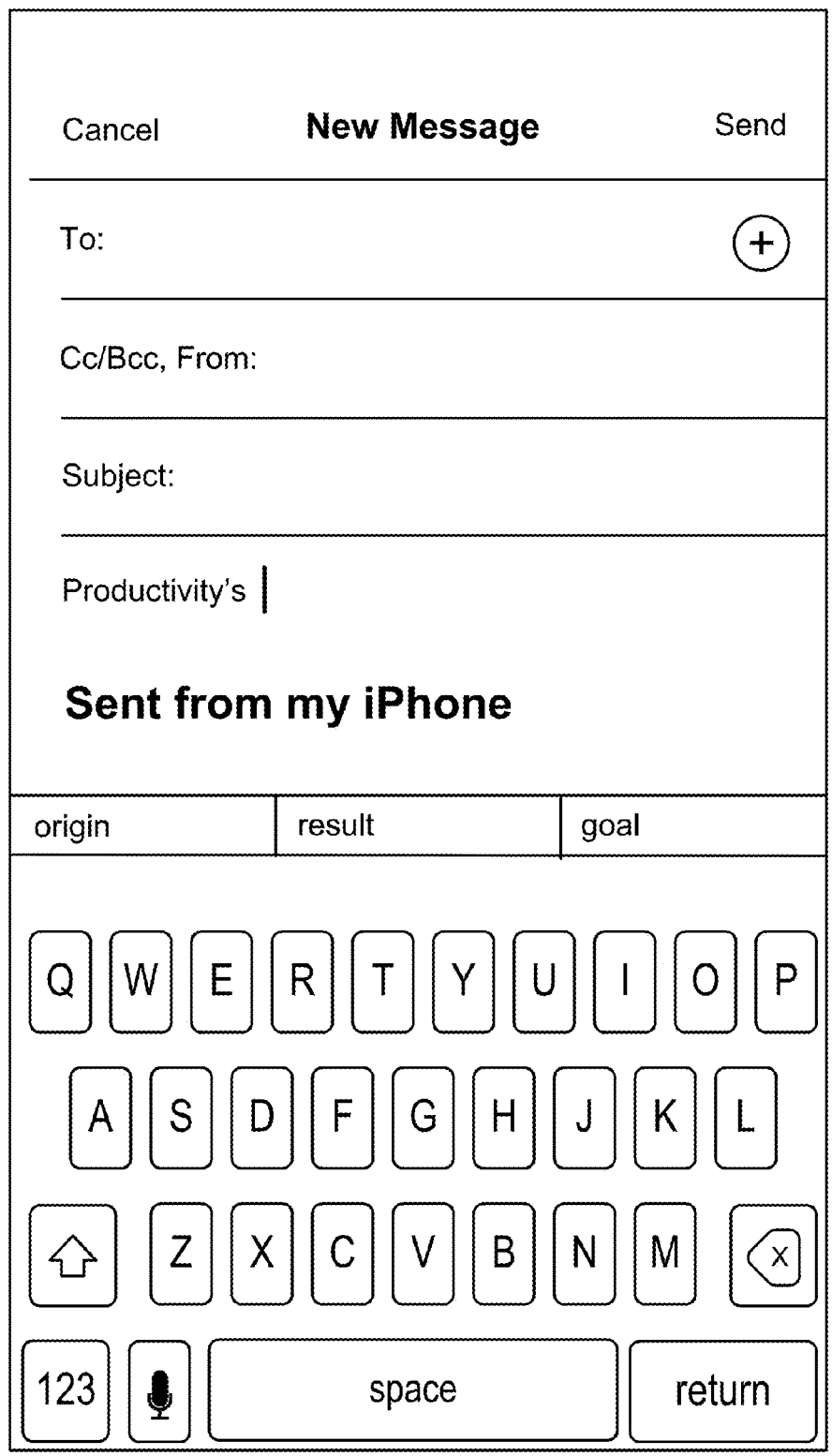

Multifunction device 100 receives a user input that comprises moving a contact point and ceasing contact when the contact point is within a particular variation. Responsive to the user input, multifunction device 100 inserts the particular variation into a text field. This is shown in FIG. 6G, where the particular variation is "Productivity's", and in FIG. 6H, where that variation has been inserted into text field 608.

Figure 6I:
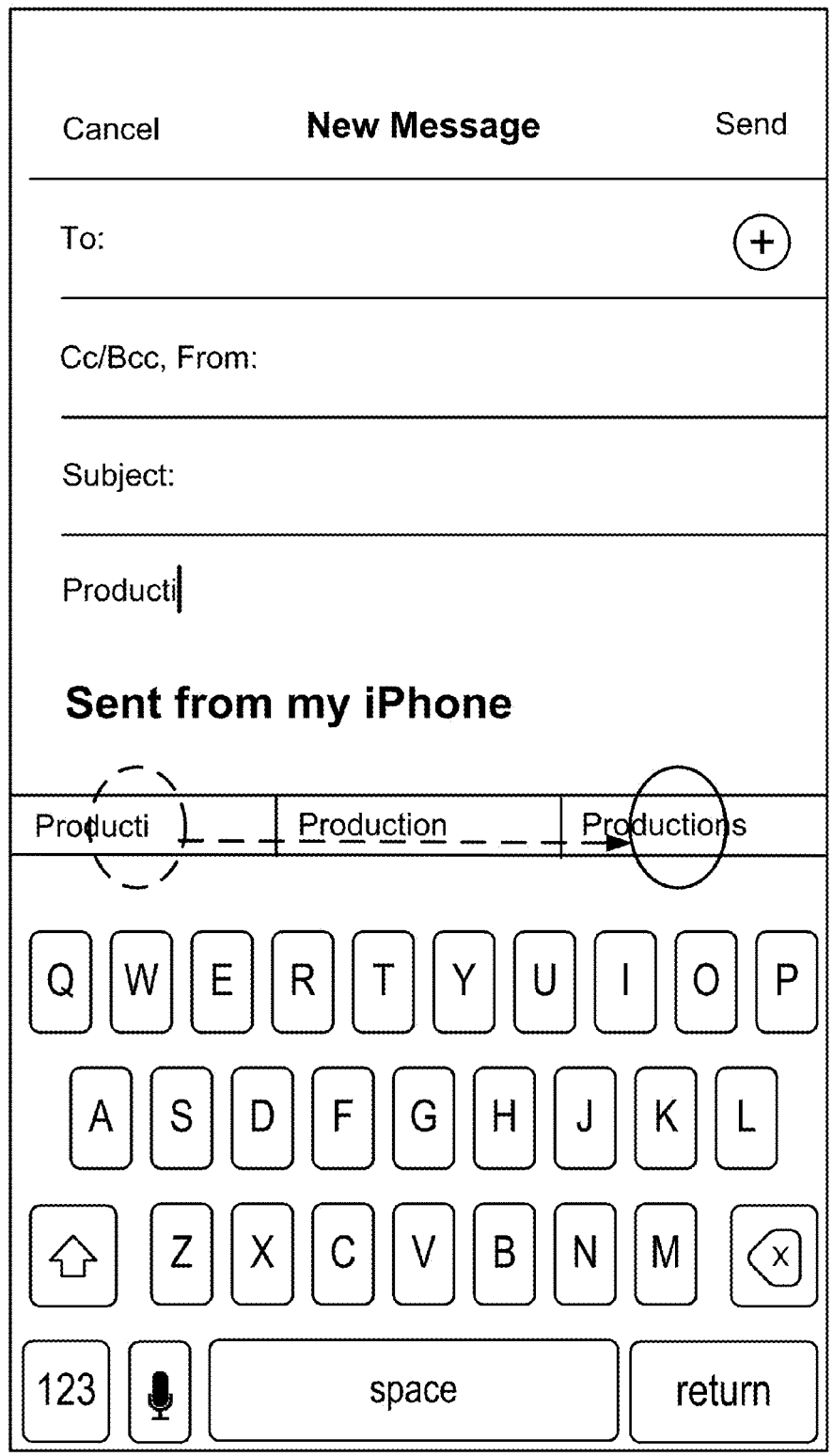
Figure 6J:

Multifunction device 100 receives a user input that comprises a gesture. Responsive to the user input, multifunction device 100 replaces display of suggestion region 606 with an edit menu. For example, multifunction device 100 displays an animation of the suggestions scrolling out of suggestion region 606 and the edit menu scrolling into the suggestion region. This is shown in FIG. 6I, where the gesture includes a swipe that begins within suggestion region 606 and moves left or right (here, right). In some embodiments, the gesture includes selecting text within a text field. In some embodiments, the edit menu includes one or more of the following menu items: undo, cut, copy, paste, navigate left one character, and navigate right one character. This is shown in FIG. 6J.

In response to detecting the gesture, multifunction device 100 displays one or more variations of the suggested character string 614. This is shown in FIG. 6F, where the one or more variations are "Productivity's" and "Productivities". In the illustrated embodiment in FIG. 6F, the one or more variations are displayed above the contacted character string 614.

Figure 6K:
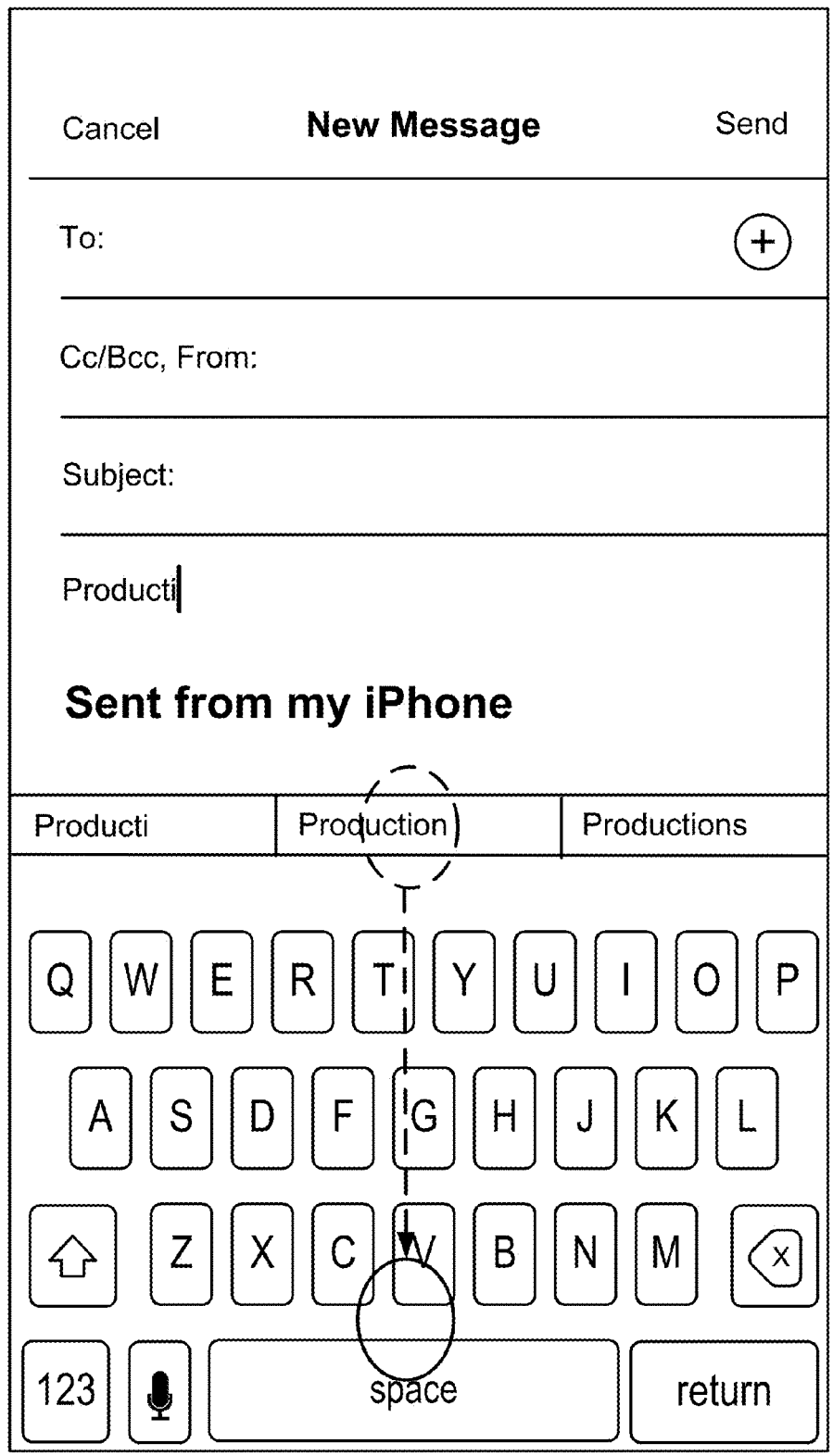
Figure 6L:
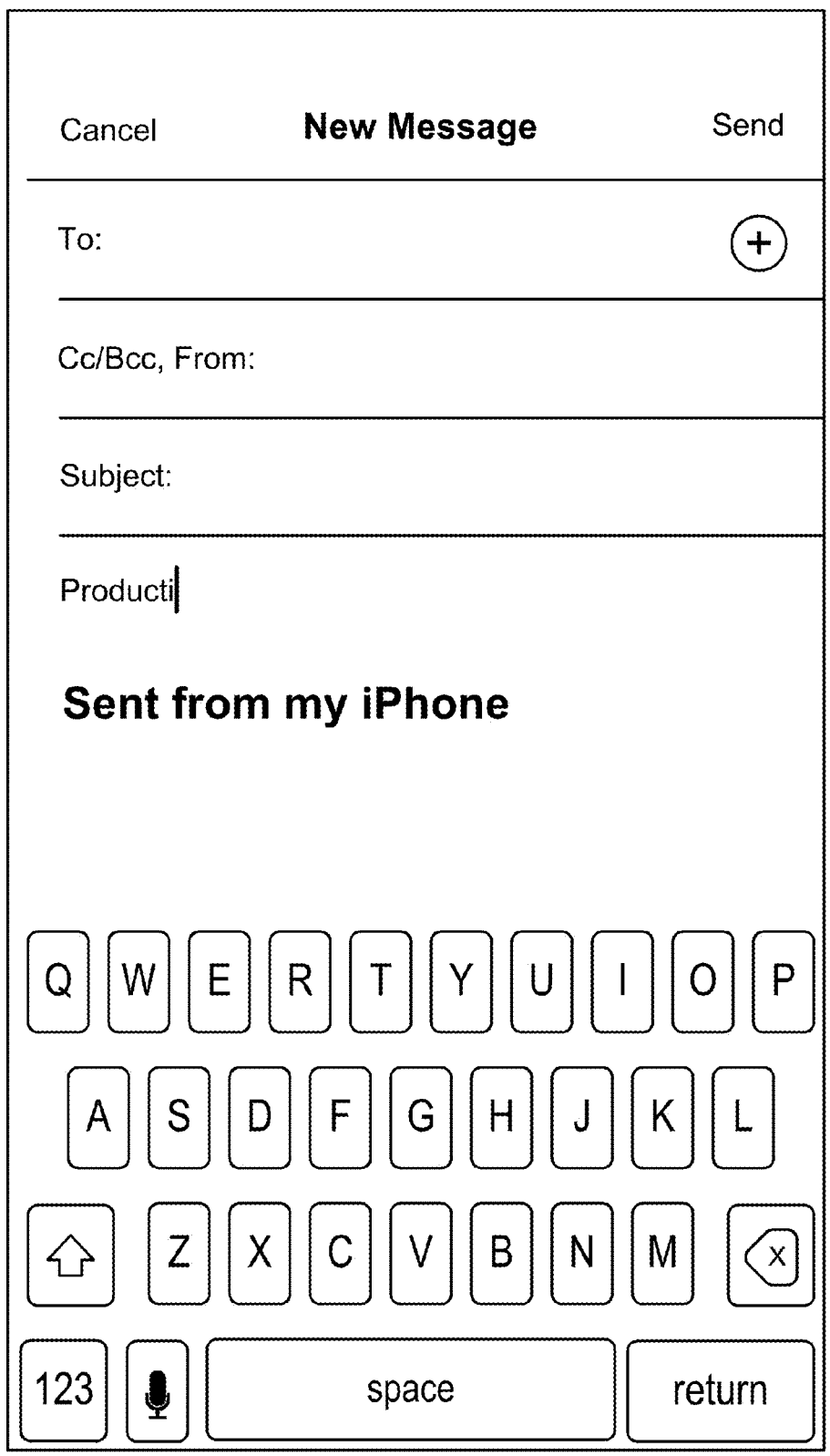

Multifunction device 100 detects a movement of a contact downward, starting at a location that corresponds to suggestion region 606. This is shown in FIG. 6K. Responsive to the movement, multifunction device 100 ceases to display suggestion region 606. This is shown in FIG. 6L, where suggestion region 606 is absent. In some embodiments, ceasing to display suggestion region 606 includes displaying an animation of suggestion region 606 sliding downward into/under on-screen keyboard region 604. In some embodiments, in response to detecting an upward swipe near a top of on-screen keyboard region 604 while suggestion region 606 is hidden, suggestion region 606 is redisplayed. In some embodiments, the hidden/revealed state of suggestion region 606 is persistent across different applications on the device, so that if suggestion region 606 is hidden in one application, then when the on-screen keyboard is displayed in a different application, suggestion region 606 is also hidden in that application. Whereas, if suggestion region 606 is revealed in one application when the on-screen keyboard is displayed in another application, then suggestion region 606 is also displayed for that on-screen keyboard. In some embodiments, the hidden/revealed state of the on-screen keyboard is set for different applications.

Figure 9A:
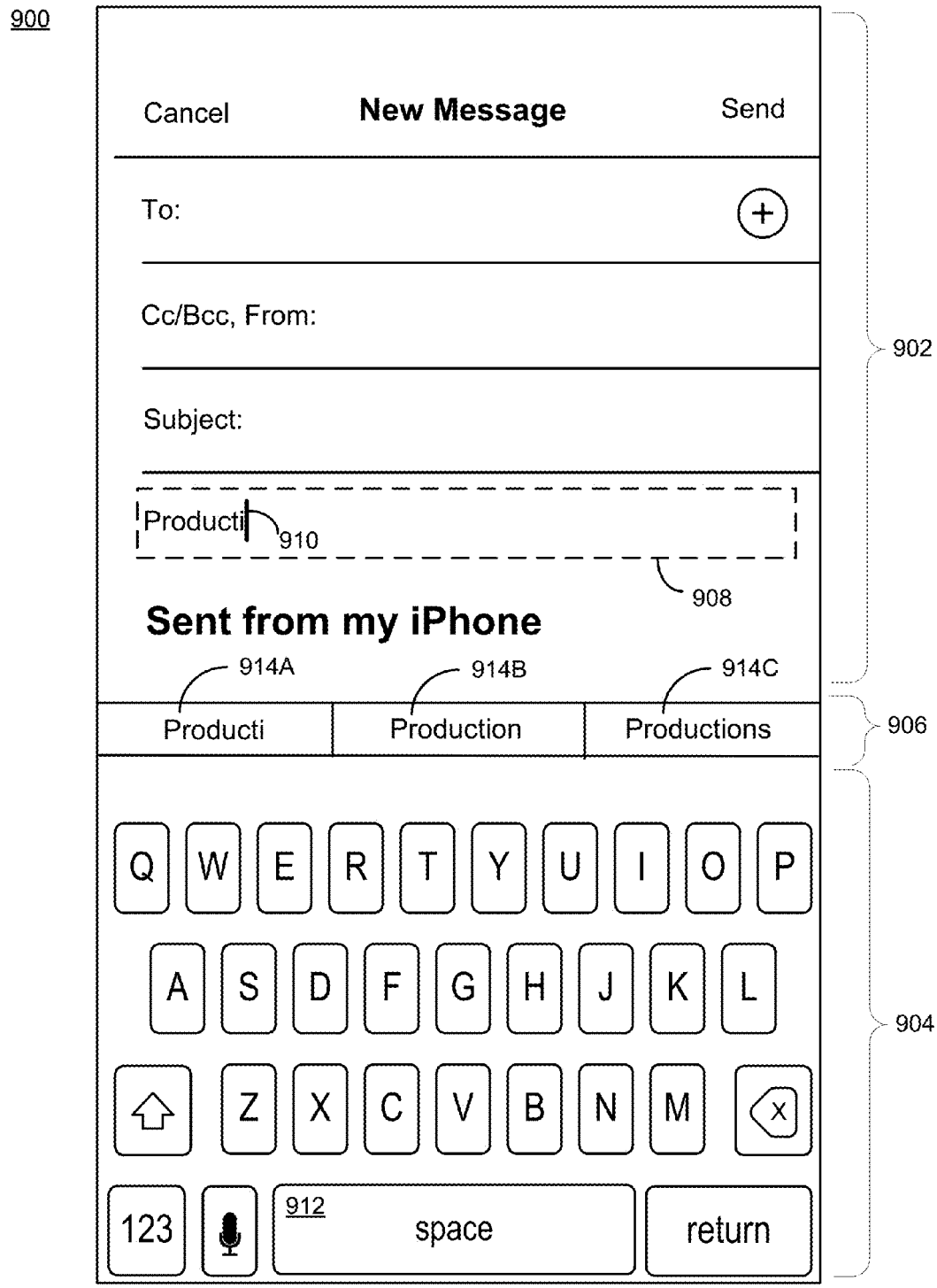
FIGS. 9A-9O illustrate exemplary user interfaces for displaying a transition from a first character string to a second character string in accordance with some embodiments.

FIGS. 9A-9O, described below after FIG. 8, illustrate exemplary user interfaces for displaying a transition from a first character string to a second character string in accordance with some embodiments.

FIG. 7 is a flow diagram illustrating a method 700 of inserting a character string into a text field in accordance with some embodiments. The method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 700 are, optionally, combined and/or the order of some operations is, optionally, changed.

As described below, the method 700 provides a faster way to insert a character string into a text field. The method reduces the time that a user requires to insert a character string into a text field, thereby creating a more efficient human-machine interface. For battery-operated electronic devices, enabling a user to insert a character string into a text field faster and more efficiently conserves power and increases the time between battery charges.

In some embodiments, an electronic device (e.g., multifunction device 100 with a display and a touch-sensitive surface displays (702), on a display, a suggestion region (e.g., suggestion region 506 in FIGS. 5A-5O). The suggestion region is displayed above an on-screen keyboard (e.g., on-screen keyboard region 504 in FIGS. 5A-5O). The suggestion region includes multiple suggested character strings (e.g., suggested character strings 514 in FIGS. 5A-5O).

The device detects (704) a gesture (e.g., FIGS. 5D, 5F, and 5M) that begins within a predefined key of the on-screen keyboard (e.g., space bar 512 within on-screen keyboard region 504 in FIGS. 5A-5O).

Responsive to detecting the gesture, the device inserts (706) a first character string or a second character into a text field (e.g., text field 508 in FIGS. 5A-5O). Specifically, in accordance with a determination that the gesture ends within the predefined key (e.g., FIG. 5F), the device inserts a first character string (e.g., a space character) into a text field. In accordance with a determination that the gesture ends outside of the predefined key (e.g., FIGS. 5D and 5M), the device inserts a second character string into the text field (e.g., one of the suggested character strings 514 in FIGS. 5A-5O), wherein the second character string is different from the first character string.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 700 described above with respect to FIG. 7. For example, the contacts, gestures, and user interface objects described above with reference to method 700 optionally have one or more of the characteristics of the contacts, gestures, and user interface objects described herein with reference to other methods described herein (e.g., methods 800 and 1000). For brevity, these details are not repeated here.

FIG. 8 is a flow diagram illustrating a method 800 of updating a set of one or more suggestions in a suggestion region in accordance with some embodiments. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 800 are, optionally, combined and/or the order of some operations is, optionally, changed.

As described below, the method 800 provides a more intuitive way to update a set of one or more suggestions in a suggestion region. The method reduces the cognitive burden on the user when updating a set of one or more suggestions, thereby creating a more efficient human-machine interface. For battery-operated electronic devices, updating a set of one or more suggestions more efficiently conserves power and increases the time between battery charges.

In some embodiments, an electronic device (e.g., multi-function device 100 with a display and a touch-sensitive surface receives (802) one or more entered characters (e.g., "Producti" in FIG. 6A).

The device displays (804), on a display, a suggestion region (e.g., suggestion region 606 in FIG. 6A). The suggestion region includes a set of one or more suggestions. For example, after receiving the one or more entered characters, the device displays suggestion region 606. The set of one or more suggestions includes one or more character strings (e.g., suggested character strings 614 in FIG. 6A) that start with the one or more entered characters.

The device receives (806) one or more additional entered characters (e.g., "v" in FIG. 8B). For example, while displaying the set of one or more suggestions, the device receives one or more additional entered characters.

The device updates (808) the set of suggestions. For example, responsive to receiving the one or more additional entered characters, the device updates the set of suggestions (e.g., suggested character strings 614). The updating comprises changing a first suggestion in the set of one or more suggestions from a first character string to a second character string. The changing comprises, while maintaining display of a first portion (e.g., "Producti" in FIG. 6B) of the first character string (e.g., "Production" in FIG. 6A): ceasing to display (FIG. 6B) a second portion (e.g., "on" in FIG. 6A) of the first character string that is incompatible with the one or more additional entered characters; adding (FIG. 6C) the one or more additional entered characters (e.g., "v") to the first portion (e.g., "Producti") of the first character string (e.g., "Production"); and adding (FIG. 6D) a first set of one or more predicted characters (e.g., "e" in FIG. 6D) to the first portion (e.g., "Productiv") of the first character string to display the second character string (e.g., "Productive").

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1000) are also applicable in an analogous manner to method 800 described above with respect to FIG. 8. For example, the contacts, gestures, and user interface objects described above with reference to method 800 optionally have one or more of the characteristics of the contacts, gestures, and user interface objects described herein with reference to other methods described herein (e.g., methods 700 and 1000). For brevity, these details are not repeated here.

FIGS. 9A-9O illustrate exemplary user interfaces for displaying a transition from a first character string to a second character string in accordance with some embodiments. The user interfaces in these figures are used to illustrate the processes described below, including the process in FIG. 10.

FIGS. 9A-9O illustrate user interface 900, which can be displayed by, e.g., multifunction device 100. User interface 900 includes message region 902, on-screen keyboard region 904, and suggestion region 906. Message region 902 includes text field 908 and cursor 910. On-screen keyboard region 904 includes space bar 912. Suggestion region 906 includes multiple suggested character strings 914A, 914B, 914C (collectively, "suggested character strings 914"). In some embodiments, one or more of the multiple suggested character strings 914 is a suggested replacement for characters entered in text field 908, a prediction of a character string being entered in text field 908, an automatic correction of a character string being entered in text field 908, an automatic completion of a character string being entered in text field 908, or the character string that was just entered in text field 908. In the illustrated embodiment in FIG. 9A, suggestion region 906 is displayed above on-screen keyboard region 904, and the multiple suggested character strings 914 are arranged horizontally within suggestion region 906.

In FIG. 9A, text field 908 displays "Producti", which is a character string being entered in text field 908. Cursor 910 is located immediately after the "Producti" character string, indicating that this string is still being entered. (If cursor 910 were separated from the string by a delimiter character, such as a space or a period, then this would indicate that the character string is complete.) The suggested character strings ("Producti" 914A, "Production" 914B, and "Productions" 914C) are displayed in a left section, a middle section, and a right section of suggestion region 906, respectively. In the illustrated embodiment in FIG. 9A, suggested character string 914A ("Producti") is the character string that was just entered into text field 908, suggested character string 914B ("Production") is a first suggested replacement for characters entered in text field 908, and suggested character string 914C ("Productions") is a second suggested replacement for characters entered in text field 908.

Multifunction device 100 receives inputs of a first set of one or more entered characters. In some embodiments, the inputs are received in the on-screen keyboard region 904. After receiving the first set of entered characters, multifunction device 100 displays suggestion region 906 proximate to the on-screen keyboard region 904. Suggestion region 906 includes a set of one or more suggestions including one or more character strings that are suggested replacements for the first set of entered characters. This is shown in FIG. 9A, where the entered characters are "Producti" and the character strings are "Producti" 914A, "Production" 914B, and "Productions" 914C.

While displaying the set of suggestions, multifunction device 100 receives one or more additional entered characters. After receiving the additional entered characters, multifunction device 100 updates the set of suggestions 914 based on an updated set of entered characters that includes the first set of entered characters and the additional entered characters. (In some embodiments, while displaying the set of suggestions, multifunction device 100 receives deletions of previously-entered characters. After receiving the deletions, multifunction device 100 updates the set of suggestions 914 based on an updated set of entered characters that includes the first set of entered characters excluding any deleted characters.) In some embodiments, multifunction device 100 ceases updating the set of suggestions 914 if the user is typing quickly (e.g., more than 2.2 characters per second). Before the user reaches the threshold speed, the suggestions change every time a character is entered. After the user reaches the threshold speed, there are no updates (e.g., on the theory that the user is not looking at the suggestions if the user is typing that fast). In some embodiments, "no updates" means that the suggestions are frozen, are hidden, or fade out. The automatic suggestion update can require a significant amount of device power. Ceasing to update the set of suggestions 914 if the user is typing quickly (and, presumably, not looking at the suggestions) is an optimization that saves device power.

Figure 9B:

The updating comprises changing a first suggestion in the set of suggestions from a first character string that is a suggested replacement for the first set of entered characters to a second character string that is a suggested replacement for the updated set of entered characters. In some embodiments, changing the first suggestion from the first character string to the second character string comprises determining a deleted portion of the first character string that is deleted relative to the second character string and while displaying the maintained portion of the first character string, sequentially removing the characters of the deleted portion of the first character string. This is shown in FIG. 9B, where the first character string is "Production" (suggested character string 914B), the second character string is "Productive" (not yet shown), the maintained portion of the first character string is "Producti", and the deleted portion of the first character string is "on".

Originally, in FIG. 9A, the entered characters were "Producti", so the suggested character strings were "Producti" 914A, "Production" 914B, and "Productions" 914C. Then, one additional entered character was received, "v". That changed the text string being entered to "Productiv", which is incompatible with "Production". After receiving "v", multifunction device 100 sequentially removes the characters of the deleted portion ("on") of the first character string while continuing to display the maintained portion ("Producti") of the first character string.

Figure 9C:

In some embodiments, the characters of the deleted portion are removed starting with a right-most character and ending with a left-most character of the deleted portion. This is shown in FIGS. 9B and 9C, where the right-most character "n" of the deleted portion "on" is removed first and "o" is removed second. In some embodiments, sequentially removing the characters comprises decreasing a size of an individual character (e.g., gradually over time until the individual character reaches a predetermined minimum size or disappears). This is shown in FIG. 9B, where the character being removed ("o") has a decreased size.

Eventually, the characters of the deleted portion of the first character string have all been removed, leaving behind the maintained portion of the first character string. This is shown in FIG. 9C, where the first character string is "Production" (suggested character string 914B), the second character string is "Productive" (not yet shown), the maintained portion of the first character string is "Producti", and the deleted portion of the first character string is "on".

In some embodiments, changing the first suggestion from a first character string to a second character string comprises determining a maintained portion of the first character string that is identical to a corresponding portion of the second character string, determining an inserted portion of the second character string that is inserted relative to the maintained portion of the first character string, and while displaying the maintained portion of the first character string, sequentially displaying the characters of the inserted portion of the second character string after the maintained portion of the first character string. In some embodiments, the maintained portion of the first character string is the first set of entered characters. In some embodiments, changing the first suggestion from the first character string to the second character string further comprises determining, based on a predefined criterion, whether to entirely replace the first character string with the second character string. In some embodiments, this criterion is whether the two character strings are related forms of each other or different character strings.

Figure 9D:

This is shown in FIG. 9D, where the first character string is "Production" (suggested character string 914B), the second character string is "Productive" (not yet shown), the one or more additional entered characters is "v", the maintained portion of the first character string is "Producti", and the inserted portion of the second character string is "ve". Originally, in FIG. 9A, the entered characters were "Producti", so the suggested character strings were "Producti" 914A, "Production" 914B, and "Productions" 914C. Then, one additional entered character was received, "v". That changed the text string being entered to "Productiv", which is incompatible with "Production". After receiving "v", multifunction device 100 sequentially displays the characters of the inserted portion ("ve") of the second character string after the maintained portion ("Producti") of the first character string.

Figure 9E:
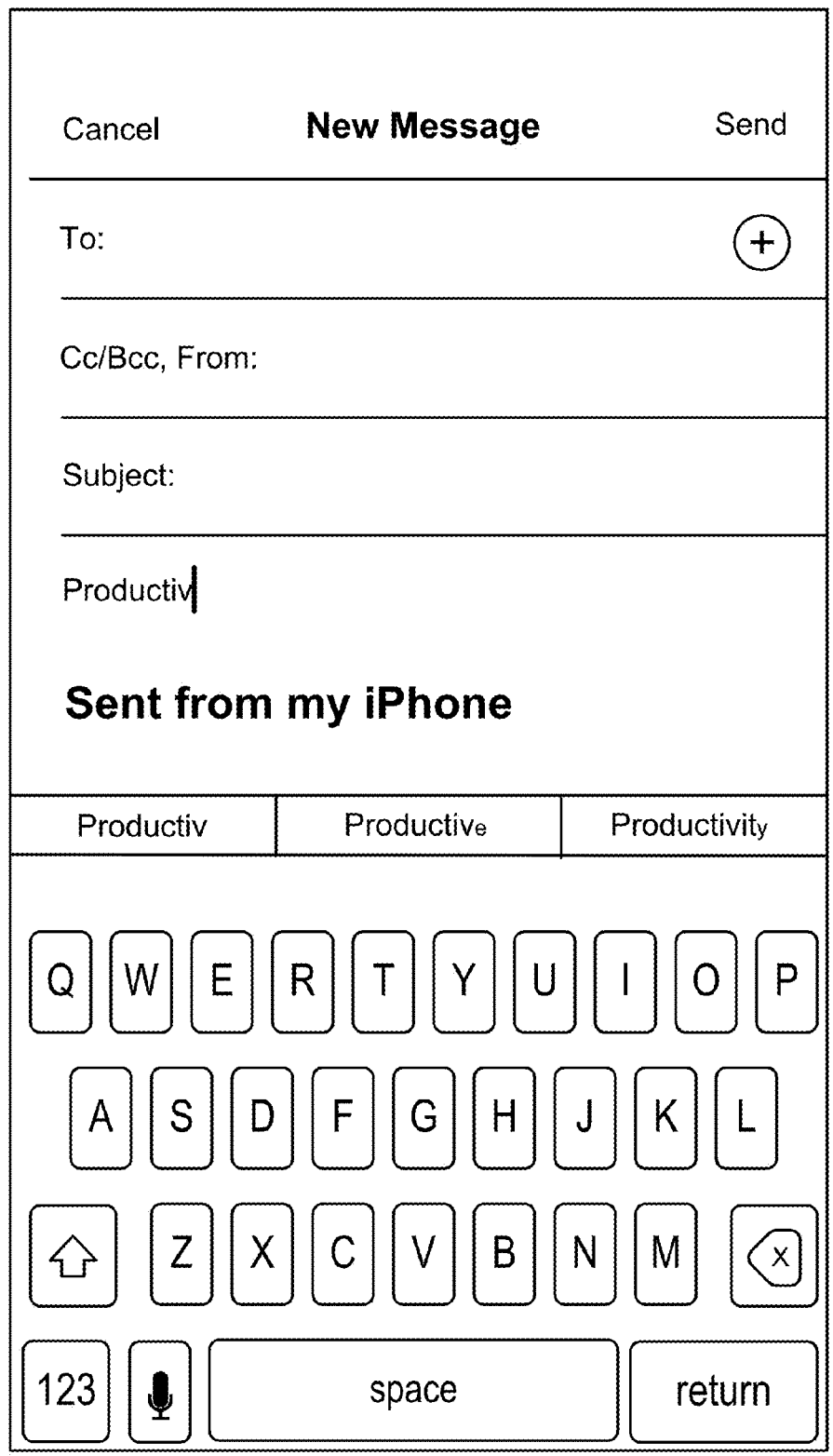

In some embodiments, sequentially displaying the characters comprises displaying a first character without displaying a second character. This is shown in FIG. 9D, where multifunction device 100 displays only "v" after the maintained portion ("Producti") to form "Productiv". While displaying the first character, the second character is displayed. This is shown in FIG. 9E, where multifunction device 100 displays "e" after "Producti" and "v" to form "Productive". In some embodiments, the second character is displayed while the appearance of the first character is changing (e.g., while the first character is changing in size and/or opacity) (not shown).

In some embodiments, the characters of the inserted portion of the second character string are displayed starting with a left-most character and ending with a right-most character of the inserted portion of the second character string. This is shown in FIGS. 9D and 9E, where the left-most character "v" of the inserted portion "ve" is displayed first and "e" is displayed second. In some embodiments, sequentially displaying the characters comprises displaying an individual character using a size smaller than a size of characters within the maintained portion of the first character string and after displaying the individual character, increasing the individual character's size (e.g., gradually over time). This is shown in FIG. 9D, where the character being displayed ("v") has a decreased size.

Figure 9F:
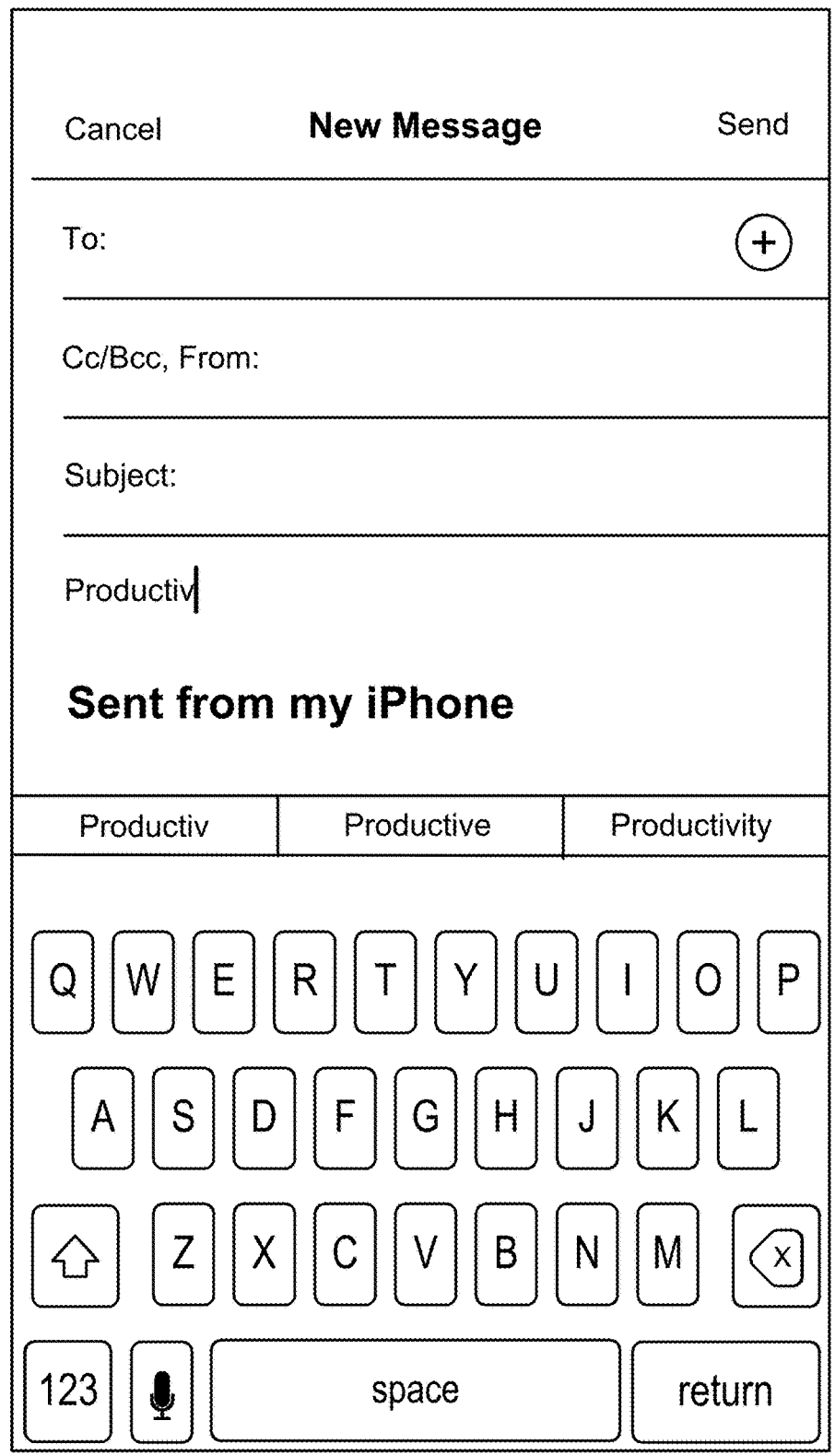

Eventually, the characters of the inserted portion of the second character string have all been displayed after the maintained portion of the first character string, resulting in the second character string. This is shown in FIG. 9F, where the first character string is "Production" (suggested character string 914B), the second character string is "Productive", the maintained portion of the first character string is "Producti", and the inserted portion of the second character string is "ve". Changing the first suggestion from the first character string ("Production") to the second character string ("Productive") is further illustrated in FIG. 9L, discussed below after FIG. 9K.

In some embodiments, sequentially displaying the characters comprises displaying an individual character using a size smaller than a size of characters within the maintained portion of the first character string and after displaying the individual character, increasing the individual character's size (e.g., gradually over time). This is shown in FIG. 9G, where the maintained portion of the first character string ("Producti") and the individual character ("v") are shown at successive points in time. The changes shown in FIG. 9G correspond to different stages in an animation and, thus, in some embodiments, occur automatically after receiving a change to the entered characters (e.g., in response to detecting entry of the additional entered character "v"). (For clarity, FIG. 9G shows only one suggestion and omits the remainder of user interface 900.)

In some embodiments, an anchor point that corresponds to a bottom of the individual character remains at a fixed location relative to the maintained portion of the first character string as the individual character's size increases. This is also shown in FIG. 9G. In some embodiments, the individual character is displayed using the size that is less than two-thirds (e.g., half) of the size of characters within the maintained portion of the first character string. This is also shown in FIG. 9G.

In some embodiments, sequentially displaying the characters comprises displaying an individual character using an opacity less than an opacity of the maintained portion of the first character string and after displaying the individual character, increasing the individual character's opacity (e.g., gradually over time). This is shown in FIG. 9H, where the maintained portion of the first character string ("Producti") and the individual character ("v") are shown at successive points in time. The changes shown in FIG. 9H correspond to different stages in an animation and, thus, in some embodiments, occur automatically after receiving a change to the entered characters (e.g., in response to detecting entry of the additional entered character "v"). (For clarity, FIG. 9H shows only one suggestion and omits the remainder of user interface 900.)

Figure 9I:
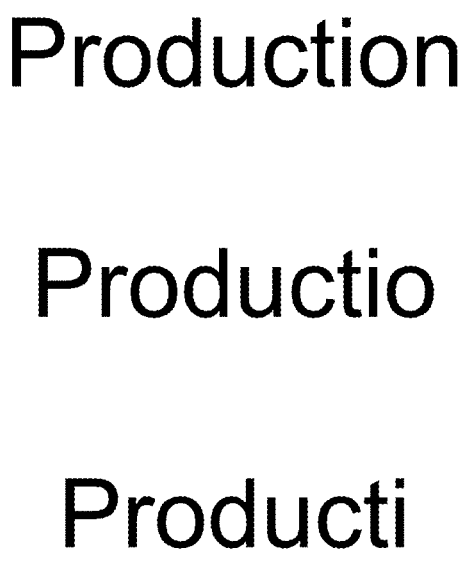

In some embodiments, changing the first suggestion from the first character string to the second character string further comprises determining a deleted portion of the first character string that is deleted relative to the second character string (the deleted portion having a second sequence of characters) and while displaying the maintained portion of the first character string, sequentially removing the characters of the deleted portion of the first character string. This is shown in FIG. 9I, where the first character string is "Production" (suggested character string 914B), the second character string is "Productive" (not yet shown), the maintained portion of the first character string is "Producti", and the deleted portion of the first character string is "on". Originally, in FIG. 9A, the entered characters were "Producti", so the suggested character strings were "Producti" 914A, "Production" 914B, and "Productions" 914C. Then, one additional entered character was received, "v". That changed the text string being entered to "Productiv", which is incompatible with "Production". After receiving "v", multifunction device 100 continues displaying the maintained portion ("Producti") of the first character string ("Production"). The changes shown in FIG. 9I correspond to different stages in an animation and, thus, in some embodiments, occur automatically after receiving a change to the entered characters (e.g., in response to detecting entry of the additional entered character "v").

While displaying the maintained portion ("Producti") of the first character string ("Production"), multifunction device 100 sequentially removes the characters of the deleted portion of the first character string ("on"). This is shown in FIG. 9I, where the maintained portion of the first character string ("Producti") and the deleted portion ("on") are shown at successive points in time. (For clarity, FIG. 9I shows only one suggestion and omits the remainder of user interface 900.) In some embodiments, the characters of the deleted portion are removed starting with a right-most character and ending with a left-most character of the deleted portion. This is shown in FIG. 9I.

In some embodiments, sequentially removing the characters comprises decreasing a size of an individual character (e.g., gradually over time until the individual character reaches a predetermined minimum size or disappears). This is shown in FIG. 9J, where the maintained portion of the first character string ("Producti") and the individual character ("o") are shown at successive points in time. The changes shown in FIG. 9J correspond to different stages in an animation and, thus, in some embodiments, occur automatically after receiving a change to the entered characters (e.g., in response to detecting entry of the additional entered character "v"). (For clarity, FIG. 9J shows only one suggestion and omits the remainder of user interface 900.) In some embodiments, the removal (or addition) of each character occurs over a predefined time period. In some embodiments, the transition from a first character string to a second character string occurs over a predefined time period (e.g., so that changes that include the addition or removal of a large number of characters take the same or substantially the same amount of time as changes that include the addition or removal of a smaller number of characters).

In some embodiments, sequentially removing the characters comprises decreasing an opacity of an individual character until the individual character disappears (e.g., gradually over time). This is shown in FIG. 9K, where the maintained portion of the first character string ("Producti")

and the individual character ("o") are shown at successive points in time. The changes shown in FIG. 9K correspond to different stages in an animation and, thus, in some embodiments, occur automatically after receiving a change to the entered characters (e.g., in response to detecting entry of the additional entered character "v"). (For clarity, FIG. 9K shows only one suggestion and omits the remainder of user interface 900.)

In some embodiments, changing the first suggestion from the first character string to the second character string further comprises moving the maintained portion of the first character string to a location where the corresponding portion appears within the second character string when the second character string is displayed. For example, in some embodiments, the first character string and the second character string are aligned (e.g., centered) within a predefined region, and the maintained portion moves to account for the alignment of the maintained portion relative to the predefined region when displayed in the first character string as compared with the alignment of the maintained portion relative to the predefined region when displayed in the second character string.

In some embodiments, while sequentially displaying the characters of the inserted portion of the second character string, multifunction device 100 moves the displayed maintained portion of the first character string. For example, multifunction device 100 moves the displayed maintained portion of the first character string to a final location determined based on the final location of the second character string when it is aligned (e.g., centered) within a predefined region on the display (e.g., within one of the sections of suggestion region 906 in FIG. 9A).

Returning to the example shown in FIGS. 9A-9F, changing the first suggestion from the first character string to the second character string is further illustrated in FIG. 9L. In FIG. 9L, the first character string is "Production" (suggested character string 914B), the second character string is "Productive", the maintained portion of the first character string is "Producti", the deleted portion of the first character string is "on", and the inserted portion of the second character string is "ve". Characters of the deleted portion are removed by decreasing their size. Characters of the inserted portion are displayed by increasing their size. In FIG. 9L, the maintained portion, the deleted portion, and the inserted portion are shown at successive points in time. The changes shown in FIG. 9L correspond to different stages in an animation and, thus, in some embodiments, occur automatically after receiving a change to the entered characters (e.g., in response to detecting entry of the additional entered character "v"). (For clarity, FIG. 9L shows only one suggestion and omits the remainder of user interface 900.)

In some embodiments, changing the first suggestion from the first character string to the second character string further comprises determining a replaced portion of the first character string that is replaced by a replacement portion of the second character string (the replaced portion having a second sequence of characters and the replacement portion having a third sequence of characters) and while displaying the maintained portion of the first character string, sequentially replacing characters of the replaced portion with characters of the replacement portion.

In some embodiments, as a replaced character is deleted, the replaced character is replaced by a replacement character (e.g., to avoid the appearance of gaps). For example, the display of a replacement character is timed to coincide with (e.g., to occur concurrently with or just after) ceasing to display the character that it is replacing.

In some embodiments, changing the first suggestion from the first character string to the second character string further comprises determining a second maintained portion of the first character string and a second corresponding portion of the second character string that match, determining a replaced portion of the first character string that is between the maintained portion of the first character string and the second maintained portion of the first character string (the replaced portion having a second sequence of characters), determining a replacement portion of the second character string that is between the corresponding portion of the second character string and the second corresponding portion of the second character string (the replacement portion having a third sequence of characters), and while displaying the maintained portion of the first character string and the second maintained portion of the first character string, sequentially replacing characters of the replaced portion with characters of the replacement portion.

This is shown in FIG. 9M, where the first character string is "bookseller", the second character string is "bookkeeper", the maintained portion of the first character string and the corresponding portion of the second character string are "book", the second maintained portion of the first character string and the second corresponding portion of the second character string are "er", the replaced portion of the first character string is "sell", and the replacement portion of the second character string is "keep". In FIG. 9M, the maintained portion, the second maintained portion, the replaced portion, and the replacement portion are shown at successive points in time. The changes shown in FIG. 9M correspond to different stages in an animation and, thus, in some embodiments, occur automatically after receiving a change to the entered characters (e.g., in response to detecting entry of the additional entered character "v"). (For clarity, FIG. 9M shows only one suggestion and omits the remainder of user interface 900.)

Specifically, FIG. 9M shows the following character strings in order:
"bookseller" (first character string);
"bookseller" where the "s" is overlaid by a "k" ("s" being replaced by "k");
"bookkeller" ("s" was replaced by "k");
"bookkeller" where the first "l" is overlaid by an "e" ("l" being replaced by "e");
"bookkeeler" ("l" was replaced by "e");
"bookkeeler" where the "l" is overlaid by a "p" ("l" being replaced by "p");
"bookkeeper" (second character string; "l" was replaced by "p").

In some embodiments, multifunction device 100 determines an order in which characters are sequentially replaced based on a location of the replaced portion within the first character string. For example, in accordance with a determination that the replaced portion is located in the middle of the first character string, sequentially replacing the characters of the replaced portion with the characters of the replacement portion in a first direction. In accordance with a determination that the replaced portion is located at the end of the first character string, sequentially replacing the characters of the replaced portion with the characters of the replacement portion in a second direction that is different from or opposite to the first direction.

In some embodiments, multifunction device 100 determines an order in which characters are sequentially replaced based on whether the replaced portion is longer than the replacement portion. For example, in accordance with a determination that the replaced portion is longer than the replacement portion, sequentially replacing the characters of the replaced portion with the characters of the replacement portion in a first direction. In accordance with a determination that the replaced portion is shorter than the replacement portion, sequentially replacing the characters of the replaced portion with the characters of the replacement portion in a second direction that is different from or opposite to the first direction.

In some embodiments, the replacement portion is longer than the replaced portion, and sequentially replacing characters of the replaced portion with characters of the replacement portion comprises determining a first portion of the replacement portion that is equal in length to the replaced portion, determining a remainder portion of the replacement portion that follows the first portion of the replacement portion, replacing the replaced portion with the first portion of the replacement portion without moving the first maintained portion of the first character string relative to the second maintained portion of the first character string (in some embodiments, the characters in the first portion of the replacement portion are substituted character by character), moving the first maintained portion of the first character string relative to the second maintained portion of the first character string (e.g., moving the first portion of the replacement portion away from the second corresponding portion of the second character string) by one character width, and displaying a first character of the remainder portion after the first portion of the replacement portion and before the second corresponding portion of the second character string.

This is shown in FIG. 9N, where the first character string is "disgusted", the second character string is "disinterested", the maintained portion of the first character string and the corresponding portion of the second character string are "dis", the second maintained portion of the first character string and the second corresponding portion of the second character string are "sted", the replaced portion of the first character string is "gu", the replacement portion of the second character string is "intere", the first portion of the replacement portion is "in", the remainder portion of the replacement portion is "tere", and the first character of the remainder portion is "t". Characters of the remainder portion are displayed by increasing their size. In FIG. 9N, the maintained portion, the second maintained portion, the replaced portion, and the replacement portion are shown at successive points in time. The changes shown in FIG. 9N correspond to different stages in an animation and, thus, in some embodiments, occur automatically after receiving a change to the entered characters (e.g., in response to detecting entry of the additional entered character "v"). (For clarity, FIG. 9N shows only one suggestion and omits the remainder of user interface 900.)

Specifically, FIG. 9N shows the following character strings in order:
"disgusted" (first character string);
"disiusted" ("g" was replaced by "i");
"disinsted" ("u" was replaced by "n");
"disintsted" where the first "t" is smaller ("t" being added);
"disintsted" ("t" at full size);
"disintested" where the first "e" is smaller ("e" being added);
"disintested" ("e" at full size);
"disintersted" where the "r" is smaller ("r" being added);
"disintersted" ("r" at full size);
"disinterested" where the second "e" is smaller ("e" being added);
"disinterested" (second character string; "e" at full size).

In some embodiments, the first character of the remainder portion is a left-most character of the remainder portion. This is shown in FIG. 9N. After displaying the first character of the remainder portion, other characters to the right of the first character are subsequently displayed.

In some embodiments, the replacement portion is shorter than the replaced portion, and sequentially replacing characters of the replaced portion with characters of the replacement portion comprises determining a first portion of the replaced portion that is equal in length to the replacement portion, determining a remainder portion of the replaced portion that follows the first portion of the replaced portion, removing from the first character string a first character of the remainder portion, and moving the second corresponding portion of the second character string towards the first portion of the replaced portion by one character width (e.g., without waiting for other characters in the first portion of the replaced portion to be replaced with characters of the replacement portion).

This is shown in FIG. 9O, where the first character string is "disinterested", the second character string is "disgusted", the maintained portion of the first character string and the corresponding portion of the second character string are "dis", the second maintained portion of the first character string and the second corresponding portion of the second character string are "sted", the replaced portion of the first character string is "intere", the first portion of the replaced portion is "in", the remainder portion of the replaced portion is "tere", the first character of the remainder portion is "e", and the replacement portion of the second character string is "gu". Characters of the remainder portion are removed by decreasing their size. In FIG. 9O, the maintained portion, the second maintained portion, the replaced portion, and the replacement portion are shown at successive points in time. The changes shown in FIG. 9O correspond to different stages in an animation and, thus, in some embodiments, occur automatically after receiving a change to the entered characters (e.g., in response to detecting entry of the additional entered character "v"). (For clarity, FIG. 9O shows only one suggestion and omits the remainder of user interface 900.)

Specifically, FIG. 9O shows the following character strings in order:
"disinterested" (first character string);
"disinterested" where the second "e" is smaller ("e" being removed);
"disintersted" ("e" was removed);
"disintersted" where the "r" is smaller ("r" being removed);
"disintested" ("r" was removed);
"disintested" where the first "e" is smaller ("e" being removed);
"disintsted" ("e" was removed);
"disintsted" where the first "t" is smaller ("t" being removed);
"disinsted" ("t" was removed);
"disiusted" ("n" was replaced by "u")
"disgusted" (second character string; "i" was replaced by "g").

In some embodiments, the first character of the remainder portion is a right-most character of the remainder portion. This is shown in FIG. 9O. After removing the first character of the remainder portion, other characters to the left of the first character are subsequently removed.

In some embodiments, updating the set of suggestions 914 based on the updated set of entered characters (that includes the first set of entered characters and the additional entered characters) further comprises changing a second suggestion in the set of suggestions from a third character string that is a suggested replacement for the first set of entered characters to a fourth character string that is a suggested replacement for the updated set of entered characters.

Note that the first suggestion in the set of suggestions need not be changed in the same way as the second suggestion in the set of suggestions. For example, the first suggestion might be changed such that a) an inserted portion of the second character string is inserted relative to a maintained portion of the first character string, b) a deleted portion of the first character string is deleted relative to the second character string, c) a maintained portion of the first character string is moved to a location where a corresponding portion appears within the second character string when the second character string is displayed, or d) a replaced portion of the first character string is replaced by a replacement portion of the second character string. The second suggestion might be changed in any of these ways and need not be changed in the same way as the first suggestion. Similarly, even if the first suggestion is changed in the same way as the second suggestion (e.g., both have inserted portions and maintained portions), the character string portions need not be identical. For example, the maintained portion of the first suggestion might differ from the maintained portion of the second suggestion.

Changing the second suggestion from a third character string to a fourth character string comprises determining a maintained portion of the third character string that is identical to a corresponding portion of the fourth character string, determining an inserted portion of the fourth character string that is inserted relative to the maintained portion of the third character string (the inserted portion having a second sequence of characters), and while displaying the maintained portion of the third character string, sequentially displaying the characters of the inserted portion of the fourth character string after the maintained portion of the third character string. In some embodiments, the first suggestion and the second suggestion are changed concurrently (e.g., substantially simultaneously).

This is shown in FIG. 9C, where the third character string is "Productions" (suggested character string 914C), the fourth character string is "Productivity" (not yet shown), the one or more additional entered characters is "v", the maintained portion of the third character string is "Producti", and the inserted portion of the fourth character string is "vity". Originally, in FIG. 9A, the entered characters were "Producti", so the suggested character strings were "Producti" 914A, "Production" 914B, and "Productions" 914C. Then, one additional entered character was received, "v". That changed the text string being entered to "Productiv", which is incompatible with "Productions". After receiving "v", multifunction device 100 continues displaying the maintained portion ("Producti") of the third character string ("Productions").

While displaying the maintained portion ("Producti") of the third character string ("Productions"), multifunction device 100 sequentially displays the characters of the inserted portion of the fourth character string ("vity") after the maintained portion of the third character string. In some embodiments, sequentially displaying the characters comprises displaying a first character without displaying a second character. This is shown in FIG. 9D, where multifunction device 100 displays only "vit" after the maintained portion ("Producti") to form "Productivit". While displaying the first character, the second character is displayed (and possibly additional characters are displayed). This is shown in FIG. 9E, where multifunction device 100 displays "y" after "Producti" and "vit" to form "Productivity".

Figure 10:
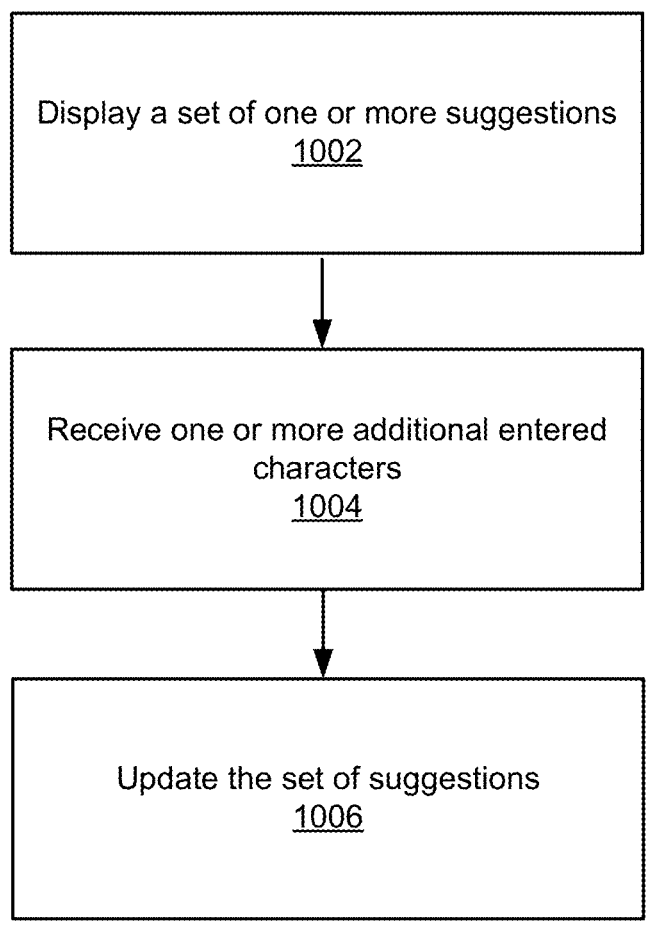
FIG. 10 is a flow diagram illustrating a method of displaying a transition from a first character string to a second character string in accordance with some embodiments.

FIG. 10 is a flow diagram illustrating a method 1000 of displaying a transition from a first character string to a second character string in accordance with some embodiments. The method 1000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1000 are, optionally, combined and/or the order of some operations is, optionally, changed.

As described below, the method 1000 provides a more intuitive way to update a set of one or more suggestions. The method reduces the cognitive burden on the user when updating a set of one or more suggestions, thereby creating a more efficient human-machine interface. For battery-operated electronic devices, updating a set of one or more suggestions more efficiently conserves power and increases the time between battery charges.

In some embodiments, an electronic device (e.g., multifunction device 100 with a display and a touch-sensitive surface) displays (1002) a set of one or more suggestions including one or more character strings (e.g., "Producti" 914A, "Production" 914B, and "Productions" 914C in FIG. 9A) that are suggested replacements for a first set of one or more entered characters (e.g., "Producti" in FIG. 9A).

While displaying the set of suggestions, the device receives (1004) one or more entered characters (e.g., "v" in FIG. 9B).

After receiving the additional entered characters, the device updates (1006) the set of suggestions based on an updated set of entered characters (e.g., "Productiv" in FIG. 9B) that includes the first set of entered characters and the additional entered characters. The updating comprises changing a first suggestion in the set of suggestions from a first character string (e.g., "Production" 914B in FIG. 9A) that is a suggested replacement for the first set of entered characters to a second character string (e.g., "Productive" in FIG. 9F) that is a suggested replacement for the updated set of entered characters.

The changing comprises determining a maintained portion (e.g., "Producti") of the first character string that is identical to a corresponding portion (e.g., "Producti") of the second character string, determining an inserted portion (e.g., "ve") of the second character string that is inserted relative to the maintained portion of the first character string (the inserted portion having a sequence of characters), and while displaying the maintained portion of the first character string, sequentially displaying the characters of the inserted portion of the second character string after the maintained portion of the first character string (e.g., FIGS. 9D-9F).

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 1000 described above with respect to FIG. 10. For example, the contacts, gestures, and user interface objects described above with reference to method 1000 optionally have one or more of the characteristics of the contacts, gestures, and user interface objects described herein with reference to other methods described herein (e.g., methods 700 and 800). For brevity, these details are not repeated here.

Figure 11:
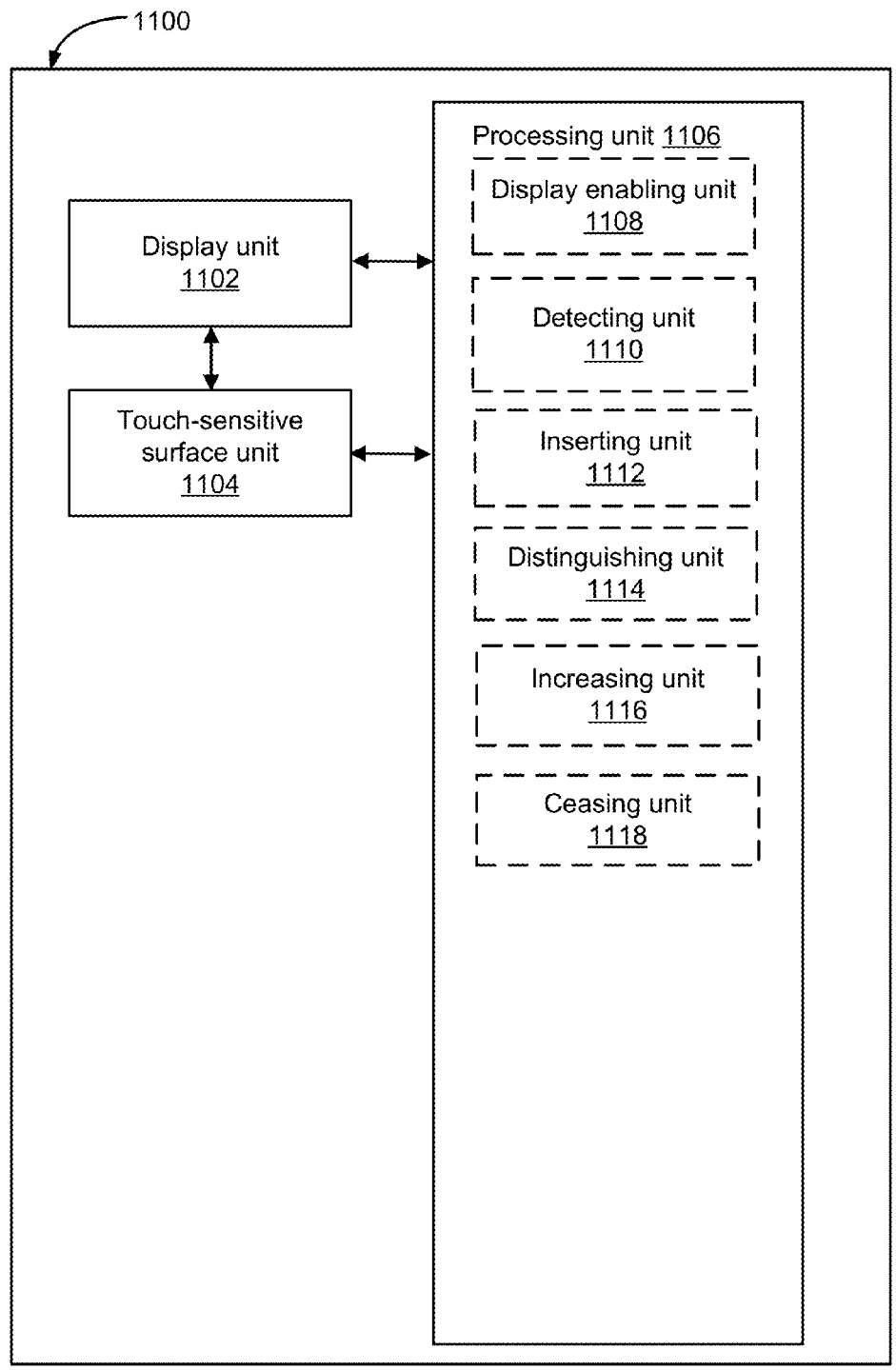
FIGS. 11-13 are functional block diagrams of electronic devices in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface for inserting a character string into a text field, a touch-sensitive surface unit 1104 configured to receive user contacts, and a processing unit 1106 coupled to the display unit 1102 and the touch-sensitive surface unit 1104. In some embodiments, the processing unit 1106 includes a display enabling unit 1108, a detecting unit 1110, an inserting unit 1112, a distinguishing unit 1114, an increasing unit 1116, and a ceasing unit 1118.

The processing unit 1106 is configured to display a suggestion region above an on-screen keyboard, the suggestion region including multiple suggested character strings (e.g., with the display enabling unit 1108). The processing unit 1106 is also configured to detect a gesture that begins within a predefined key of the on-screen keyboard (e.g., with the detecting unit 1110). The processing unit 1106 is also configured to, responsive to detecting the gesture: in accordance with a determination that the gesture ends within the predefined key, insert a first character string into a text field (e.g., with the inserting unit 1112) and in accordance with a determination that the gesture ends outside of the predefined key, insert a second character string into the text field, wherein the second character string is different from the first character string (e.g., with the inserting unit 1112).

In some embodiments, the predefined key is a space bar.

In some embodiments, the first character string is a space character.

In some embodiments, the second character string is one of the multiple suggested character strings.

In some embodiments, one of the multiple suggested character strings is a prediction of a character string being entered in the text field.

In some embodiments, one of the multiple suggested character strings is an automatic correction of a character string being entered in the text field.

In some embodiments, the automatic correction is visually distinguished from other suggested character strings that are not automatic corrections.

In some embodiments, one of the multiple suggested character strings is an automatic completion of a character string entered in the text field.

In some embodiments, one of the multiple suggested character strings is a character string that was just entered in the text field.

In some embodiments, the character string that was just entered is displayed within quotation marks in the suggestion region.

In some embodiments, the multiple suggested character strings are arranged horizontally within the suggestion region.

In some embodiments, a first suggested character string is a character string that was just entered in the text field, a second suggested character string is a best prediction of a character string being entered in the text field, and a third suggested character string is a second-best prediction of a character string being entered in the text field.

In some embodiments, the first suggested character string is displayed in a left section of the suggestion region, the second suggested character string is displayed in a middle section of the suggestion region, and the third suggested character string is displayed in a right section of the suggestion region.

In some embodiments, the second suggested character string is an automatic correction.

In some embodiments, the processing unit 1106 is further configured to display the second suggested character string within the predefined key (e.g., with the display enabling unit 1108).

In some embodiments, one of the multiple suggested character strings is an automatic correction and the processing unit 1106 is further configured to display a graphical user interface element adjacent to the automatic correction that, when activated, rejects the automatic correction (e.g., with the display enabling unit 1108).

In some embodiments, inserting the second character string into the text field comprises in accordance with a determination that the gesture corresponds to a particular section of the suggestion region, inserting into the text field a suggested character string displayed within that particular section (e.g., with the inserting unit 1112).

In some embodiments, inserting the second character string into the text field comprises in accordance with a determination that the gesture ends within a particular section of the suggestion region, inserting into the text field a suggested character string displayed within that particular section (e.g., with the inserting unit 1112).

In some embodiments, the processing unit 1106 is further configured to, responsive to the gesture including movement of a contact outside of the predefined key, visually distinguish a first suggested character string from other suggested character strings in the suggestion region (e.g., with the distinguishing unit 1114).

In some embodiments, visually distinguishing the first suggested character string comprises increasing a height of a section of the suggestion region that includes the first suggested character string (e.g., with the increasing unit 1116).

In some embodiments, the processing unit 1106 is further configured to detect a movement of the contact downward into the predefined key (e.g., with the detecting unit 1110) and responsive to detecting the movement, cease to visually distinguish the first suggested character string from other suggested character strings in the suggestion region (e.g., with the ceasing unit 1118).

In some embodiments, the processing unit 1106 is further configured to, responsive to the gesture including movement of a contact toward a first side of the suggestion region, visually distinguish a suggested character string on the first side of the suggestion region from other suggested character strings in the suggestion region (e.g., with the distinguishing unit 1114).

In some embodiments, visually distinguishing the suggested character string on the first side of the suggestion region comprises increasing a height of a section of the suggestion region that includes the suggested character string on the first side of the suggestion region (e.g., with the increasing unit 1116).

In some embodiments, the processing unit 1106 is further configured to detect a movement of the contact downward, starting at a location that corresponds to the suggestion region (e.g., with the detecting unit 1110) and responsive to the movement, cease to display the suggestion region (e.g., with the ceasing unit 1118).

In some embodiments, the processing unit 1106 is further configured to responsive to inserting into the text field either the first character string or the second character string, insert into the text field a space character (e.g., with the inserting unit 1112).

Figure 12:
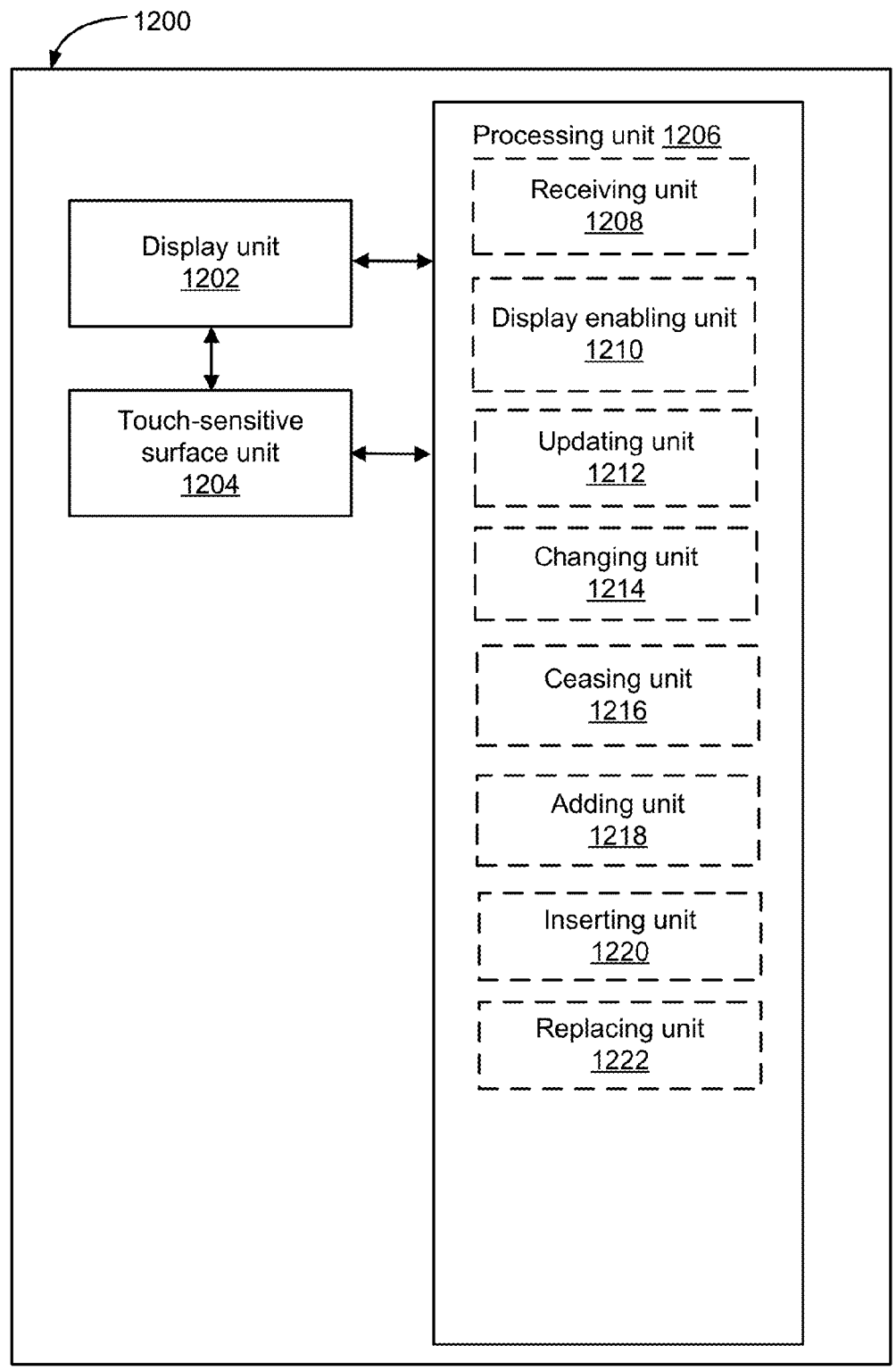

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface for updating a set of one or more suggestions in a suggestion region, a touch-sensitive surface unit 1204 configured to receive user contacts, and a processing unit 1206 coupled to the display unit 1202 and the touch-sensitive surface unit 1204. In some embodiments, the processing unit 1206 includes a receiving unit 1208, a display enabling unit 1210, an updating unit 1212, a changing unit 1214, a ceasing unit 1216, an adding unit 1218, an inserting unit 1220, and a replacing unit 1222.

The processing unit 1206 is configured to receive one or more entered characters (e.g., with the receiving unit 1208). The processing unit 1206 is also configured to, after receiving the one or more entered characters, display a suggestion region that includes a set of one or more suggestions including one or more character strings that start with the one or more entered characters (e.g., with the display enabling unit 1210). The processing unit 1206 is also configured to, while displaying the set of one or more suggestions, receive one or more additional entered characters (e.g., with the receiving unit 1208). The processing unit 1206 is also configured to, responsive to receiving the one or more additional entered characters, update the set of suggestions (e.g., with the updating unit 1212). The updating comprises changing a first suggestion in the set of one or more suggestions from a first character string to a second character string (e.g., with the changing unit 1214). The changing comprises, while maintaining display of a first portion of the first character string, ceasing to display a second portion of the first character string that is incompatible with the one or more additional entered characters (e.g., with the ceasing unit 1216), adding the one or more additional entered characters to the first portion of the first character string (e.g., with the adding unit 1218), and adding a first set of one or more predicted characters to the first portion of the first character string to display the second character string (e.g., with the adding unit 1218).

In some embodiments, the first portion of the first character string is the one or more entered characters.

In some embodiments, a first animation for adding the additional entered characters to the first suggestion differs from a second animation for adding the predicted characters to the first suggestion.

In some embodiments, the second portion of the first character string is removed character-by-character.

In some embodiments, the second portion of the first character string fades out over time.

In some embodiments, the second portion of the first character string decreases in size over time.

In some embodiments, the first set of one or more predicted characters is displayed character-by-character.

In some embodiments, the first set of one or more predicted characters fades in over time.

In some embodiments, the first set of one or more predicted characters increases in size over time.

In some embodiments, the processing unit 1206 is further configured to change a second suggestion in the set of one or more suggestions from a third character string to a fourth character string (e.g., with the changing unit 1214). The changing comprises, while maintaining display of a first portion of the third character string, ceasing to display a second portion of the third character string that is incompatible with the one or more additional entered characters (e.g., with the ceasing unit 1216), adding the one or more additional entered characters to the first portion of the third character string (e.g., with the adding unit 1218), and adding a second set of one or more predicted characters to the first portion of the third character string to display the fourth character string (e.g., with the adding unit 1218).

In some embodiments, the first suggestion and the second suggestion are changed substantially simultaneously.

In some embodiments, the processing unit 1206 is further configured to receive a second user input that comprises touching and maintaining contact with the second suggested character string (e.g., with the receiving unit 1208) and responsive to the second user input, display one or more variations of the second suggested character string (e.g., with the display enabling unit 1210).

In some embodiments, the one or more variations are displayed above the second suggested character string.

In some embodiments, the processing unit 1206 is further configured to receive a third user input that comprises moving a contact point and ceasing contact when the contact point is within a particular variation (e.g., with the receiving unit 1208) and responsive to the third user input, insert the particular variation into a text field (e.g., with the inserting unit 1220).

In some embodiments, the processing unit 1206 is further configured to receive a second user input that comprises a gesture (e.g., with the receiving unit 1208) and responsive to the second user input, replace display of the suggestion region with an edit menu (e.g., with the replacing unit 1222).

In some embodiments, the gesture comprises selecting text within a text field.

In some embodiments, the gesture comprises a swipe that begins within the suggestion region and moves left or right.

In some embodiments, the edit menu includes one or more of the following menu items: undo, cut, copy, paste, navigate left one character, and navigate right one character.

Figure 13:
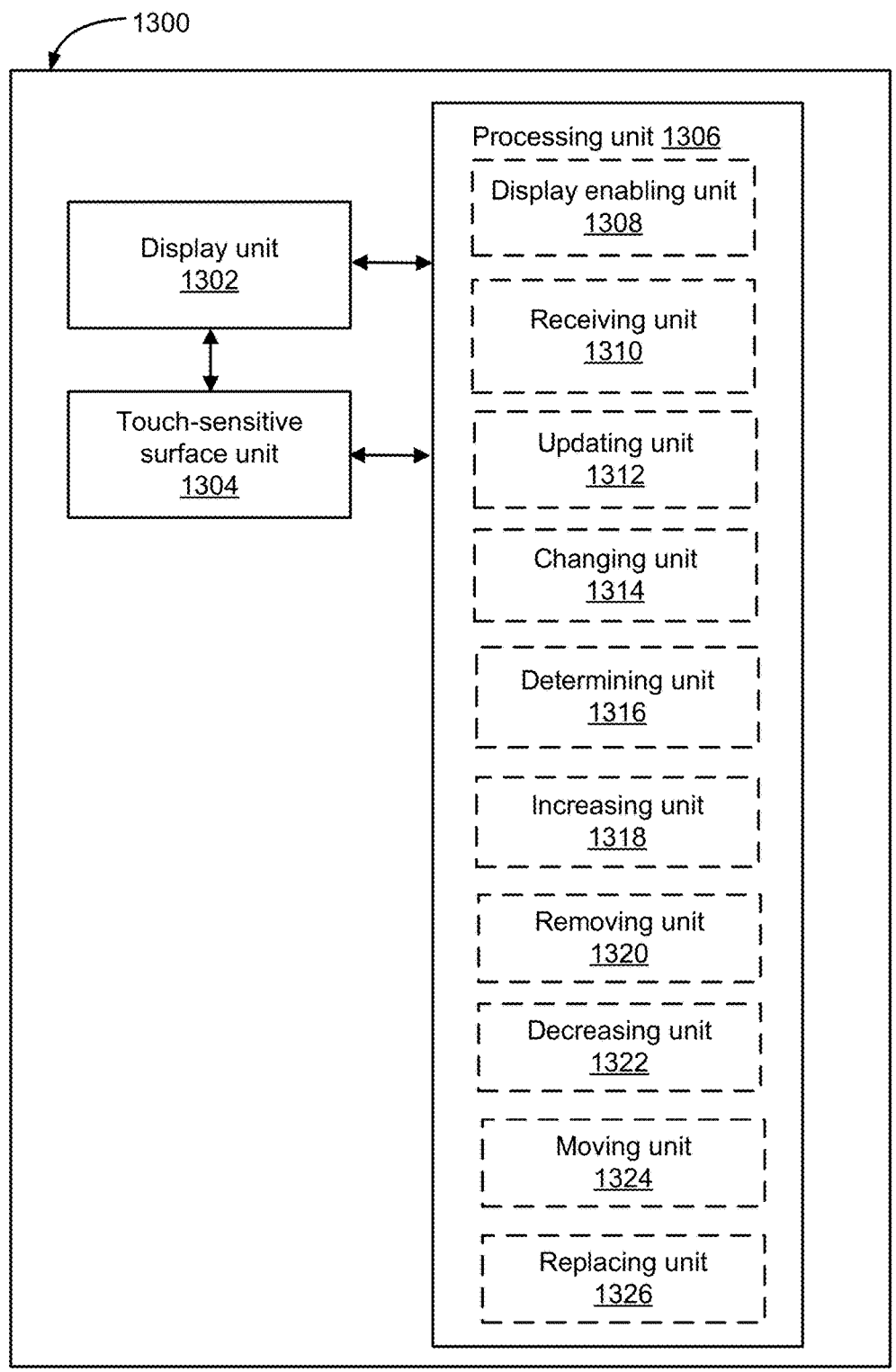

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface for displaying a transition from a first character string to a second character string, a touch-sensitive surface unit 1304 configured to receive user contacts, and a processing unit 1306 coupled to the display unit 1302 and the touch-sensitive surface unit 1304. In some embodiments, the processing unit 1306 includes a display enabling unit 1308, a receiving unit 1310, an updating unit 1312, a changing unit 1314, a determining unit 1316, an increasing unit 1318, a removing unit 1320, a decreasing unit 1322, a moving unit 1324, and a replacing unit 1326.

The processing unit 1306 is configured to display a set of one or more suggestions including one or more character strings that are suggested replacements for a first set of one or more entered characters (e.g., with the display enabling unit 1308). The processing unit 1306 is also configured to, while displaying the set of suggestions, receive one or more additional entered characters (e.g., with the receiving unit 1310). The processing unit 1306 is also configured to, after receiving the additional entered characters, update the set of suggestions based on an updated set of entered characters that includes the first set of entered characters and the additional entered characters (e.g., with the updating unit 1312). The updating comprises changing a first suggestion in the set of suggestions from a first character string that is a suggested replacement for the first set of entered characters to a second character string that is a suggested replacement for the updated set of entered characters (e.g., using the changing unit 1314). The changing comprises determining a maintained portion of the first character string that is identical to a corresponding portion of the second character string (e.g., with the determining unit 1316), determining an inserted portion of the second character string that is inserted relative to the maintained portion of the first character string, the inserted portion having a sequence of characters (e.g., with the determining unit 1316), and while displaying the maintained portion of the first character string, sequentially displaying the characters of the inserted portion of the second character string after the maintained portion of the first character string (e.g., with the display enabling unit 1308).

In some embodiments, the processing unit 1306 is further configured to display a keyboard (e.g., with the display enabling unit 1308), receive, in the keyboard, inputs of the first set of one or more entered characters (e.g., with the receiving unit 1310), and display, proximate to the keyboard, a suggestion region that includes the set of one or more suggestions (e.g., with the display enabling unit 1308).

In some embodiments, sequentially displaying the characters comprises displaying a first character without displaying a second character (e.g., with the display enabling unit 1308) and while displaying the first character, displaying the second character (e.g., with the display enabling unit 1308).

In some embodiments, sequentially displaying the characters comprises displaying an individual character using a size smaller than a size of characters within the maintained portion of the first character string (e.g., with the display enabling unit 1308) and after displaying the individual character, increasing the individual character's size (e.g., with the increasing unit 1318).

In some embodiments, an anchor point that corresponds to a bottom of the individual character remains at a fixed location relative to the maintained portion of the first character string as the individual character's size increases.

In some embodiments, the individual character is displayed using the size that is less than two-thirds of the size of characters within the maintained portion of the first character string.

In some embodiments, sequentially displaying the characters comprises displaying an individual character using an opacity less than an opacity of the maintained portion of the first character string (e.g., with the display enabling unit 1308) and after displaying the individual character, increasing the individual character's opacity (e.g., with the increasing unit 1318).

In some embodiments, the characters of the inserted portion of the second character string are displayed starting with a left-most character and ending with a right-most character of the inserted portion of the second character string.

In some embodiments, changing the first suggestion from the first character string to the second character string further comprises determining a deleted portion of the first character string that is deleted relative to the second character string, the deleted portion having a second sequence of characters (e.g., with the determining unit 1316) and while displaying the maintained portion of the first character string, sequentially removing the characters of the deleted portion of the first character string (e.g., with the removing unit 1320).

In some embodiments, sequentially removing the characters comprises decreasing a size of an individual character (e.g., with the decreasing unit 1322).

In some embodiments, sequentially removing the characters comprises decreasing an opacity of an individual character until the individual character disappears (e.g., with the decreasing unit 1322).

In some embodiments, the characters of the deleted portion are removed starting with a right-most character and ending with a left-most character of the deleted portion.

In some embodiments, changing the first suggestion from the first character string to the second character string further comprises moving the maintained portion of the first character string to a location where the corresponding portion appears within the second character string when the second character string is displayed (e.g., with the moving unit 1324).

In some embodiments, the processing unit 1306 is further configured to, while sequentially displaying the characters of the inserted portion of the second character string, move the displayed maintained portion of the first character string (e.g., with the moving unit 1324).

In some embodiments, changing the first suggestion from the first character string to the second character string further comprises determining a replaced portion of the first character string that is replaced by a replacement portion of the second character string, the replaced portion having a second sequence of characters and the replacement portion having a third sequence of characters (e.g., with the determining unit 1316) and while displaying the maintained portion of the first character string, sequentially replacing characters of the replaced portion with characters of the replacement portion (e.g., with the replacing unit 1326).

In some embodiments, as a replaced character is deleted, the replaced character is replaced by a replacement character.

In some embodiments, changing the first suggestion from the first character string to the second character string further comprises determining a second maintained portion of the first character string and a second corresponding portion of the second character string that match (e.g., with the determining unit 1316), determining a replaced portion of the first character string that is between the maintained portion of the first character string and the second maintained portion of the first character string, the replaced portion having a second sequence of characters (e.g., with the determining unit 1316), determining a replacement portion of the second character string that is between the corresponding portion of the second character string and the second corresponding portion of the second character string, the replacement portion having a third sequence of characters (e.g., with the determining unit 1316), and while displaying the maintained portion of the first character string and the second maintained portion of the first character string, sequentially replacing characters of the replaced portion with characters of the replacement portion (e.g., with the replacing unit 1326).

In some embodiments, the replacement portion is longer than the replaced portion, and sequentially replacing characters of the replaced portion with characters of the replacement portion comprises determining a first portion of the replacement portion that is equal in length to the replaced portion (e.g., with the determining unit 1316), determining a remainder portion of the replacement portion that follows the first portion of the replacement portion (e.g., with the determining unit 1316), replacing the replaced portion with the first portion of the replacement portion without moving the first maintained portion of the first character string relative to the second maintained portion of the first character string (e.g., with the replacing unit 1326), moving the first maintained portion of the first character string relative to the second maintained portion of the first character string by one character width (e.g., with the moving unit 1324), and displaying a first character of the remainder portion after the first portion of the replacement portion and before the second corresponding portion of the second character string (e.g., with the display enabling unit 1308).

In some embodiments, the first character of the remainder portion is a left-most character of the remainder portion.

In some embodiments, the replacement portion is shorter than the replaced portion, and sequentially replacing characters of the replaced portion with characters of the replacement portion comprises determining a first portion of the replaced portion that is equal in length to the replacement portion (e.g., with the determining unit 1316), determining a remainder portion of the replaced portion that follows the first portion of the replaced portion (e.g., with the determining unit 1316), removing, from the first character string, a first character of the remainder portion (e.g., with the removing unit 1320), and moving the second corresponding portion of the second character string towards the first portion of the replaced portion by one character width (e.g., with the moving unit 1324).

In some embodiments, the first character of the remainder portion is a right-most character of the remainder portion.

In some embodiments, the processing unit 1306 is further configured to determine an order in which characters are sequentially replaced based on a location of the replaced portion within the first character string (e.g., with the determining unit 1316).

In some embodiments, the processing unit 1306 is further configured to determine an order in which characters are sequentially replaced based on whether the replaced portion is longer than the replacement portion (e.g., with the determining unit 1316).

In some embodiments, updating further comprises changing a second suggestion in the set of suggestions from a third character string that is a suggested replacement for the first set of entered characters to a fourth character string that is a suggested replacement for the updated set of entered characters (e.g., with the changing unit 1314). Changing comprises determining a maintained portion of the third character string that is identical to a corresponding portion of the fourth character string (e.g., with the determining unit 1316), determining an inserted portion of the fourth character string that is inserted relative to the maintained portion of the third character string, the inserted portion having a second sequence of characters (e.g., with the determining unit 1316), and while displaying the maintained portion of the third character string, sequentially displaying the characters of the inserted portion of the fourth character string after the maintained portion of the third character string (e.g., with the display enabling unit 1308).

In some embodiments, the first suggestion and the second suggestion are changed concurrently.

In some embodiments, the maintained portion of the first character string is the first set of entered characters.

In some embodiments, changing the first suggestion from the first character string to the second character string further comprises determining, based on a predefined criterion, whether to entirely replace the first character string with the second character string (e.g., with the determining unit 1316).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7, 8, and 10 are, optionally, implemented by components depicted in FIGS. 1A-1B, FIG. 11, FIG. 12, or FIG. 13. For example, displaying operations 702, 804, and 1002, detection operation 704, insertion operation 706, receiving operations 802, 806, and 1004, and updating operations 808 and 1006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, FIG. 11, FIG. 12, or FIG. 13.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
at an electronic device with a display:
displaying a suggestion region above an on-screen keyboard, the suggestion region including multiple suggested character strings and a text field, including a first suggested character string and a second suggested character string, the first suggested character string including a first plurality of characters and the second suggested character string including a second plurality of characters;
subsequent to displaying the suggestion region that includes the first suggested character string and the second suggested character string, detecting a gesture that begins within a predefined key of the on-screen keyboard, wherein the predefined key is associated with a single predefined character; and
responsive to detecting the gesture:
determining whether the gesture ends outside of the predefined key;
determining whether the gesture corresponds to a particular section of the suggestion region, the particular section being a first section or a second section;
in accordance with a determination that the gesture ends outside of the predefined key and corresponds to a first section of the suggestion region, inserting the first suggested character string into the text field;
in accordance with a determination that the gesture ends outside of the predefined key and corresponds to a second section of the suggestion region, inserting the second suggested character string into the text field; and
in accordance with a determination that the gesture ends within the predefined key, inserting the single predefined character that is associated with the predefined key into the text field without inserting the respective suggested character string that includes the plurality of characters into the text field.

2. The method of claim 1, wherein the predefined key is a space bar.

3. The method of claim 1, wherein one of the multiple suggested character strings is a prediction of a character string being entered in the text field.

4. The method of claim 1, wherein one of the multiple suggested character strings is an automatic correction of a character string being entered in the text field.

5. The method of claim 4, wherein the automatic correction is visually distinguished from other suggested character strings that are not automatic corrections.

6. The method of claim 1, wherein one of the multiple suggested character strings is an automatic completion of a character string entered in the text field.

7. The method of claim 1, wherein one of the multiple suggested character strings is a character string that was entered in the text field.

8. The method of claim 7, wherein the character string that was entered in the text field is displayed within quotation marks in the suggestion region.

9. The method of claim 1, wherein the multiple suggested character strings are arranged on the same horizontal axis within the suggestion region.

10. The method of claim 1, wherein the multiple suggested character strings include a character string that was entered in the text field, a highest likelihood prediction of a character string being entered in the text field, and a second-highest likelihood prediction of a character string being entered in the text field.

11. The method of claim 10, wherein the character string entered in the text field is displayed in a left section of the suggestion region, the highest likelihood prediction is displayed in a middle section of the suggestion region, and the second-highest likelihood prediction is displayed in a right section of the suggestion region.

12. The method of claim 11, wherein the highest likelihood prediction is an automatic correction.

13. The method of claim 1, wherein one of the multiple suggested character strings is an automatic correction and the method further comprises displaying a graphical user interface element adjacent to the automatic correction that, when activated, rejects the automatic correction.

14. The method of claim 1, wherein:
   inserting the first suggested character string into the text field occurs in accordance with a determination that the gesture ends within a first section of the suggestion region; and
   inserting the second suggested character string into the text field occurs in accordance with a determination that the gesture ends within a second section of the suggestion region.

15. The method of claim 1, further comprising:
   responsive to the gesture including movement of a contact outside of the predefined key and corresponding to the first section of the suggestion region, visually distinguishing the first suggested character string from other suggested character strings in the suggestion region; and
   responsive to the gesture including movement of a contact outside of the predefined key and corresponding to the second section of the suggestion region, visually distinguishing the second suggested character string from other suggested character strings in the suggestion region.

16. The method of claim 15, wherein:
   visually distinguishing the first suggested character string comprises increasing a height of a section of the suggestion region that includes the first suggested character string; and
   visually distinguishing the second suggested character string comprises increasing a height of a section of the suggestion region that includes the second suggested character string.

17. The method of claim 15, further comprising:
   detecting a movement of the contact towards and into the predefined key; and
   responsive to detecting the movement, ceasing to visually distinguish the first or second suggested character string from other suggested character strings in the suggestion region.

18. The method of claim 1, further comprising:
   detecting a movement of a contact towards and into the predefined key, the contact starting at a location that corresponds to the suggestion region; and
   responsive to the movement, ceasing to display the suggestion region.

19. The method of claim 1, further comprising:
   responsive to inserting into the text field either the single predefined character or the first or second suggested character string, inserting into the text field a space character.

20. A non-transitory computer-readable storage medium storing one or more programs configured to be executed by one or more processors of an electronic device with a display, the one or more programs including instructions for:
   displaying a suggestion region above an on-screen keyboard, the suggestion region including multiple suggested character strings and a text field, including a first suggested character string and a second suggested character string, the first suggested character string including a first plurality of characters and the second suggested character string including a second plurality of characters;
   subsequent to displaying the suggestion region that includes the first suggested character string and the second suggested character string, detecting a gesture that begins within a predefined key of the on-screen keyboard, wherein the predefined key is associated with a single predefined character; and
   responsive to detecting the gesture:
      in accordance with a determination that the gesture ends outside of the predefined key and corresponds to a first section of the suggestion region, inserting the first suggested character string into the text field;
      in accordance with a determination that the gesture ends outside of the predefined key and corresponds to a second section of the suggestion region, inserting the second suggested character string into the text field; and
      in accordance with a determination that the gesture ends within the predefined key, inserting the single predefined character that is associated with the predefined key into the text field without inserting the respective suggested character string that includes the plurality of characters into the text field.

21. The non-transitory computer-readable storage medium according to claim 20, wherein the predefined key is a space bar.

22. The non-transitory computer-readable storage medium according to claim 20, wherein one of the multiple suggested character strings is a prediction of a character string being entered in the text field.

23. The non-transitory computer-readable storage medium according to claim 20, wherein one of the multiple suggested character strings is an automatic correction of a character string being entered in the text field.

24. The non-transitory computer-readable storage medium according to claim 23, wherein the automatic correction is visually distinguished from other suggested character strings that are not automatic corrections.

25. The non-transitory computer-readable storage medium according to claim 20, wherein one of the multiple suggested character strings is an automatic completion of a character string entered in the text field.

26. The non-transitory computer-readable storage medium according to claim 20, wherein one of the multiple suggested character strings is a character string that was entered in the text field.

27. The non-transitory computer-readable storage medium according to claim 26, wherein the character string that was entered in the text field is displayed within quotation marks in the suggestion region.

28. The non-transitory computer-readable storage medium according to claim 20, wherein the multiple suggested character strings are arranged on the same horizontal axis within the suggestion region.

29. The non-transitory computer-readable storage medium according to claim 20, wherein the multiple suggested character strings include a character string that was entered in the text field, a highest likelihood prediction of a character string being entered in the text field, and a second-highest likelihood prediction of a character string being entered in the text field.

30. The non-transitory computer-readable storage medium according to claim 29, wherein the character string entered in the text field is displayed in a left section of the suggestion region, the highest likelihood prediction is displayed in a middle section of the suggestion region, and the second-highest likelihood prediction is displayed in a right section of the suggestion region.

31. The non-transitory computer-readable storage medium according to claim 30, wherein the highest likelihood prediction is an automatic correction.

32. The non-transitory computer-readable storage medium according to claim 20, wherein one of the multiple suggested character strings is an automatic correction and wherein the one or more programs further include instructions for displaying a graphical user interface element adjacent to the automatic correction that, when activated, rejects the automatic correction.

33. The non-transitory computer-readable storage medium according to claim 20, wherein:
inserting the first suggested character string into the text field occurs in accordance with a determination that the gesture ends within a first section of the suggestion region; and
inserting the second suggested character string into the text field occurs in accordance with a determination that the gesture ends within a second section of the suggestion region.

34. The non-transitory computer-readable storage medium according to claim 20, wherein the one or more programs further include instructions for:
responsive to the gesture including movement of a contact outside of the predefined key and corresponding to the first section of the suggestion region, visually distinguishing the first suggested character string from other suggested character strings in the suggestion region; and
responsive to the gesture including movement of a contact outside of the predefined key and corresponding to the second section of the suggestion region, visually distinguishing the second suggested character string from other suggested character strings in the suggestion region.

35. The non-transitory computer-readable storage medium according to claim 34, wherein:
visually distinguishing the first suggested character string comprises increasing a height of a section of the suggestion region that includes the first suggested character string; and
visually distinguishing the second suggested character string comprises increasing a height of a section of the suggestion region that includes the second suggested character string.

36. The non-transitory computer-readable storage medium according to claim 34, wherein the one or more programs further include instructions for:
detecting a movement of the contact towards and into the predefined key; and
responsive to detecting the movement, ceasing to visually distinguish the first or second suggested character string from other suggested character strings in the suggestion region.

37. The non-transitory computer-readable storage medium according to claim 20, wherein the one or more programs further include instructions for:
detecting a movement of a contact towards and into the predefined key, the contact starting at a location that corresponds to the suggestion region; and
responsive to the movement, ceasing to display the suggestion region.

38. The non-transitory computer-readable storage medium according to claim 20, wherein the one or more programs further include instructions for:
responsive to inserting into the text field either the single predefined character or the first or second suggested character string, inserting into the text field a space character.

39. An electronic device, comprising:
a display;
one or more processors; and
a memory storing one or more programs configured to be executed by the one or more processors, the one or more programs including instructions for:
displaying a suggestion region above an on-screen keyboard, the suggestion region including multiple suggested character strings and a text field, including a first suggested character string and a second suggested character string, the first suggested character string including a first plurality of characters and the second suggested character string including a second plurality of characters;
subsequent to displaying the suggestion region that includes the first suggested character string and the second suggested character string, detecting a gesture that begins within a predefined key of the on-screen keyboard, wherein the predefined key is associated with a single predefined character; and
responsive to detecting the gesture:
in accordance with a determination that the gesture ends outside of the predefined key and corresponds to a first section of the suggestion region, inserting the first suggested character string into the text field;
in accordance with a determination that the gesture ends outside of the predefined key and corresponds to a second section of the suggestion region, inserting the second suggested character string into the text field; and
in accordance with a determination that the gesture ends within the predefined key, inserting the single predefined character that is associated with the predefined key into the text field without inserting the respective suggested character string that includes the plurality of characters into the text field.

40. The electronic device of claim 39, wherein the predefined key is a space bar.

41. The electronic device of claim 39, wherein one of the multiple suggested character strings is a prediction of a character string being entered in the text field.

42. The electronic device of claim 39, wherein one of the multiple suggested character strings is an automatic correction of a character string being entered in the text field.

43. The electronic device of claim 42, wherein the automatic correction is visually distinguished from other suggested character strings that are not automatic corrections.

44. The electronic device of claim 39, wherein one of the multiple suggested character strings is an automatic completion of a character string entered in the text field.

45. The electronic device of claim 39, wherein one of the multiple suggested character strings is a character string that was entered in the text field.

46. The electronic device of claim 45, wherein the character string that was entered in the text field is displayed within quotation marks in the suggestion region.

47. The electronic device of claim 39, wherein the multiple suggested character strings are arranged on the same horizontal axis within the suggestion region.

48. The electronic device of claim 39, wherein the multiple suggested character strings include a character string that was entered in the text field, a highest likelihood prediction of a character string being entered in the text field, and a second-highest likelihood prediction of a character string being entered in the text field.

49. The electronic device of claim 48, wherein the character string entered in the text field is displayed in a left section of the suggestion region, the highest likelihood prediction is displayed in a middle section of the suggestion region, and the second-highest likelihood prediction is displayed in a right section of the suggestion region.

50. The electronic device of claim 49, wherein the highest likelihood prediction is an automatic correction.

51. The electronic device of claim 39, wherein one of the multiple suggested character strings is an automatic correction and wherein the one or more programs further include instructions for displaying a graphical user interface element adjacent to the automatic correction that, when activated, rejects the automatic correction.

52. The electronic device of claim 39, wherein:
inserting the first suggested character string into the text field occurs in accordance with a determination that the gesture ends within a first section of the suggestion region; and
inserting the second suggested character string into the text field occurs in accordance with a determination that the gesture ends within a second section of the suggestion region.

53. The electronic device of claim 39, wherein the one or more programs further include instructions for:
responsive to the gesture including movement of a contact outside of the predefined key and corresponding to the first section of the suggestion region, visually distinguishing the first suggested character string from other suggested character strings in the suggestion region; and
responsive to the gesture including movement of a contact outside of the predefined key and corresponding to the second section of the suggestion region, visually distinguishing the second suggested character string from other suggested character strings in the suggestion region.

54. The electronic device of claim 53, wherein:
visually distinguishing the first suggested character string comprises increasing a height of a section of the suggestion region that includes the first suggested character string; and
visually distinguishing the second suggested character string comprises increasing a height of a section of the suggestion region that includes the second suggested character string.

55. The electronic device of claim 53, wherein the one or more programs further include instructions for:
detecting a movement of the contact towards and into the predefined key; and
responsive to detecting the movement, ceasing to visually distinguish the first or second suggested character string from other suggested character strings in the suggestion region.

56. The electronic device of claim 39, wherein the one or more programs further include instructions for:
detecting a movement of a contact towards and into the predefined key, the contact starting at a location that corresponds to the suggestion region; and
responsive to the movement, ceasing to display the suggestion region.

57. The electronic device of claim 39, wherein the one or more programs further include instructions for:
responsive to inserting into the text field either the single predefined character or the first or second suggested character string, inserting into the text field a space character.

\* \* \* \* \*